(12) United States Patent
Flusche

(10) Patent No.: US 8,899,907 B2
(45) Date of Patent: Dec. 2, 2014

(54) PIPE EJECTOR MECHANISM AND METHOD

(75) Inventor: Mark J. Flusche, Muenster, TX (US)

(73) Assignee: Superior Energy Services-North America Services, Inc., Houston, TX (US)

(*) Notice: Subject to any disclaimer, the term of this patent is extended or adjusted under 35 U.S.C. 154(b) by 110 days.

(21) Appl. No.: 13/507,338

(22) Filed: Jun. 21, 2012

(65) Prior Publication Data

US 2013/0343835 A1 Dec. 26, 2013

(51) Int. Cl.
*E21B 19/15* (2006.01)
*B65G 47/82* (2006.01)

(52) U.S. Cl.
CPC .............. *E21B 19/15* (2013.01); *B65G 47/82* (2013.01)
USPC ..................................... 414/746.1; 414/745.9

(58) Field of Classification Search
USPC ............ 414/15, 22.51–22.59, 22.61–22.69, 414/22.71, 745.1, 745.4, 745.7, 745.8, 414/745.9, 746.1, 746.2, 746.3, 746.4, 414/746.6, 746.8; 470/901; 82/125, 126
See application file for complete search history.

(56) References Cited

U.S. PATENT DOCUMENTS

| | | | | |
|---|---|---|---|---|
| 2,278,035 A * | 3/1942 | Baker | | 414/746.1 |
| 2,405,141 A * | 8/1946 | Hibbard | | 408/70 |
| 2,692,458 A * | 10/1954 | Lawrence | | 451/76 |
| 3,279,625 A * | 10/1966 | McConnell et al. | | 414/745.9 |
| 3,446,367 A * | 5/1969 | Anderson | | 198/530 |
| 3,493,125 A * | 2/1970 | White et al. | | 414/15 |
| 3,584,726 A * | 6/1971 | Hartzell | | 198/463.6 |
| 3,734,210 A * | 5/1973 | Wilderman | | 175/85 |
| 4,494,899 A * | 1/1985 | Hoang et al. | | 414/22.61 |
| 5,641,262 A * | 6/1997 | Dunlop et al. | | 414/557 |
| 7,494,087 B2 * | 2/2009 | McVaugh | | 242/557 |
| 7,625,168 B2 * | 12/2009 | Lesko | | 414/746.6 |
| 7,832,974 B2 * | 11/2010 | Fikowski et al. | | 414/22.54 |
| 2009/0053013 A1 * | 2/2009 | Maltby | | 414/22.61 |
| 2010/0329823 A1 * | 12/2010 | Baumler et al. | | 414/22.55 |
| 2011/0091304 A1 * | 4/2011 | Tetley et al. | | 414/22.62 |

* cited by examiner

*Primary Examiner* — Gregory Adams

(57) ABSTRACT

An ejection mechanism, which in one embodiment selectively ejects pipe joints to either side of a pipe arm and method for manufacturing the same. A pipe arm contains a plurality of pipe receptacles for receiving pipe joints. Pipe ejection arms are operatively connected to an ejection control mechanism. In one embodiment, at least one torsional member and/or at least one hydraulic actuator allow an operator to selectively eject pipe joints to either lateral side of the pipe arm as needed during drilling and production operations.

9 Claims, 48 Drawing Sheets

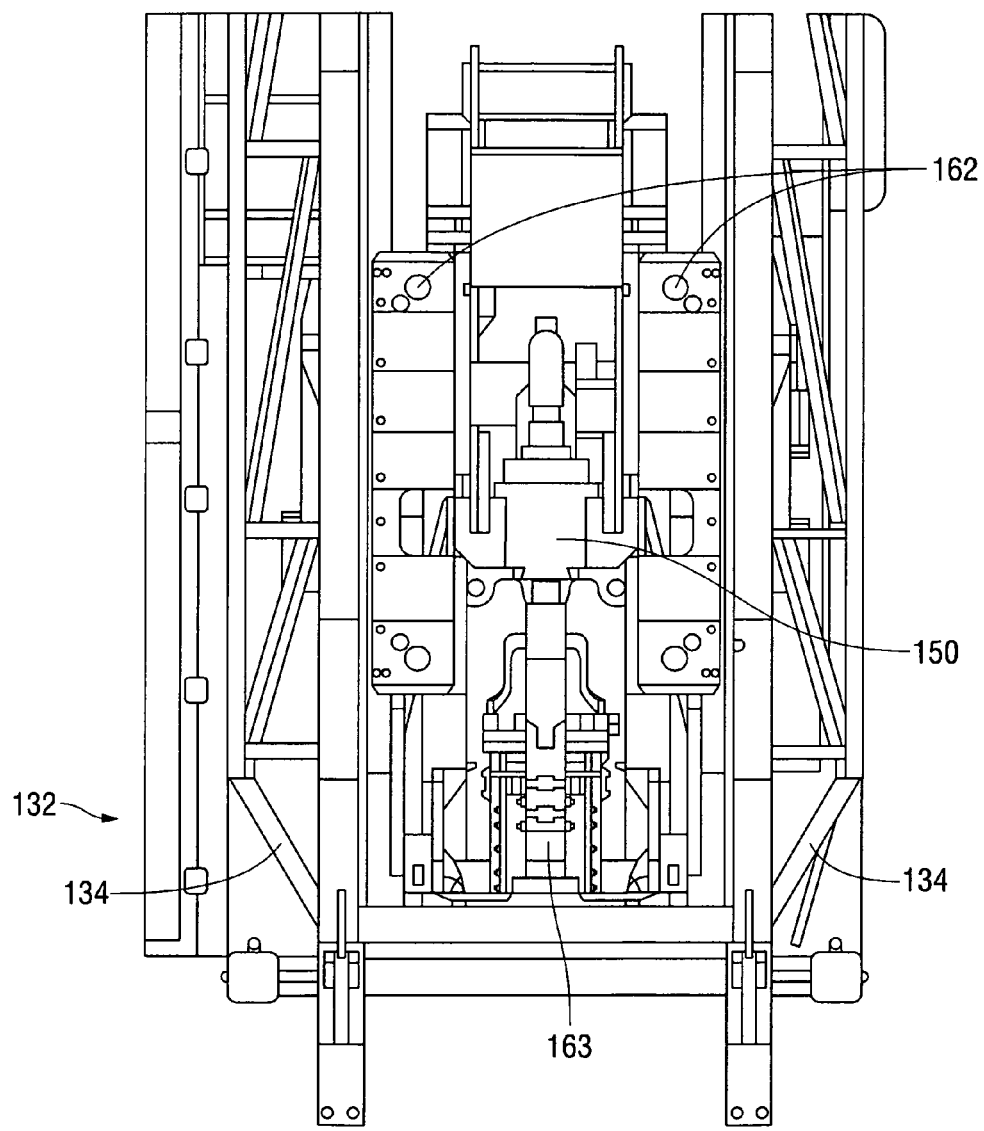
FIG. 4A-A

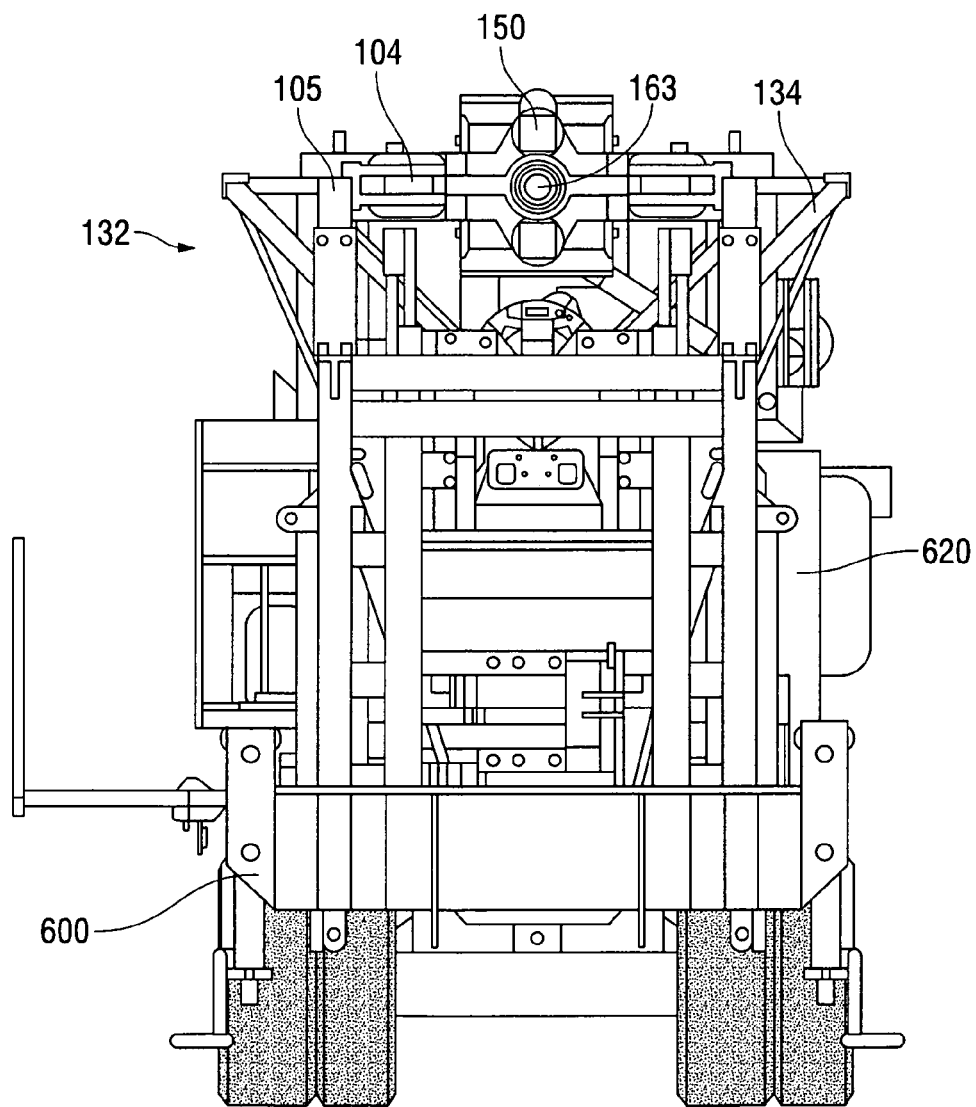
FIG. 4B-B

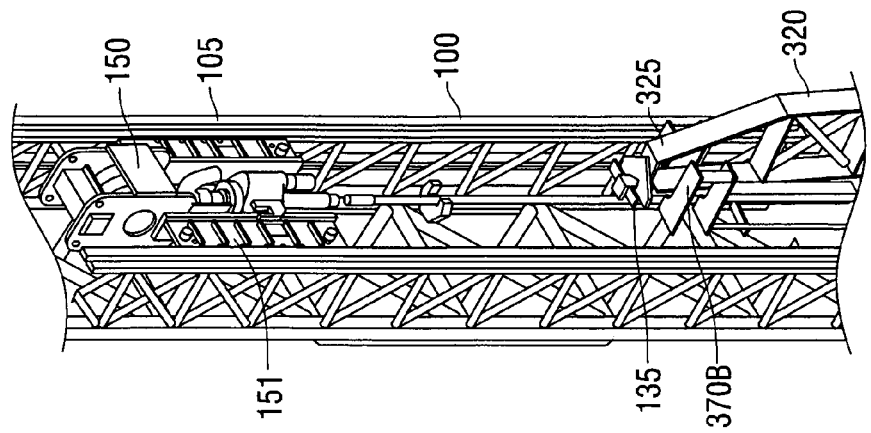
FIG. 7B
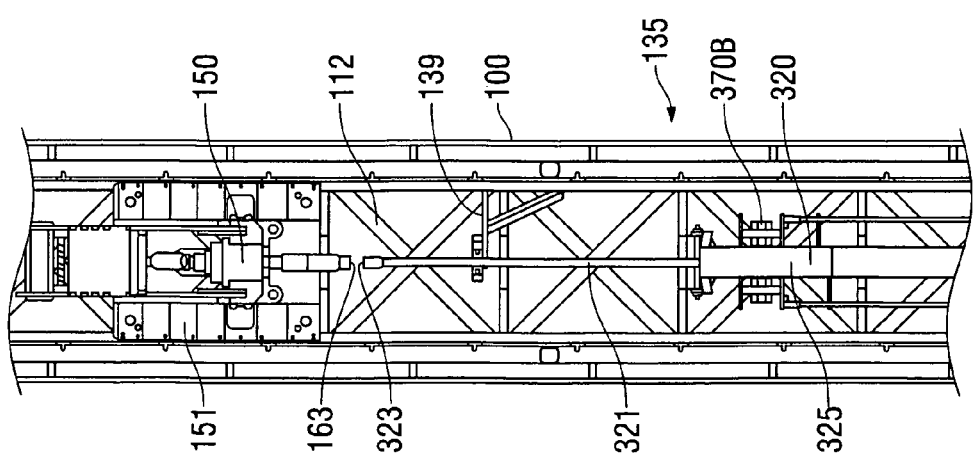
FIG. 7A-A

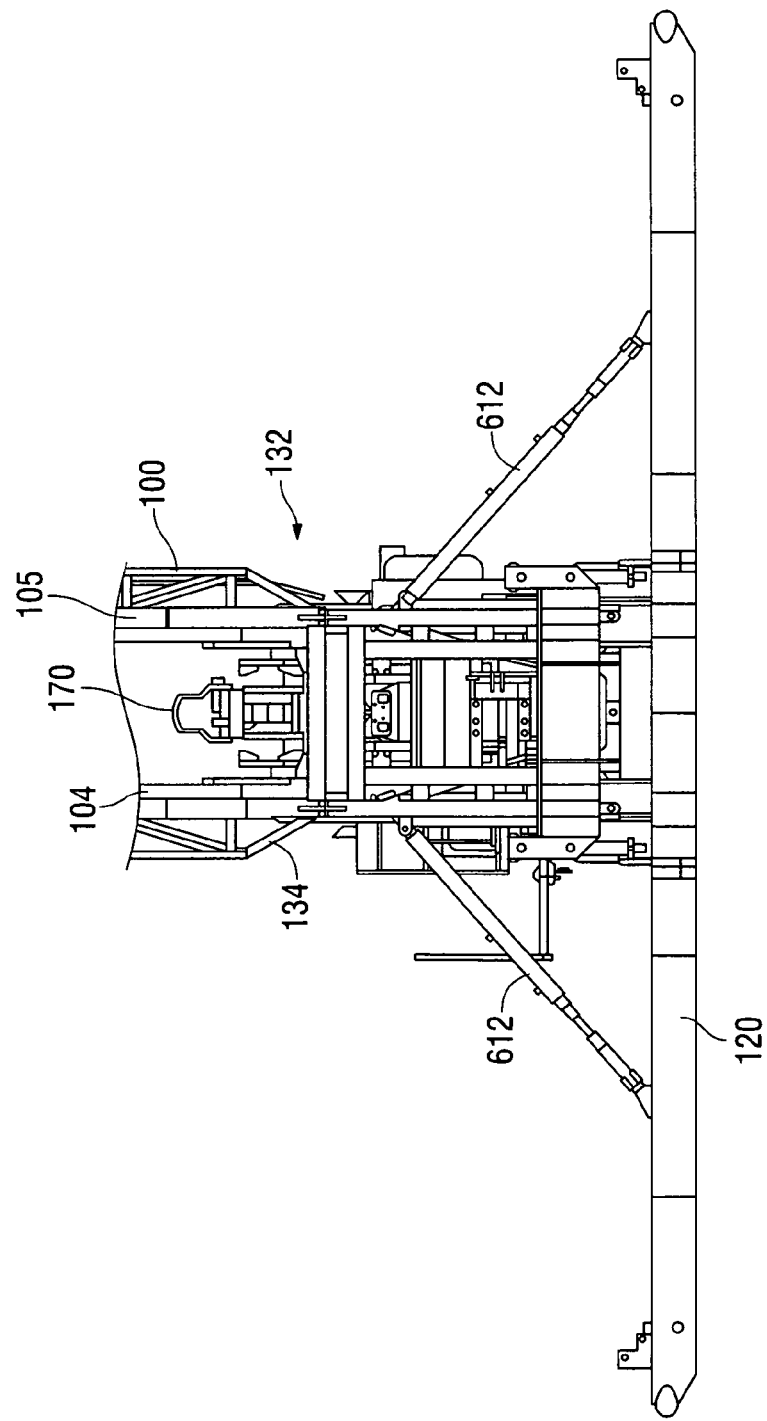
FIG. 8A-A

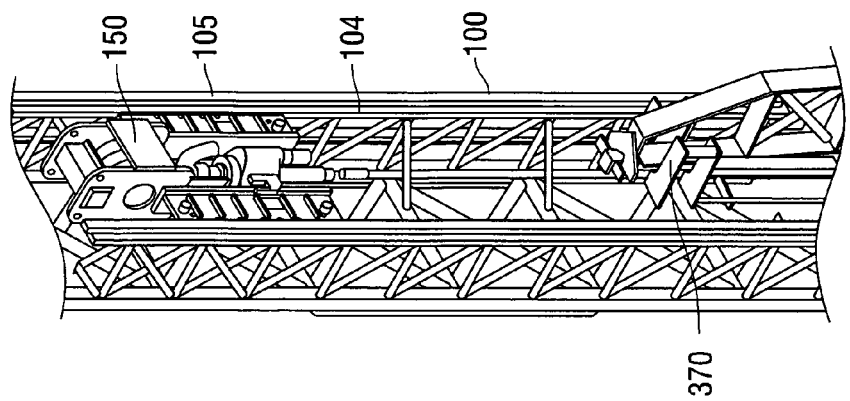
FIG. 8C
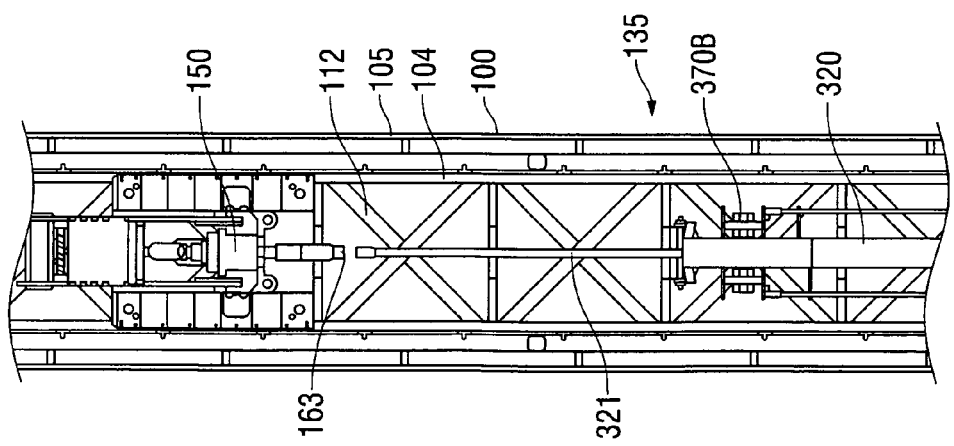
FIG. 8B-B

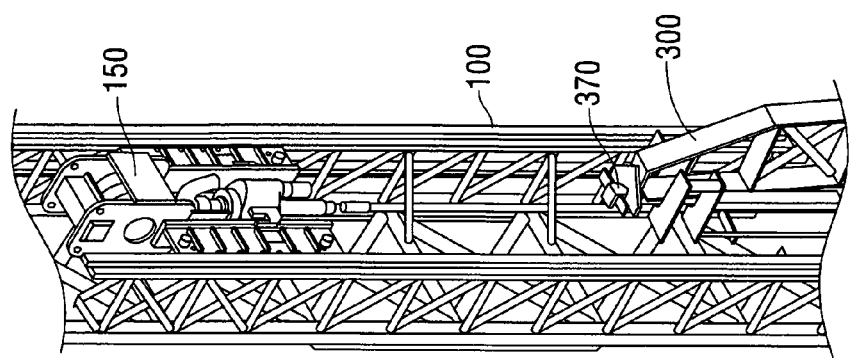
FIG. 9B-B
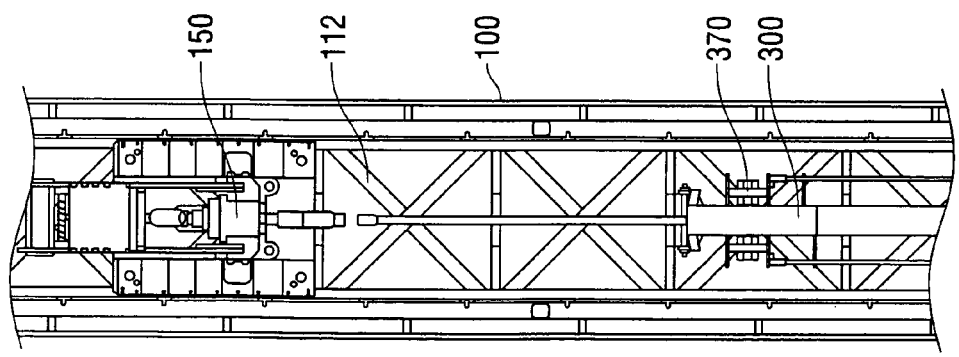
FIG. 9A-A

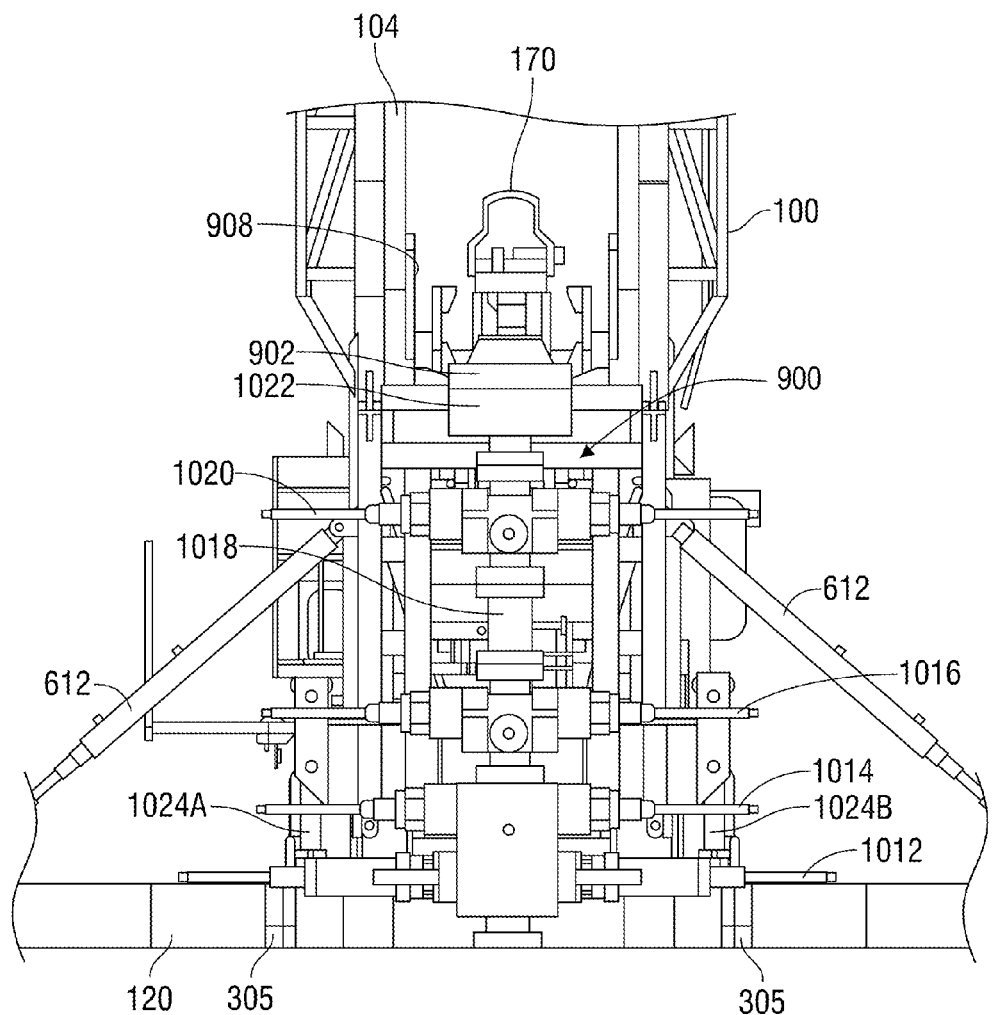
FIG. 9C-C

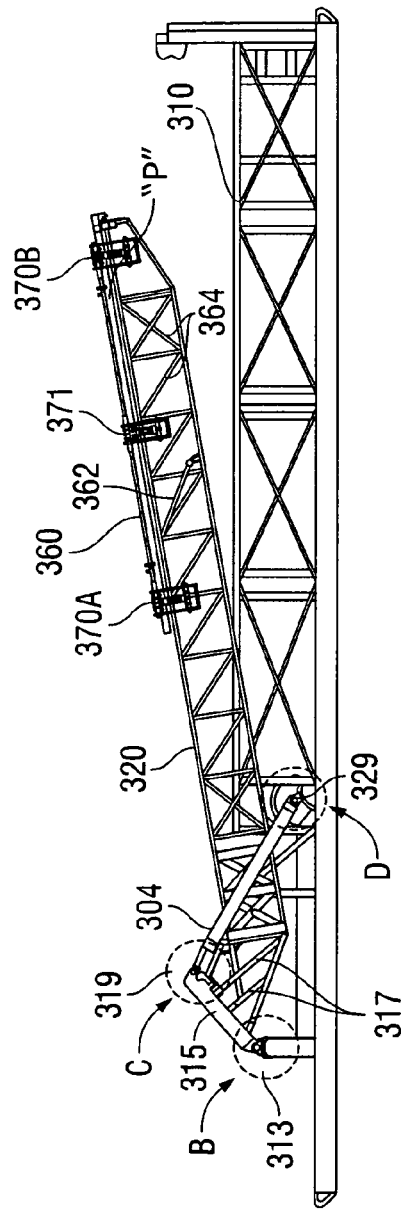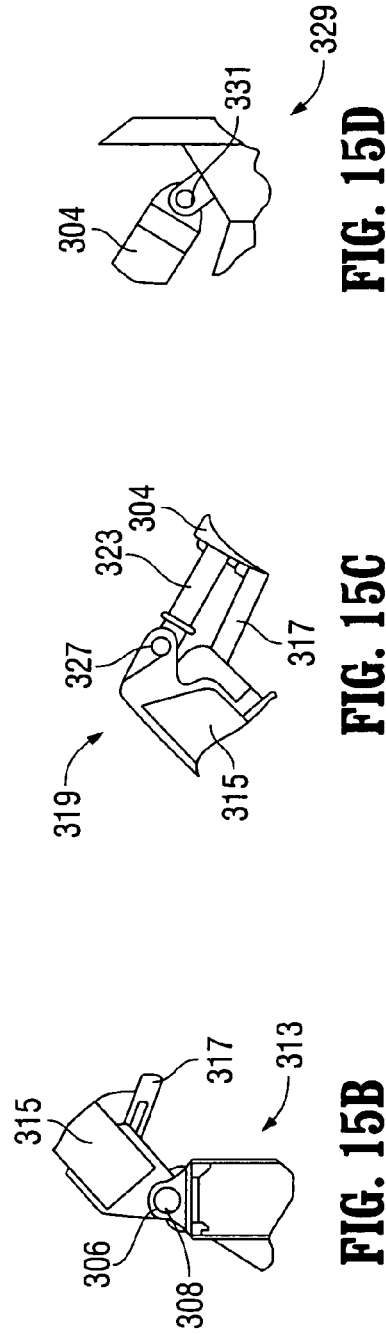

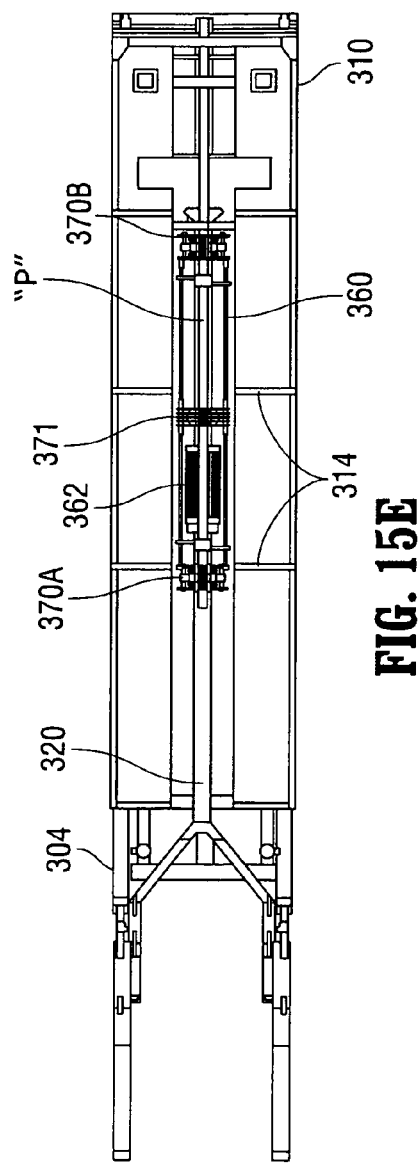
FIG. 15E
FIG. 15G
FIG. 15F

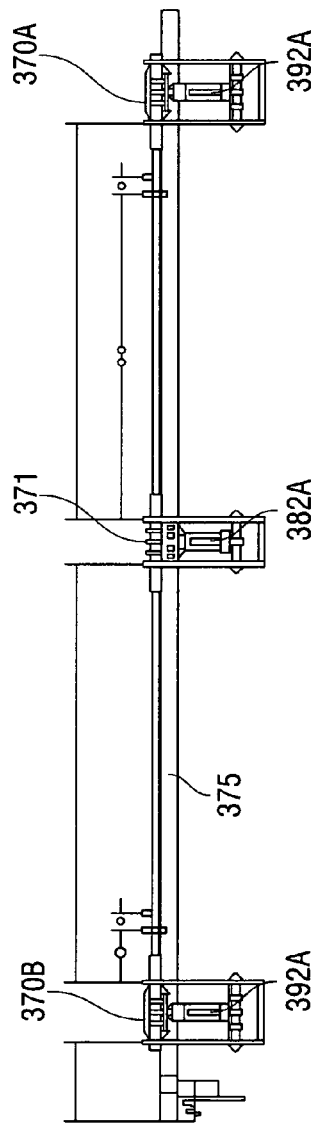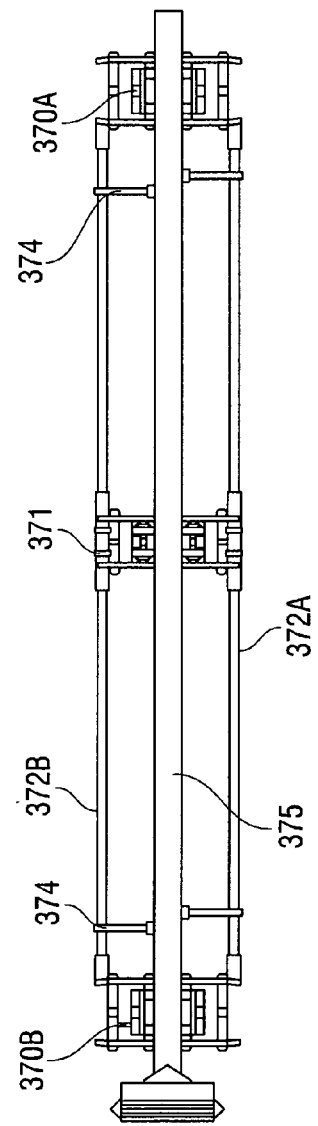
FIG. 18A
FIG. 18B

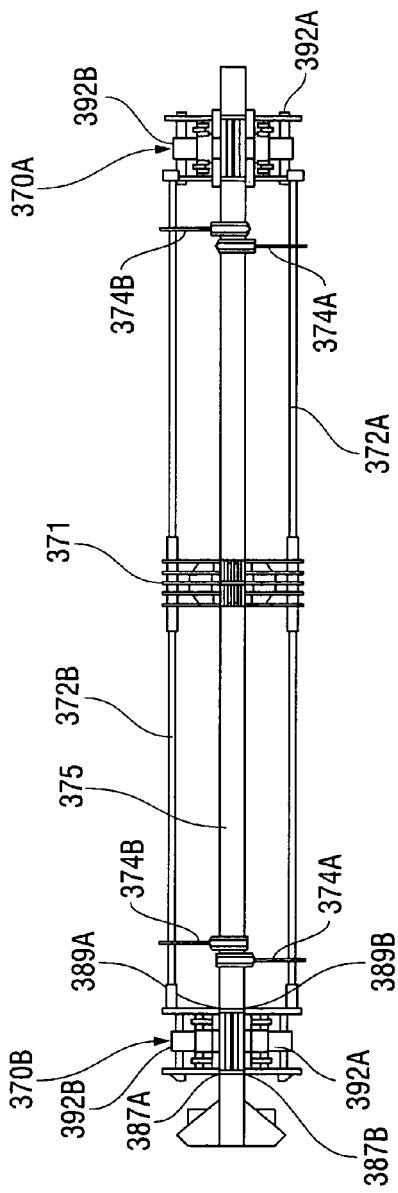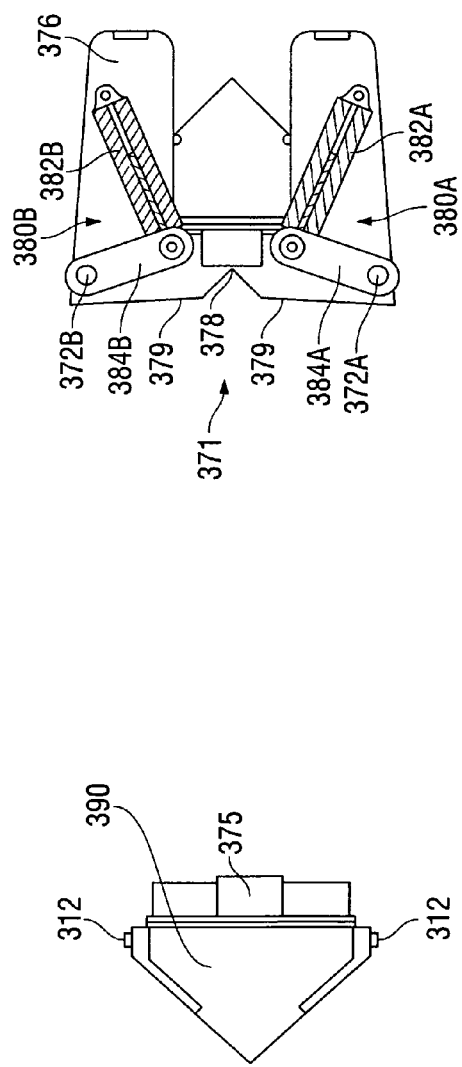

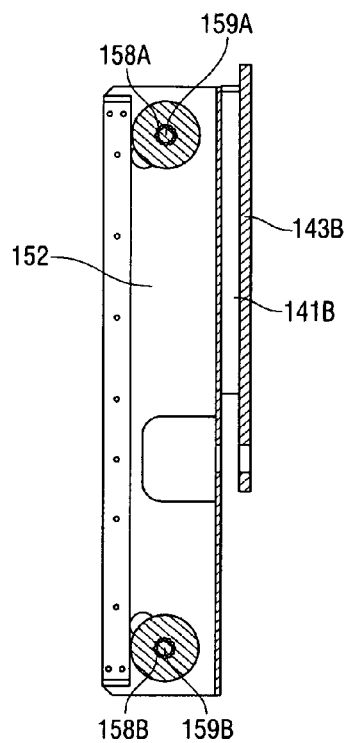
FIG. 19C-C
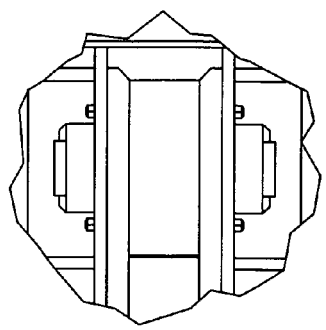
FIG. 19D
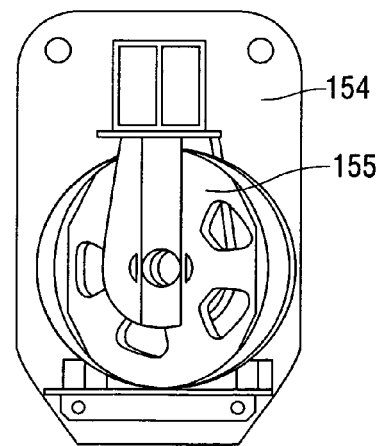
FIG. 19E-E

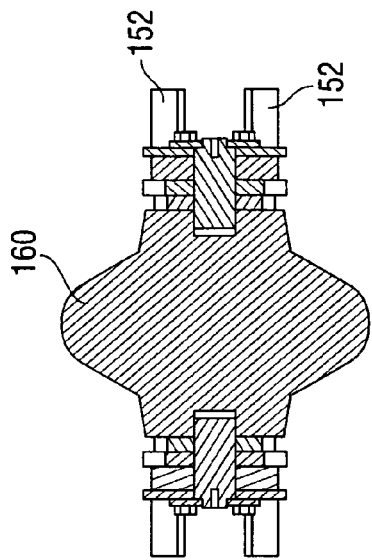
FIG. 20 A-A
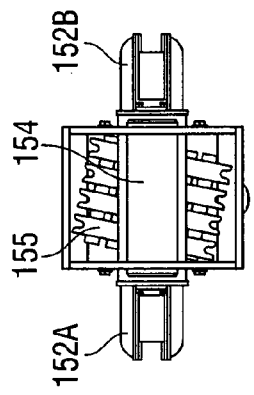
FIG. 20 B
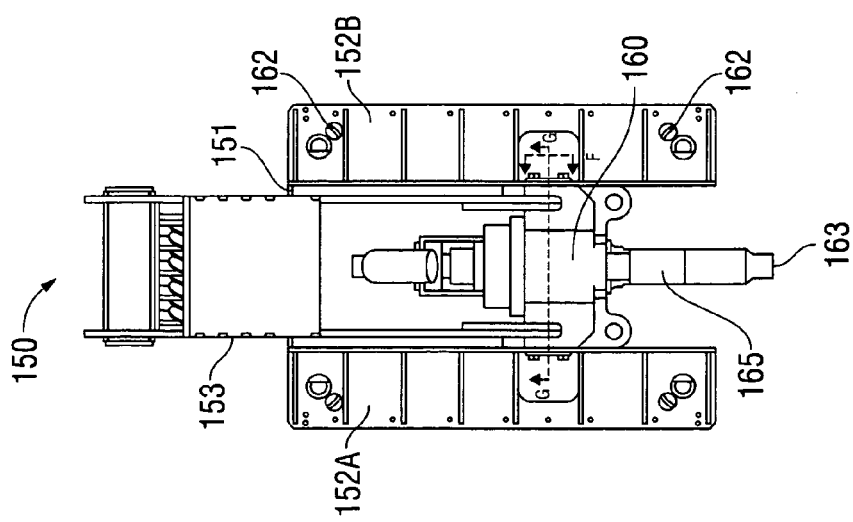
FIG. 20 A

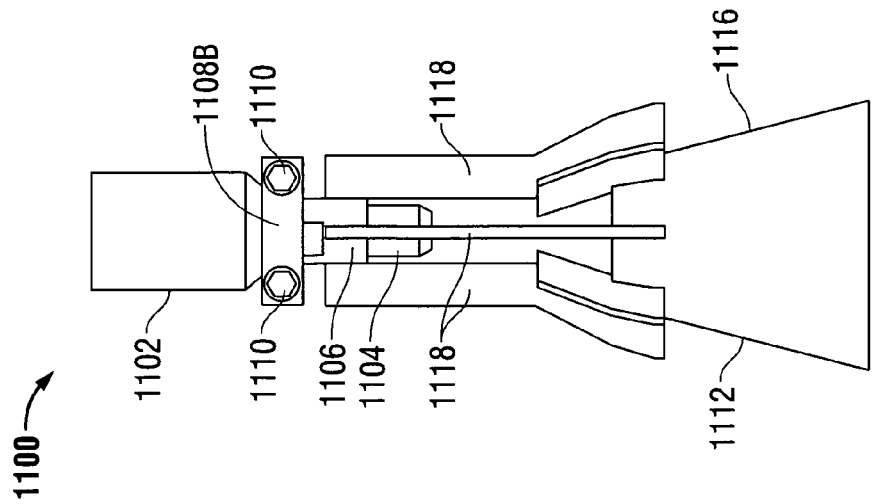
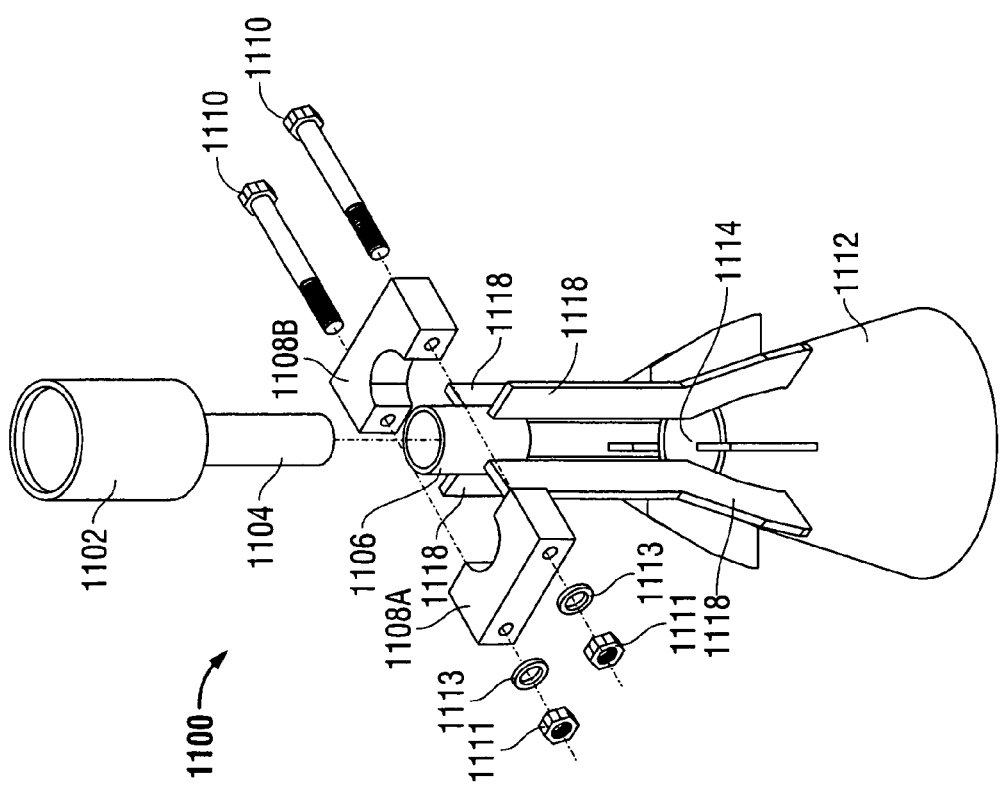

PIPE EJECTOR MECHANISM AND METHOD

TECHNICAL FIELD

One possible embodiment of the present disclosure relates, generally, to the field of producing hydrocarbons from subsurface formations. Further, one possible embodiment of the present disclosure relates, generally, to the field of making a well ready for production or injection. More particularly, one possible embodiment of the present disclosure relates to completion systems and methods adapted for use in wells having long lateral boreholes.

BACKGROUND

In petroleum production, completion is the process of making a well ready for production or injection. This principally involves preparing the bottom of the hole to the required specifications, running the production tubing and associated down hole tools, as well as perforating and/or stimulating the well as required. Sometimes, the process of running and cementing the casing is also included.

Lower completion refers to the portion of the well across the production or injection zone, beneath the production tubing. A well designer has many tools and options available to design the lower completion according to the conditions of the reservoir. Typically, the lower completion is set across the production zone using a liner hanger system, which anchors the lower completion equipment to the production casing string.

Upper completion refers to all components positioned above the bottom of the production tubing. Proper design of this "completion string" is essential to ensure the well can flow properly given the reservoir conditions and to permit any operations deemed necessary for enhancing production and safety.

In cased hole completions, which are performed in the majority of wells, once the completion string is in place, the final stage includes making a flow path or connection between the wellbore and the formation. The flow path or connection is created by running perforation guns into the casing or liner and actuating the perforation guns to create holes through the casing or liner to access the formation. Modern perforations can be made using shaped explosive charges.

Sometimes, further stimulation is necessary to achieve viable productivity after a well is fully completed. There are a number of stimulation techniques which can be employed at such a time.

Fracturing is a common stimulation technique that includes creating and extending fractures from the perforation tunnels deeper into the formation, thereby increasing the surface area available for formation fluids to flow into the well and avoiding damage near the wellbore. This may be done by injecting fluids at high pressure (hydraulic fracturing), injecting fluids laced with round granular material (proppant fracturing), or using explosives to generate a high pressure and high speed gas flow (TNT or PETN, and propellant stimulation).

Hydraulic fracturing, often called fracking, fracing or hydrofracking, is the process of initiating and subsequently propagating a fracture in a rock layer, by means of a pressurized fluid, in order to release petroleum, natural gas, coal steam gas or other substances for extraction. The fracturing, known colloquially as a frack job or frac job, is performed from a wellbore drilled into reservoir rock formations. The energy from the injection of a highly pressurized fluid, such as water, creates new channels in the rock that can increase the extraction rates and recovery of fossil fuels.

The technique of fracturing is used to increase or restore the rate at which fluids, such as oil or water, or natural gas can be produced from subterranean natural reservoirs, including unconventional reservoirs such as shale rock or coal beds. Fracturing enables the production of natural gas and oil from rock formations deep below the earth's surface, generally 5,000-20,000 feet or 1,500-6,100 meters. At such depths, there may not be sufficient porosity and permeability to allow natural gas and oil to flow from the rock into the wellbore at economic rates. Thus, creating conductive fractures in the rock is essential to extract gas from shale reservoirs due to the extremely low natural permeability of shale. Fractures provide a conductive path connecting a larger area of the reservoir to the well, thereby increasing the area from which natural gas and liquids can be recovered from the targeted formation.

Pumping the fracturing fluid into the wellbore, at a rate sufficient to increase pressure downhole, until the pressure exceeds the fracture gradient of the rock and forms a fracture. As the rock cracks, the fracture fluid continues to flow farther into the rock, extending the crack farther. To prevent the fracture(s) from closing after the injection process has stopped, a solid proppant, such as a sieved round sand, can be added to the fluid. The propped fracture remains sufficiently permeable to allow the flow of formation fluids to the well.

The location of fracturing along the length of the borehole can be controlled by inserting composite plugs, also known as bridge plugs, above and below the region to be fractured. This allows a borehole to be progressively fractured along the length of the bore while preventing leakage of fluid through previously fractured regions. Fluid and proppant are introduced to the working region through piping in the upper plug. This method is commonly referred to as "plug and perf."

Typically, hydraulic fracturing is performed in cased wellbores, and the zones to be fractured are accessed by perforating the casing at those locations.

While hydraulic fracturing can be performed in vertical wells, today it is more often performed in horizontal wells. Horizontal drilling involves wellbores where the terminal borehole is completed as a "lateral" that extends parallel with the rock layer containing the substance to be extracted. For example, laterals extend 1,500 to 5,000 feet in the Barnett Shale basin. In contrast, a vertical well only accesses the thickness of the rock layer, typically 50-300 feet. Horizontal drilling also reduces surface disruptions, as fewer wells are required. Drilling a wellbore produces rock chips and fine rock particles that may enter cracks and pore space at the wellbore wall, reducing the porosity and/or permeability at and near the wellbore. The production of rock chips, fine rock particles and the like reduces flow into the borehole from the surrounding rock formation, and partially seals off the borehole from the surrounding rock. Hydraulic fracturing can be used to restore porosity and/or permeability.

Conventional lateral wells are completed by inserting coiled tubing or a similar, generally flexible conduit therein, until the flexible nature of the tubing prevents further insertion. While coil tubing does not require making up and/or breaking out each pipe joint, coiled tubing cannot be rotated, which increases the likelihood of sticking and significantly reduces the ability to extend the pipe laterally. Once a certain depth is reached in a highly angled and/or horizontal well, the pipe essentially acts like soft spaghetti and can no longer be pushed into the hole. Coiled tubing is also more limited in terms of pipe wall thickness to provide flexibility thereby limiting the weight of the string.

Conventional completion rigs include a mast, which extends upward and slightly outward typically at approximately a 3 degree angle from a carrier or similar base structure. The angled mast provides that cables and/or other features that support a top drive and/or other equipment can hang downward from the mast, directly over a wellbore, without contacting the mast. For example, most top drives and/or power swivels require a "torque arm" to be attached thereto, the torque arm including a cable that is secured to the ground or another fixed structure to counteract excess torque and/or rotation applied to the top drive/power swivel. Additionally, a blowout preventer stack, having sufficient components and a height that complies with required regulations, must be positioned directly above the wellbore. A mast having a slight angle accommodates for these and other features common to completion rigs. As a result, a rig must often be positioned at least four feet, or more, away from the wellbore depending on the height of the mast. A need exists for systems and methods having a reduced footprint, especially in lucrative regions where closer spacing of wells can significantly affect production and economic gain, and in marginal regions, where closer spacing of wells would be necessary to enable economically viable production.

Prior to common use of coiled tubing, completion operations often involved the use of workover/production rigs for insertion of successive joints of pipe, which must be threaded together and torqued, often by hand, creating a significant potential for injury or death of laborers involved in the completion operation, and requiring significant time to engage (e.g., "make up") each pipe joint. Drilling rigs could also be utilized to run production tubing but are more expensive although the individual joints of pipes result in the same types of problems.

A significant problem with prior art production/workover rigs or drilling rigs as opposed to coiled tubing units is that individual production tubing pipe connections are often considerably more difficult to make up and/or break out than the drilling pipe connections. Drilling pipe connections are enlarged and are designed for quick make up and break out many times with very little concern about exact alignment of the connectors. Drill pipe is designed to be frequently and quickly made up and broken out without being damaged even if the alignment is not particularly precise. On the other hand, production tubing is normally intended for long term use in the well and requires much more accurate alignment of the connectors to avoid damaging the threads. Production tubing does not typically utilize the expensive enlarged connectors like drill pipe and, in some completions, enlarged connectors simply are not feasible due to clearance problems within the wellbore. Thus, especially for production tubing, prior art workover/production rigs are much slower for inserting and/or removing production tubing pipe into or out of the well than coiled tubing units and are more likely to result in operator injuries and errors during pipe connection make up and break out than coiled tubing. There are also problems with human error in aligning the individual production tubing connectors whereby cross-threading could result in a damaged or leaking connection.

Prior art insertion techniques of completion tubing into a lateral well therefore suffers from significant limitations including but not limited to: 1) the longer time required to run tubing into a well; 2) operator safety; and 3) the maximum horizontal distance across which the tubing can be inserted is limited by the nature of the tubing used and/or the force able to be applied from the surface. Generally, once the frictional forces between the lateral portion of the well and the length of tubing therein exceed the downward force applied by the weight of the tubing in the vertical portion of the well, further insertion becomes extremely difficult, if not impossible, thus limiting the maximum length of a lateral.

Due to the significant day rates and rental costs when performing oilfield operations, a need exists for systems and methods capable of faster, yet safer insertion of pipe and/or tubing into a well. Additionally, due to the costs associated with the drilling, completion, and production of a well, a need exists for systems and methods capable of extending the maximum length of a lateral, thereby increasing the productivity of the well.

Hydraulic fracturing is commonly applied to wells drilled in low permeability reservoir rock. An estimated 90 percent of the natural gas wells in the United States use hydraulic fracturing to produce gas at economic rates.

The fluid injected into the rock is typically a slurry of water, proppants, and chemical additives. Additionally, gels, foams, and/or compressed gases, including nitrogen, carbon dioxide and air can be injected. Various types of proppant include silica sand, resin-coated sand, and man-made ceramics. The type of proppant used may vary depending on the type of permeability or grain strength needed. Sand containing naturally radioactive minerals is sometimes used so that the fracture trace along the wellbore can be measured. Chemical additives can be applied to tailor the injected material to the specific geological situation, protect the well, and improve its operation, though the injected fluid is approximately 99 percent water and 1 percent proppant, this composition varying slightly based on the type of well. The composition of injected fluid can be changed during the operation of a well over time. Typically, acid is initially used to increase permeability, then proppants are used with a gradual increase in size and/or density, and finally, the well is flushed with water under pressure. At least a portion of the injected fluid can be recovered and stored in pits or containers; the fluid can be toxic due to the chemical additives and material washed out from the ground. The recovered fluid is sometimes processed so that at least a portion thereof can be reused in fracking operations, released into the environment after treatment, and/or left in the geologic formation.

Advances in completion technology have led to the emergence of open hole multi-stage fracturing systems. These systems effectively place fractures in specific places in the wellbore, thus increasing the cumulative production in a shorter time frame.

Those of skill in the art will appreciate the present system which addresses the above and other problems.

BRIEF DESCRIPTION OF THE DRAWINGS

The accompanying drawings, which are incorporated in and constitute a part of this specification, illustrate an implementation of apparatus consistent with one possible embodiment of the present disclosure and, together with the detailed description, serve to explain advantages and principles consistent with the disclosure. In the drawings.

FIG. 4A-A is a cross sectional view of the carrier of FIG. 4 taken along the section line A-A in accord with one possible embodiment of the completion system of the present disclosure.

FIG. 4B-B is a cross sectional view of the carrier of FIG. 4 taken along the section line B-B in accord with one possible embodiment of the completion system of the present disclosure.

FIG. 7A-A is a cross sectional view of FIG. 7 taken along the section line A-A showing the mast assembly and top drive of the depicted long lateral completion system in accord with one possible embodiment of the completion system of the present disclosure.

FIG. 7B is a perspective view of the portion of the mast assembly and pipe arm illustrated in FIG. 7A-A in accord with one possible embodiment of the completion system of the present disclosure.

FIG. 8A-A is a cross sectional view of the system of FIG. 8 taken along the section line A-A, showing the pipe tong with respect to the mast assembly in accord with one possible embodiment of the completion system of the present disclosure.

FIG. 8B-B is a cross sectional view of the system of FIG. 8 taken along the section line B-B, showing the mast assembly and top drive in accord with one possible embodiment of the completion system of the present disclosure.

FIG. 8C is a perspective view of the portion of the system shown in FIG. 8B-B in accord with one possible embodiment of the completion system of the present disclosure.

FIG. 9A-A is a cross sectional view of the system of FIG. 9 taken along the section line A-A, illustrating the upper portion of the mast assembly in accord with one possible embodiment of the completion system of the present disclosure.

FIG. 9B-B is a perspective view of the upper portion of the mast assembly as illustrated in FIG. 9A-A, showing the top drive and the pipe clamp in accord with one possible embodiment of the completion system of the present disclosure.

FIG. 9C-C is a cross sectional view of the system of FIG. 9 taken along the section line C-C, illustrating the relationship of the blowout preventer to the completion system in accord with one possible embodiment of the completion system of the present disclosure.

FIG. 15A is an elevation view of the pipe arm of FIG. 14 in accord with one possible embodiment of the completion system of the present disclosure.

FIG. 15B is an exploded view of a portion of the pipe arm of FIG. 15A, indicated as section "B" in accord with one possible embodiment of the completion system of the present disclosure.

FIG. 15C is an enlarged or detailed view of a portion of the pipe arm of FIG. 15A, indicated as section "C" in accord with one possible embodiment of the completion system of the present disclosure.

FIG. 15D is an enlarged or detailed view of a portion of the pipe arm of FIG. 15A, indicated as section "D" in accord with one possible embodiment of the completion system of the present disclosure.

FIG. 15E is a plan view of the pipe arm of FIG. 14 in accord with one possible embodiment of the completion system of the present disclosure.

FIGS. 15F and 15G are end views of the pipe arm of FIG. 14 in accord with one possible embodiment of the completion system of the present disclosure.

FIG. 18A is an elevation view of the kickout arm of FIG. 17 in accord with one possible embodiment of the completion system of the present disclosure.

FIG. 18B is a bottom view of the kickout arm of FIG. 17 in accord with one possible embodiment of the completion system of the present disclosure.

FIG. 18C is a top view of the kickout arm of FIG. 17 in accord with one possible embodiment of the completion system of the present disclosure.

FIG. 18B-B is a sectional view of the end taken along the section line B-B in FIG. 18B in accord with one possible embodiment of the completion system of the present disclosure.

FIG. 18C-C is a cross sectional view of the kickout arm of FIG. 18C taken along the section line C-C in accord with one possible embodiment of the completion system of the present disclosure.

FIG. 19C-C is a cross sectional view of the top drive fixture of FIG. 19B taken along the section line C-C in accord with one possible embodiment of the completion system of the present disclosure.

FIG. 19D is an enlarged or detailed view of a portion of the top drive fixture of FIG. 19B indicated as section "D" in accord with one possible embodiment of the completion system of the present disclosure.

FIG. 19E-E is a cross sectional view of the top drive fixture of FIG. 19A taken along the section line E-E in accord with one possible embodiment of the completion system of the present disclosure.

FIG. 20A is an illustration of a top drive within the top drive fixture of FIG. 19A in accord with one possible embodiment of the completion system of the present disclosure.

FIG. 20 A-A is a cross sectional view of the top drive and fixture of FIG. 20A taken along section line A-A in accord with one possible embodiment of the completion system of the present disclosure.

FIG. 20B is a top view of the top drive and fixture of FIG. 20A in accord with one possible embodiment of the completion system of the present disclosure.

FIG. 25A is an exploded perspective view of a guide apparatus engageable with a top drive in accord with one possible embodiment of the present disclosure.

FIG. 25B is a diagrammatic side view of the guide apparatus of FIG. 25A.

The above general description and the following detailed description are merely illustrative of the generic invention, and additional modes, advantages, and particulars of this invention will be readily suggested to those skilled in the art without departing from the spirit and scope of the invention.

DESCRIPTION OF EMBODIMENTS

Figure 1:
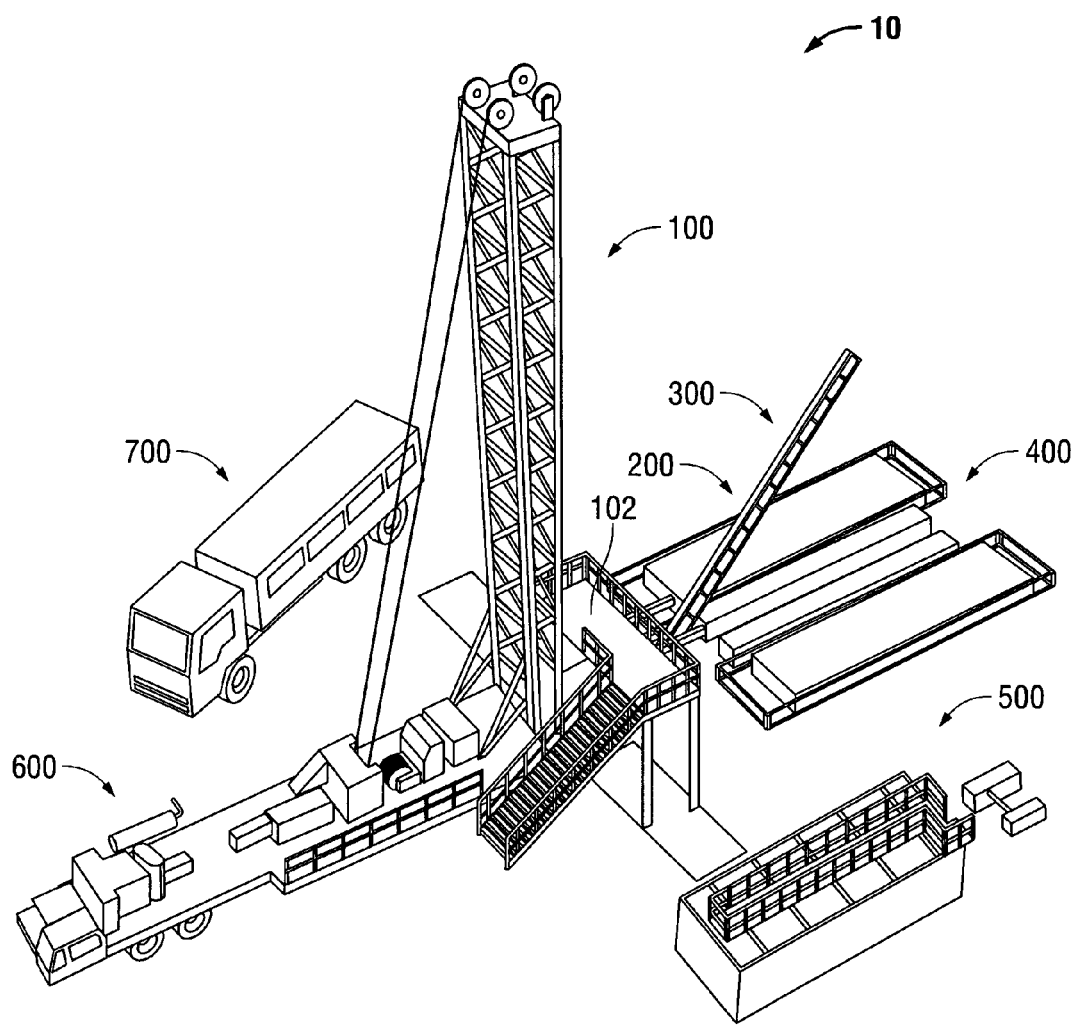
FIG. 1 illustrates an embodiment of a long lateral completion system usable within the scope of one possible embodiment of the present disclosure.

FIG. 1 illustrates an embodiment of a long lateral completion system 10 usable in accord with one possible embodiment of the completion system of the present disclosure. In this embodiment, the completion system 10 is shown having a mast assembly 100, which extends in a generally vertical direction (i.e., perpendicular to the rig carrier 600 and/or the earth's surface), a pipe handling mechanism 200, a catwalk-pipe arm assembly 300, two pipe tubs 400, a pump pit combination skid 500, a rig carrier 600 usable to transport the mast assembly 100 and various hydraulic and/or motorized pumps and power sources for raising and lowering the mast assembly 100 and operating other rig components, and a control van 700, used to control operation of one or more of the components of long lateral completion system 10. Other embodiments may comprise the desired completion system 10 components otherwise arranged on skids as desired. For example, in another embodiment, separate pump and pit skids might be utilized. In another embodiment, catwalk pipe tubes with tube handling elements might be combined on one skid with pipe arm assembly 300 provided separately. It will be appreciated that many different embodiments may be utilized. Accordingly, FIG. 1 shows one possible arrangement of various components of the completion system 10 that can be implemented around a well (e.g., an oil, natural gas, or water well). Due to the construction, system 10 can work with wells that are in close proximity to each other, e.g. within ten feet of each other. For example, mast assembly 100 may be located above a first well, as discussed hereinafter, and rig floor 102 (if used) may be elevated above a second capped wellhead (not shown) within ten feet of the first well. Sensors, such as laser sights, guides mounted to the rear of rig carrier 600, and the like may be utilized, e.g., mounted to and/or guided to the well head, to locate and orient the axis of drilling rig mast 100 precisely with respect to the wellbore, which in one embodiment may be utilized to align a top drive mounted on guide rails with the wellbore, as discussed hereinafter.

Control van 700 and automated features of system 10 can allow a single operator in the van to view and operate the truck mounted production rig by himself, including raising the derrick, picking up pipe, torqueing to the desired torque levels for tubing, going in the hole, coming out of the hole, performing workover functions, drilling out plugs, and/or other steps completing the well, which in the prior art required a rig crew, some problems of which were discussed above. In other embodiments, the control van 700 and/or other features can be configured for use and operation by multiple operators. Control van 700 may comprise a window arrangement with windows at the top, front, sides and rear (See e.g., FIG. 12B), so that once positioned in a desired position on the well site, all operations to the top of mast 100 are readily visible.

For example, embodiments of the system 10 can be positioned for real time operation, e.g., by a single individual operating the control van 700 and/or a similar control system, and further embodiments can be used to perform various functions automatically, e.g., after calibrating the system 10 for certain movements of the pipe arm assembly 300, the top drive or a similar type of drive unit along the mast assembly 100, etc. After providing the system 10 in association with a wellbore, e.g., by erecting the mast assembly 100 vertically thereabove, a tubular segment can be transferred from one or more pipe tubs and/or similar vessels to the pipe arm assembly 300, and the control van 700 and/or a similar system can be used to engage the tubular segment with a pipe moving arm thereof. For example, as described hereinafter, hydraulic members of the pipe tubs and/or similar vessels can be used to urge a tubular member over a stop into a position for engagement with a pipe moving arm, while hydraulic grippers thereof can be actuated to grip the tubular member. The control system can then be used to raise the pipe moving arm and align the tubular segment with the mast assembly, which can include extension of a kick-out arm from the pipe moving arm, further described below. Alignment of the tubular segment with the mast assembly could further include engagement of the tubular segment by grippers (e.g., hydraulic clamps and/or jaws) positioned along the mast. The control system is further usable to move the top drive along the mast assembly to engage the tubular segment (e.g., through rotation thereof), to disengage the pipe moving arm from the tubular, and to further move the top drive to engage the tubular segment with a tubular string associated with the wellbore. While the system is depicted having a pipe moving arm used to raise gripped segments of pipe into association and/or alignment with the mast, in other embodiments, a catwalk-type pipe handling system in which the front end of each pipe segment is pulled and/or lifted into a desired position, while the remainder of the pipe segment travels along a catwalk, can be used.

In an embodiment, any of the aforementioned operations can be automated. For example, the control system can be used to calibrate movement of the drive unit along the mast assembly, e.g., by determining a suitable vertical distance to travel to engage a top drive with a tubular segment positioned by the pipe moving arm, and a suitable vertical distance to travel to engage a tubular segment engaged by the top drive with a tubular string below, such that movement of a top drive between positions for engagement with tubular members and engagement of tubular members with a tubular string can be performed automatically thereafter. The control system can also be used to calibrate movement of the pipe moving arm between raised and lowered positions, depending on the position of the mast assembly 100 relative to the pipe arm assembly 300 after positioning the system 10 relative to the wellbore. Then, future movements of the pipe moving arm, and the kick-out arm, if used, can be automated. In a similar manner, grippers on the mast assembly 100, if used, annular blowout preventers and/or ram/snubbing assemblies, and other components of the system 10 can be operated using the control system, and in an embodiment, in an automated fashion. After assembly of a completion string, further operations, such as fracturing, production, and/or other operations that include injection of substances into or removal of substances from the wellbore can be controlled using the control system, and in an embodiment, can be automated. In embodiments where a catwalk-type pipe handling system is used, operations of the catwalk-type pipe handling system can also be highly automated, including engagement of the front end of a pipe segment, lifting and/or otherwise moving the front end of the pipe segment, and the like.

Figure 2:
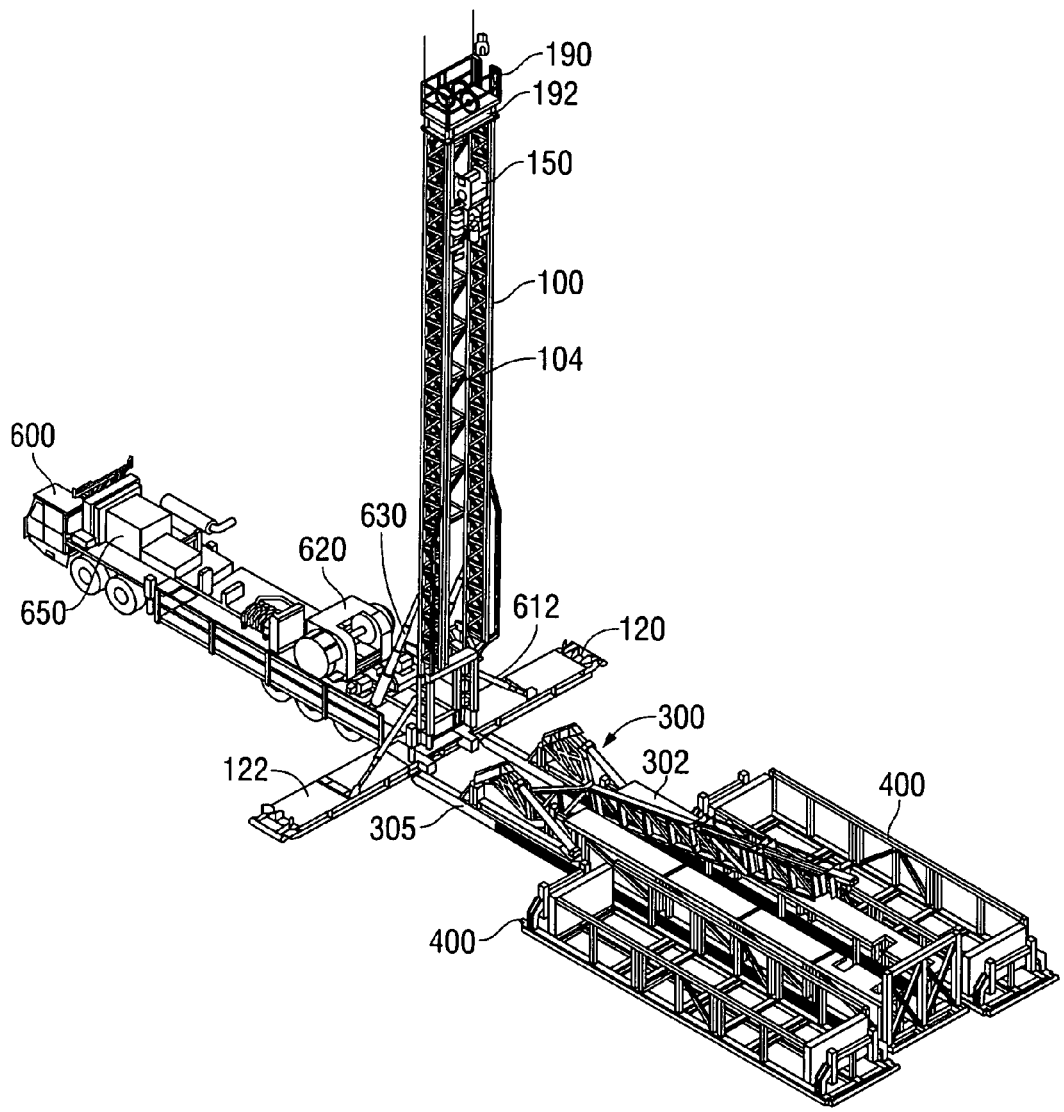
FIG. 2 is a perspective view of the mast assembly, pipe arm, pipe tubs, and the carrier of the long lateral completion system of FIG. 1 in accord with one possible embodiment of the completion system of the present disclosure.

FIG. 2 is a perspective view of the mast assembly 100, catwalk-pipe arm assembly 300, pipe tubs 400, and the carrier 600 of the long lateral completion system 10 in accord with one possible embodiment of the completion system of the present invention. The carrier 600 has the mast assembly 100 extending from the rear portion of the carrier 600. In one embodiment, the mast assembly 100 is essentially perpendicular to the carrier 600. In another embodiment, mast assembly 100 is aligned either coaxially, within less than three inches, or two inches, or one inch to an axis of the bore through the wellhead, BOPs, or the like when the top drive is positioned at a lower portion of the mast and/or is parallel to the axis of the borehole adjacent the surface of the well and/or the bore of the wellhead pressure equipment within less than five degrees, or less than three degrees, or less than one degree in another embodiment. For example, in one embodiment, mast rails 104, which guide top drive 150, may be aligned to be essentially parallel to the axis of the bore, within less than five degrees in one embodiment, or less than three degrees, or less than one degree in another embodiment, whereby top drive 150 moves coaxially or concentric to the well bore within a desired tolerance. As used herein a well completion system may be essentially synonymous with a workover system or drilling system or rig or drilling rig or the like. The system of the present invention may be utilized for completions, workovers, drilling, general operations, and the like and the term workover rig, completing rig, drilling rig, completion system, intervention system, operating system, and the like are used herein substantially interchangeably for the herein described system. Pipe as used herein may refer interchangeably to a pipe string, a single pipe, a single pipe that is connected to or removed from a pipe string, a stand of pipe for connection or removal from a pipe string, or a pipe utilized to build a pipe string, tubular, tubulars, tubular string, oil country tubulars, or the like.

The carrier 600 is illustrated with a power plant 650 and a winch or drawworks assembly 620. Winch or drawworks 620 can be utilized for lifting and lowering the top drive 150 in mast 100 utilizing pulley arrangements in crown 190 and blocks associated with top drive 150. The mast positioning hydraulic actuators 630 provide for lifting the mast assembly 100 into a desired essentially vertical position, with respect to the axis of the borehole at the surface of the well, within a desired accuracy alignment angle. In one embodiment, a laser sight may be mounted to the wellbore with a target positioned at an upper portion of the mast to provide the desired accuracy of alignment. In this embodiment, crown laser alignment target 192 is provided adjacent crown 190. The mast assembly 100 is affixed to the rear portion of the carrier 600. Also the mast assembly 100 is illustrated with a top drive 150 and a crown 190. The top drive allows rotation of the tubing, which results in significant improvement when inserting pipe into high angled and/or horizontal well portions. Further associated with the mast assembly 100 and the carrier 600 is a mast support base beam 120 for providing stability to the carrier 600 and the mast assembly 100, e.g., by increasing the surface area that contacts the ground.

In one possible embodiment, a catwalk-pipe arm assembly 300 may be located proximate to the mast assembly 100, which, in one possible embodiment, may be utilized to automatically insert and/or remove pipe from the wellbore. In one embodiment, the pipe is not stacked in the rig but instead is stored in one or more moveable pipe tubs 400. Catwalk-pipe arm assembly 300 may be configured so that components are provided in different skids, as discussed hereinbefore, and as discussed hereinafter to some extent. In this example, catwalk-pipe arm assembly 300 has associated on either side thereof a pipe tub 400. However, pipe tubes 400 may be used on only one side, two on one side, or any configuration may be utilized that fits with the well site. While more than two pipe tubes can be utilized, usually not more than four pipe tubes are utilized. However, pipe racks or other means to hold and/or feed pipe may be utilized. It can be appreciated that multiple pipe tubs 400 are provided for supplying multiple pipes to the catwalk-pipe arm assembly 300. Pipe tubs 400 may or may not comprise feed elements, which guide each pipe as needed to roll across catwalk 302 to pivotal pipe arm 320. Conceivably, means (not shown) may be provided which allow torqueing two or more pipes from associated pipe tubes for simultaneously handling stands of pipes utilizing pivotal pipe arm 300 for faster insertion into the well bore. However, in the presently shown embodiment, only one pipe at a time is typically handled by pipe arm 300. When handling stands of pipe, then the correspondingly lengthened mast 100 may be carried in multiple carrier trucks 600.

The pipe tubs are preferably capable of holding multiple joints of pipe for delivery to the pipe arm. The pipe tubs are further preferably capable of continuously lifting and feeding a section of pipe to the pipe arm. The pipe tubs in some embodiments can be positioned in an orientation substantially parallel to the pipe arm, so that the sections of pipe are in a length-wise orientation parallel to the pipe arm. A pipe tub may further comprise a hydraulic lifting system for raising the floor or bottom shelf of the pipe tub in an upwards direction away from the ground and additionally may be used to tilt the pipe tub, so as to lift and roll one or more sections of pipe into a position to be received by the pipe arm. The pipe tubs could additionally include a series of pins along the edge of the pipe tub closest to the pipe arm, which feeds the sections of pipe to the pipe arm. However, preferably the series of pins are disposed on the pipe arm skid at a location proximate to the adjacent edge of the pipe tubs. These pins serve the purpose of stopping or preventing a joint of pipe from rolling onto the pipe arm or pipe arm skid prematurely. Each pipe tub used in the pipe handling system can further incorporate one or more flipper arms, which is hydraulically actuated arms or plates to push or bump a section of pipe over the above mentioned pins when the pipe handling skid and pipe arm are in a position to receive the said section of pipe. Preferably, the pipe arm skid includes one or more flipper arms which pivotally rotate in an upward direction and which engage the joints of pipe to lift the joints of pipe over the pins retaining the joint(s) of pipe, whether the pins are disposed along the edge of the pipe arm skid or on the edge of the pipe tub. It can be appreciated that as an alternative to the pipe tubs 400, pipe ramps, saw horses, or tables can be used. The selection of the apparatus (e.g. pipe tubs, ramps, saw horses, or tables) for delivery of pipe joints to the pipe arm depends on the physical layout of the surrounding area and if there are any obstructions or hazards that need to be avoided or overcome.

Various types of scanners such as laser scanners for bar codes, RFIDs, and the like may be utilized to monitor each pipe whereby the amount of usage, the length, torque history and other applied stresses, testing history of wall thickness, wear, and the like may be recorded, retrieved, and viewed. If desired, the pipe tub and/or catwalk may comprise sensors to automatically measure the length of each pipe. Thus, the operator in the van can automatically keep a pipe tally to determine accurate depths/lengths of the pipe string in the well bore. Torque sensors may be utilized and recorded so that the torque record shows that each connection was accurately aligned and properly torqued, and/or immediately detect/warn of any incorrectly made up connection.

Figure 3:
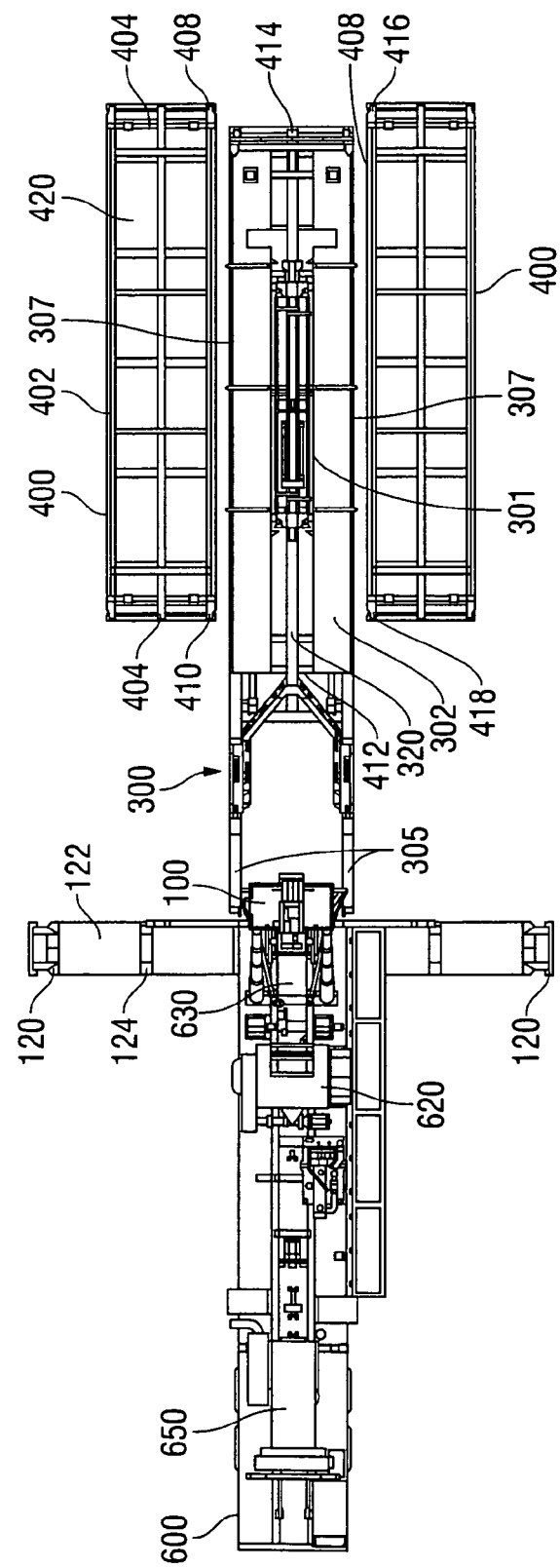
FIG. 3 is a plan view of the carrier, mast assembly, pipe arm, and pipe tub of the long lateral completion system of FIG. 1 in accord with one possible embodiment of the completion system of the present disclosure.

FIG. 3 is a plan view of one possible embodiment of carrier 600, mast assembly 100, catwalk-pipe arm assembly 300 and pipe tub 400 of the long lateral completion system 10 pursuant to one possible embodiment of the present invention. The carrier 600 is illustrated with the power plant 650 and the winch or drawworks assembly 620. The mast assembly 100 is disposed at a rear extremity of the carrier 600 and adjacent to the winch or drawworks assembly 620. In this embodiment, base beam 120 is disposed beneath and/or adjacent to the mast assembly 100 for providing security/stability for the mast assembly 100. Base beam 120 may comprise wide flat mats 122, (also shown in FIG. 2), which are pushed downwardly by base beam hydraulic actuators 612 (shown in FIG. 2 and better shown in FIG. 8A-A). In one possible embodiment, wide flat mats 122 may be 50 percent to 200 percent as wide as mast 100. Wide flat mats 122 may fold upon each other and/or extend telescopingly or slidingly outwardly from carrier 600 and/or hydraulically. Wide flat mats 122 may be slidingly supported on beam runner 124 and may be transported on carrier 600 or provided separately with other trucks.

In this embodiment, catwalk-pipe arm assembly 300 is affixed to mast assembly 100 and carrier 600 by rig to arm connectors 305 (also shown in FIG. 2). In this embodiment, catwalk-pipe arm assembly 300 is shown with a pipe tub 400 on both sides of the catwalk-pipe arm assembly 300. The pipe tubs 400 are shown with the side supports 402, the end support 404 and a cavity 420. A plurality of pipes (not illustrated) is placed in the pipe tubs 400. Pipes are displaced on to the catwalk-pipe arm assembly 300 and lifted up to the mast assembly 100. Catwalk 302 may be somewhat V-shaped or channeled to urge pipes to roll into the center for receipt and clamping utilizing catwalk-pipe arm assembly 300. Catwalk 302 provides a walkway surface for workers and the like. Additional pipe tubs 400 can be slid into place to provide for a continuum of pipe lengths for use by the completion system 10. Acoustic and/or laser and/or sensors or RFID transceivers 408 and 410 may be positioned on ends 404 and sides 402 of pipe tubs 400 or elsewhere as desired to measure and/or detect the lengths of the pipes, and to detect RFIDs, bar codes, and/or other indicators which may be mounted to the pipes. Alternatively, pipe length sensors 412, 414 may each comprise one or more sensors, which may be mounted to pipe arm 320. In one embodiment, sensors 412, 414 may comprise acoustic, electromagnetic, or light sensors which may be utilized to detect features such as length of the pipe. Pipe connection cleaning/grease injectors 416, 418 may be provided for wire brushing, grease injecting, thread protector removal and other automated functions, if desired.

In one embodiment, sensors 412, 414 may comprise thread protector sensors provided to ensure that the thread protectors have been removed from both ends of a pipe. Thread protectors are generally plastic or steel and used during transportation to prevent any damage to the threading of pipe. Damage as a result of faulty or damaged threads could jeopardize a well site and the safety of the workers therein. However, failing to remove a thread protector can cause the same potential dangers if not found before inserted into the pipe string. The pipe will not mate properly with the threads of the pipe string, comprising the integrity of the entire pipe string and well site. The thread protector sensors 412, 414 may be acoustic sensors or lasers used to determine whether the thread protectors have been removed and communicate this data with the control system. If the thread protectors are present, an acoustic or light signal transmitted by sensor 412 may be reflected rather than received at sensor 414. Alternatively, sensors 412 and 414 may be transceivers that will not receive a signal unless the thread protector is present. In another embodiment, a light detector will detect a different profile. In another embodiment, sensors 412 and 414 may comprise a camera in addition to other thread protector sensors. If the thread protectors have not been removed, an operator will be informed before attempting to make up the pipe connection so that the problem can be fixed.

In one possible embodiment, inner portion adjacent catwalk 302 and/or catwalk edges 301 and 307 may comprise gated feed compartments whereby pipes are fed into a compartment or funnel large enough for only single pipes or stands of pipes, and then gated to allow individual pipes or stands of pipes to be automatically rolled onto either side of catwalk 302.

Figure 4:
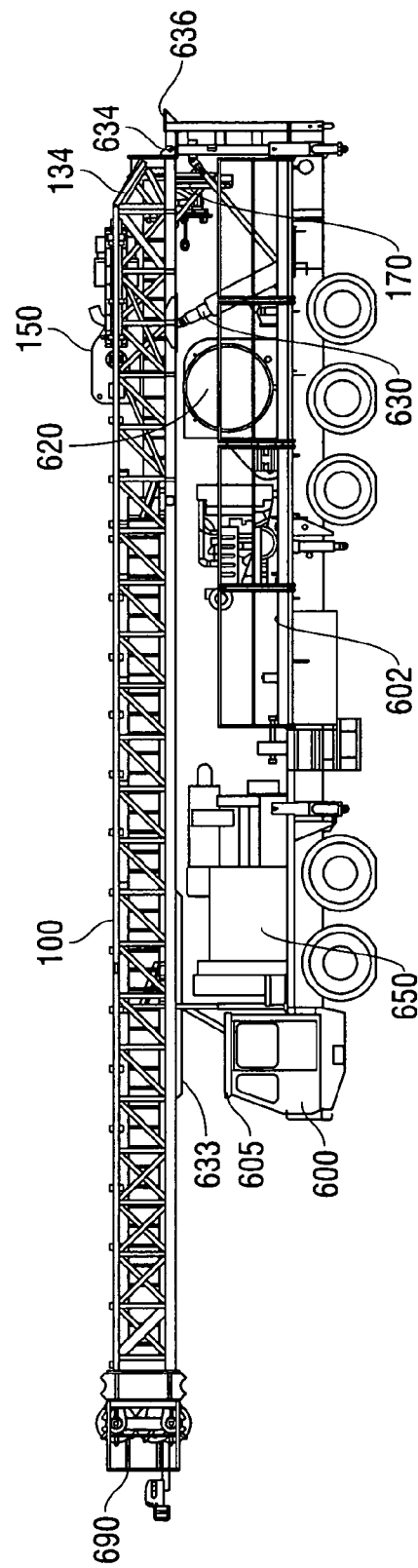
FIG. 4 is an illustration of the carrier of the long lateral completion system of FIG. 1 in accord with one possible embodiment of the completion system of the present disclosure.

FIG. 4 is an illustration of the carrier 600 of the long lateral completion system 10 of in accord with one possible embodiment of the completion system of the present disclosure. The carrier 600 is illustrated with the power plant 650 and the winch or drawworks assembly 620. Also, the mast assembly 100 is illustrated in a lowered or horizontal position, which is essentially parallel relationship with the carrier 600. Mast 100 is clamped into the generally horizontal position with carrier front clamp/support 633 above cab 605. Mast 100 is hinged at mast to carrier pivot 634 so that the mast is secured from any forward/reverse/side-to-side movement with respect to carrier 600 during transport after being clamped at the front and/or elsewhere. In this embodiment, mast positioning hydraulic actuators 630 are pivotally mounted with respect to carrier walkway 602 so that when extended, the hydraulic actuators 630 are angled toward the rear instead of toward the front of carrier 600 as in FIG. 4 (See for example FIG. 2). In one embodiment, mast positioning hydraulic actuators 630 may comprise multiple telescopingly connected sections as shown in FIG. 6A. The horizontally disposed mast assembly 100 is illustrated for moving on the highway and for arrangement in the proximate location with respect to a wellbore. It will be noted that hydraulic pipe tongs 170 are mounted to mast 100 so that when the mast 100 is lowered pipe tongs 170 are in a position generally perpendicular to the operational position. Movements and actuation of the pipe tongs can be fully automated, for forming and/or breaking both shoulder connections and collared connections. The mast assembly 100 has the crown 690 extending in front of the carrier 600. In one embodiment, rig carrier is less than 20 feet high, or less than 15 feet high, while still allowing the rig to work with well head equipment having a height of about 20 feet. This is due to the construction of the mast with the Y-frame connection as discussed herein. The rig floor can be adjusted to a convenient height and is not necessarily fixed in height. In an embodiment, the rig floor could be connected to snubbing jacks.

FIG. 4A-A is a top view taken along the line A-A in FIG. 4 of the mast assembly 100 of the long lateral completion system pursuant to one possible embodiment of the present invention. FIG. 4A-A illustrates a downward view of the mast assembly 100. The mast assembly 100 shows the top drive assembly or fixture 150 (also shown in FIG. 4) affixed to the portion of the mast assembly 100 over the winch or drawworks assembly 620 over the carrier 600. The top drive assembly or fixture 150 is provided at the location associated with the carrier 600 for distributing the load associated with the carrier 600 for easy transportation on the highway. Top drive or fixture 150 may be clamped or pinned into position with clamps or pins 162 or the like that are inserted into holes within mast 100 at the desired axial position along the length of mast 100. Angled struts 134 (also shown in FIG. 4) on Y-section 132, which may be utilized in one possible embodiment of mast 100, are illustrated in the plan view. Top drive 150 is shown with end 163, which may comprise a threaded connector and/or tubular guide member and/or pipe clamping elements and/or torque sensors and/or alignment sensors.

FIG. 4B-B is an end elevational view taken along the line B-B in FIG. 4 of the carrier 600 and the mast assembly 100 of the long lateral completion system 10 of in accord with one possible embodiment of the completion system of the present disclosure. FIG. 4B-B illustrates the carrier 600, the winch or drawworks assembly 620 and the top drive 150. In this view, vertical top drive guide rails 104 are shown, upon which top drive 150 is guided, as discussed hereinafter. In this embodiment, it will also be noted that top drive threaded connector and/or guide member and/or clamp portion 163 is positioned in the plane defined between vertical top drive guide rails 104. In this embodiment, the view also shows one or more angled struts 134, which may comprise Y section 132 of one possible embodiment of mast 100, which is discussed in more detail with respect to FIG. 6A.

Figure 5:
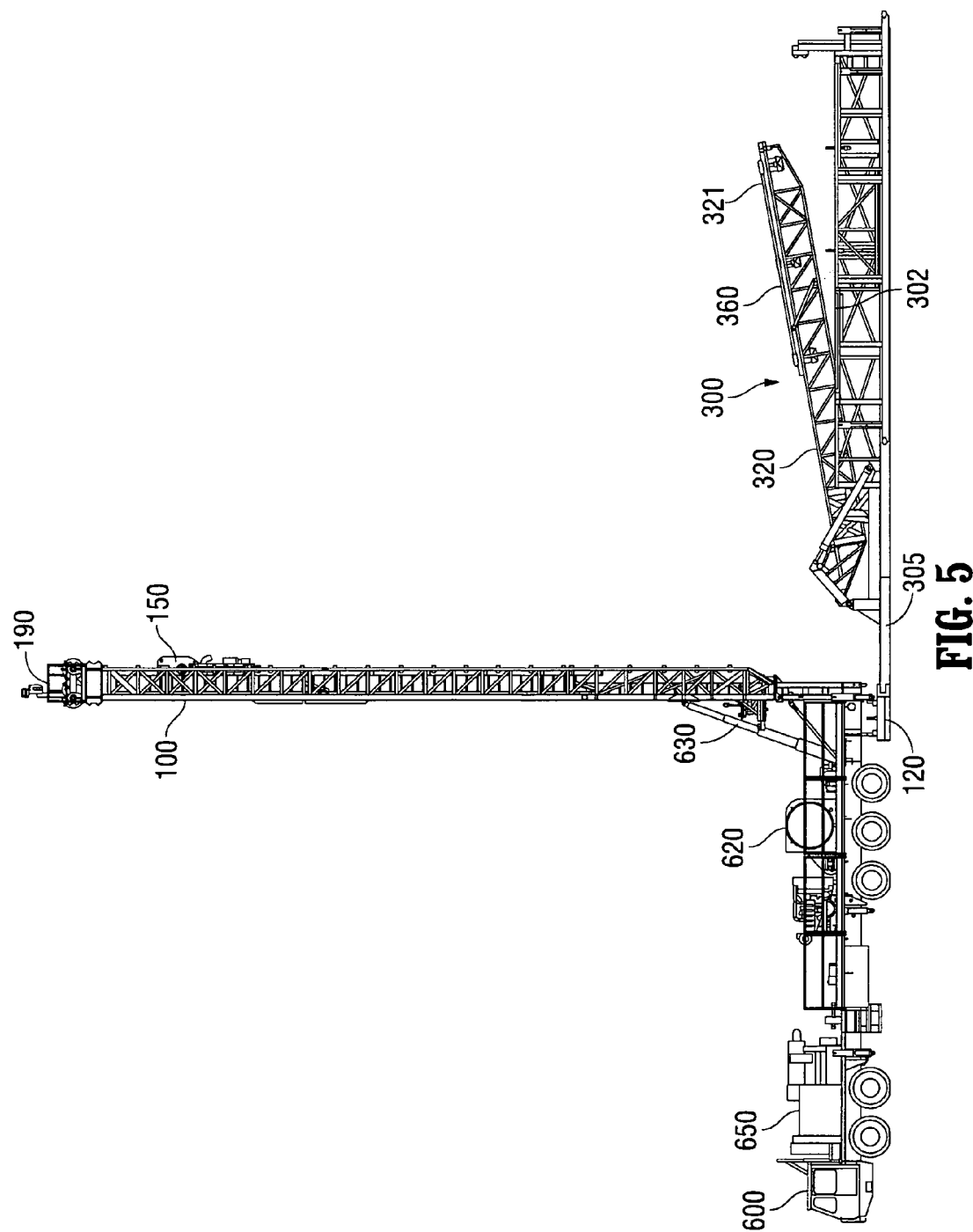
FIG. 5 is an elevation view of the carrier, the mast assembly, the pipe arm and the pipe tubs of the long lateral completion system of FIG. 1 in accord with one possible embodiment of the completion system of the present disclosure.

FIG. 5 is an elevation view of the carrier 600, the mast assembly 100, and the catwalk-pipe arm assembly 300 of the long lateral completion system 10 with respect to one possible embodiment of the present invention. The carrier 600 is illustrated with the power plant 650 and the winch or drawworks assembly 620. The cable from drawworks 620 to crown 190 is not shown but may remain connected during transportation and raising of mast 100. The drawworks cable may be pulled from drawworks 620 as mast 100 is raised. The mast assembly is illustrated engaged at the rear extremity of the carrier 600. The mast assembly 100 is in a vertical arrangement such that it is at an essentially perpendicular relationship with the carrier 600. The mast assembly 100 is illustrated with the top drive 150 in an upper position near the crown 190. The pivotal pipe arm 320 is shown in an angled disposition slightly above catwalk 302 for clarity of view. Pivotal pipe arm 320 is shown with pipe 321 clamped thereto. The catwalk-pipe arm assembly 300 is engaged or connected via rig to arm assembly connectors 305 with the carrier 600 and the mast assembly 100. Rig to arm assembly connectors 305 provide that the spacing arrangement between pivotal pipe arm 320 and mast 100 and/or carrier 600 is affixed so the spacing does not change during operation. Rig to arm assembly connectors 305 may comprise hydraulic operators for precise positioning of the spacing between mast 100 and pivotal pipe arm 320, if desired.

Figure 5A:
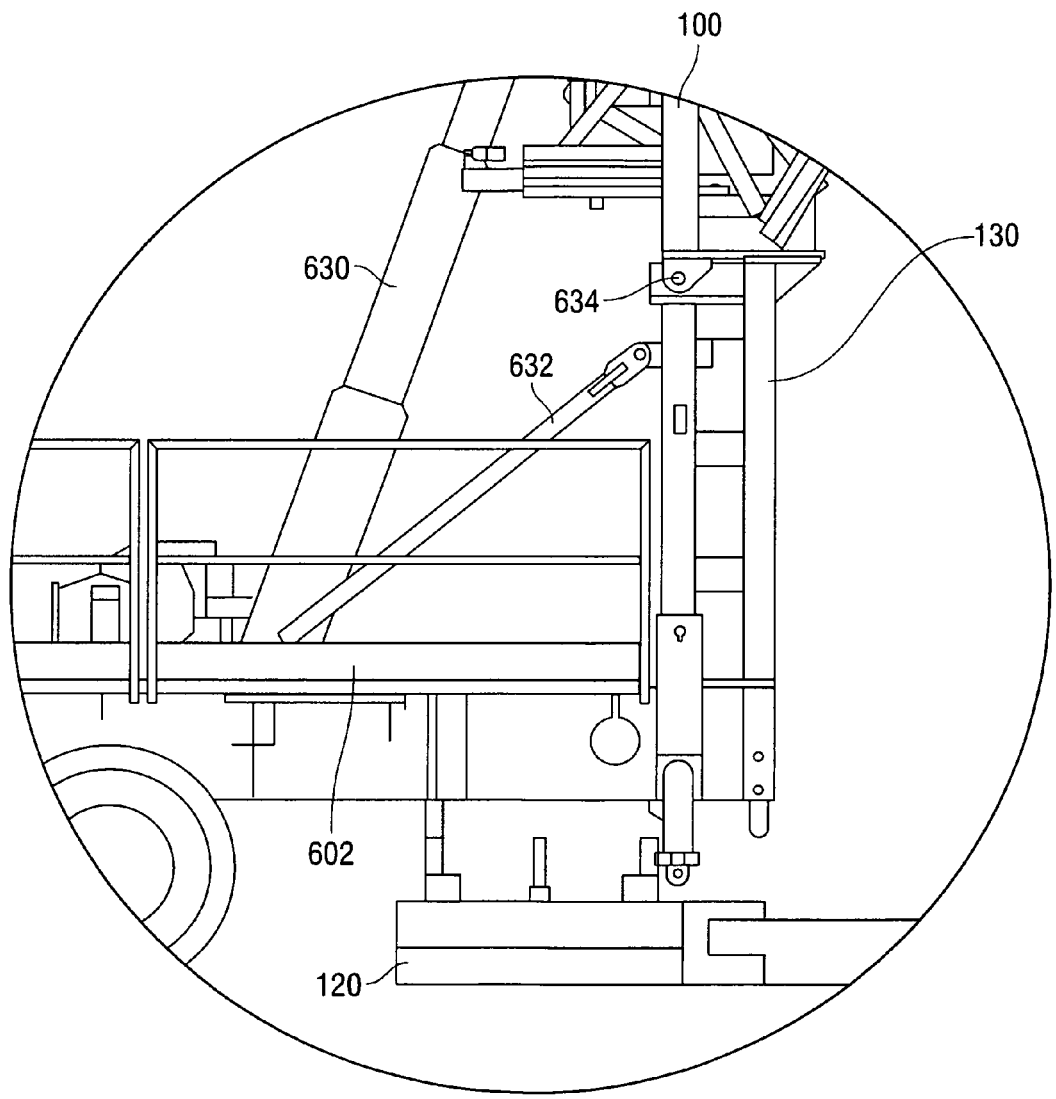
FIG. 5A is an enlarged or detailed view of the section identified in FIG. 5 as "A" of the rear portion of the carrier engaged with a skid of the depicted long lateral completion system in accord with one possible embodiment of the completion system of the present disclosure.

FIG. 5A is an enlarged or detailed view of a section shown in FIG. 5 as the rear portion of the carrier 600 engaged with a skid or mast support base beam 120 of the long lateral completion system 10 with respect to one possible embodiment of the present invention. Mast positioning hydraulic actuators 630 are provided for lowering and raising the mast assembly 100 with respect to the carrier 600, about mast to carrier pivot connection 634. Brace 632 for Y-base or support section 130 provides additional support for mast 100.

Figure 6:
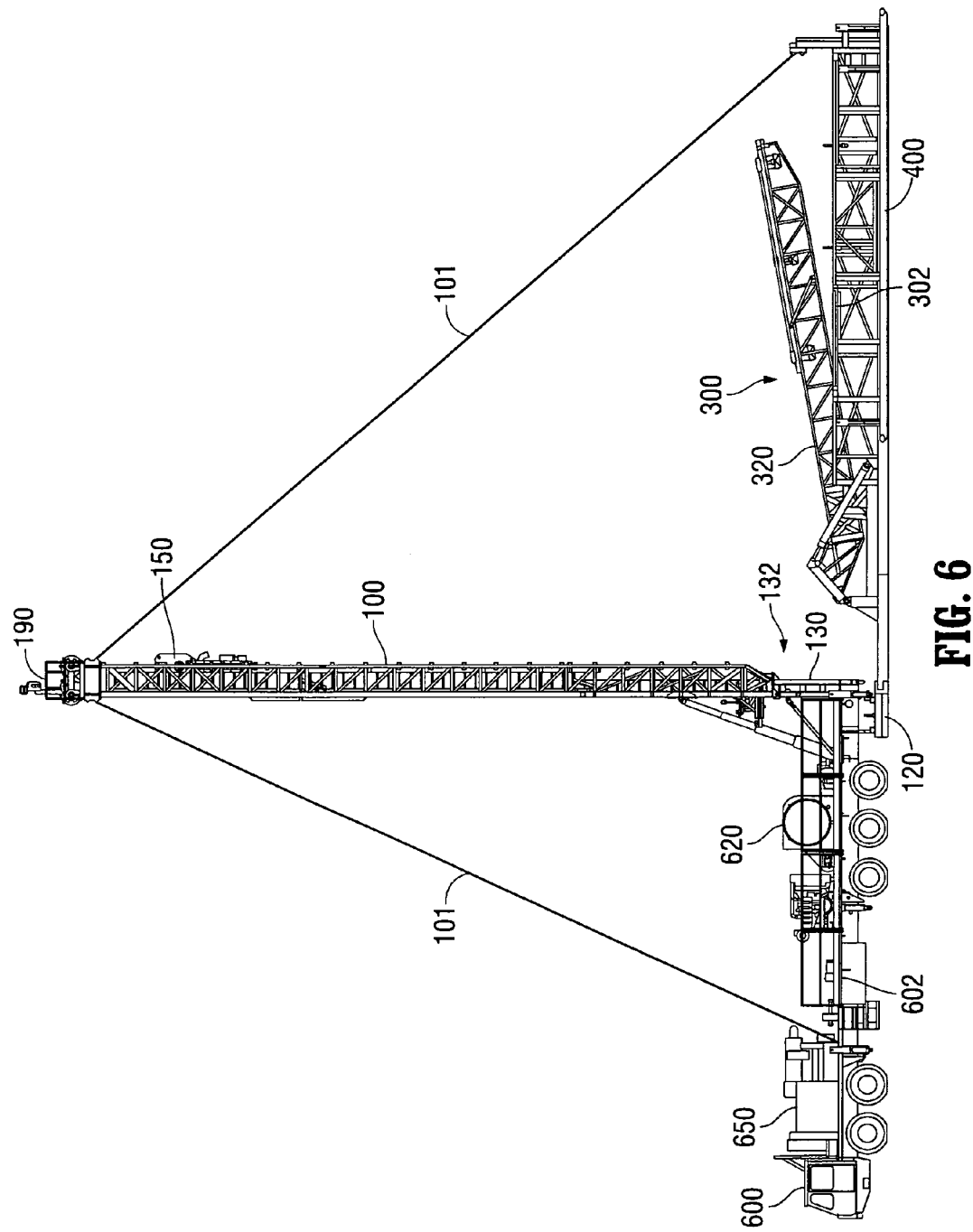
FIG. 6 illustrates an elevation view of the completion system of FIG. 1 with the mast assembly extended in a perpendicular relationship with the carrier and the pipe tubs in accord with one possible embodiment of the completion system of the present disclosure.
Figure 6A:
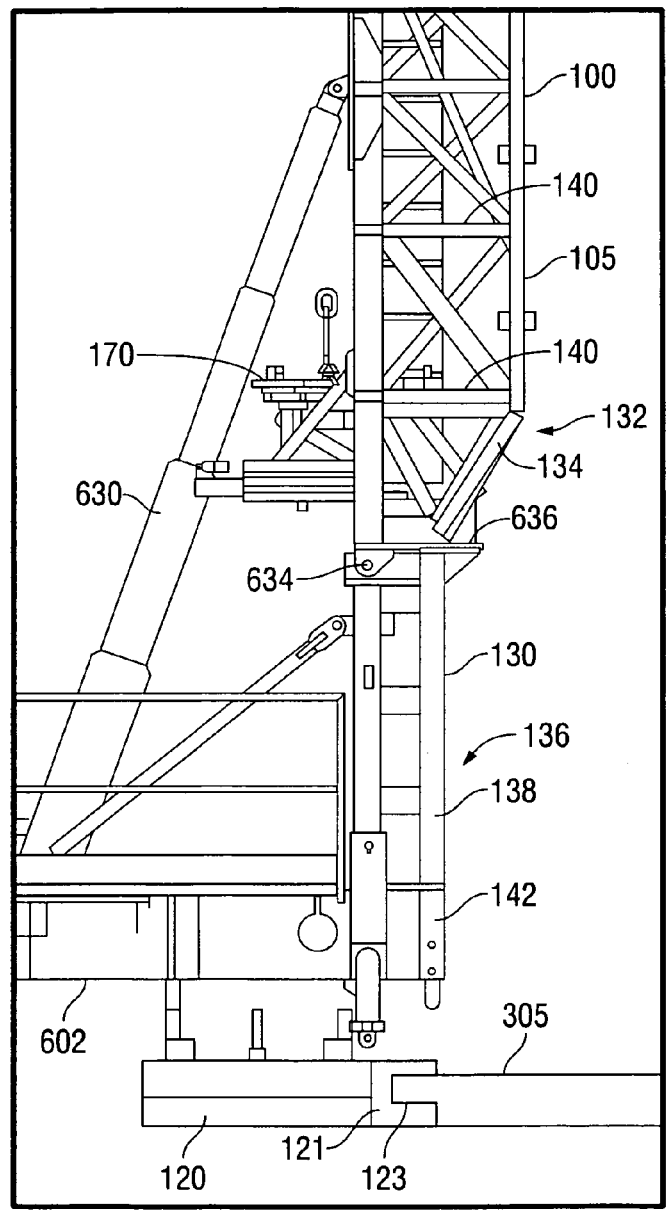
FIG. 6A is an enlarged or detailed view of the portion of FIG. 6 indicated as section "A" illustrating the relationship of the mast assembly, the deck and the base beam in accord with one possible embodiment of the completion system of the present disclosure.

FIG. 6 illustrates the completion system 10 in a side elevational view with the mast assembly 100 extended in a perpendicular relationship with the carrier 600 and the pipe tubs 400 of the long lateral completion system 10 with respect to one possible embodiment of the present invention. The pivotal pipe arm 320 is angularly disposed with respect to the catwalk 302. The mast assembly 100 is illustrated with the top drive 150 slightly below the crown 190. Alternately, and not required in practicing the present disclosure, guy wires 101 can be engaged between the crown 190 of the mast assembly 100 and the carrier 600 on one extreme and the remote portion of a pipe tube 400 on the other extreme. However, one or more guy wires could be anchored to the ground and/or may not be utilized. One or more guy wires can also be secured to the ends of base beam 120. It can be appreciated that the rigidity of the mast assembly 100 with respect to the carrier 600 and the base beam 120 does not require guy wires 101. However, it may be appropriate in a particular situation or in severe weather conditions to adapt the present disclosure for use with such guy wires 101. The carrier is illustrated with the power plant 650 and the winch or drawworks assembly 620 on the carrier deck 602.

FIG. 6A is an enlarged or detailed view of the portion of FIG. 6 illustrating the relationship of the mast assembly 100, the deck 602 and the base beam 120 of the long lateral completion system 10 with respect to one possible embodiment of the present invention. FIG. 6A shows the relationship of the mast assembly 100, the deck 602 of the carrier 600 and the base beam 120. It will be noted that base beam widening sections 121 may extend or slide outwardly from base beam 120 and be pinned into position with pin 123. Also illustrated is what may comprise multiple segments of mast positioning hydraulic actuators 630 for angularly disposing the mast assembly 100 in a proximately perpendicular relationship with the carrier 600, and aligned with respect to the well bore, as discussed hereinbefore. Above the deck 602 of the carrier and affixed with the mast assembly 100 is a hydraulic pipe tong 170. The hydraulic pipe tong 170 is usable for handling the pipe as it is placed into a well, e.g., by receiving joints of pipe from the pipe arm and/or the top drive. The lower extremity of the mast assembly 100 includes a y-base 130, which defines a recessed region above the wellbore at the base of the mast assembly 100, for accommodating a blowout preventer stack, snubbing equipment, and/or other wellhead components. The recessed region enables the generally vertical mast assembly 100 to be positioned directly over a wellbore without causing undesirable contact between blowout preventers and/or other wellhead components and the mast assembly 100.

Figure 11B:
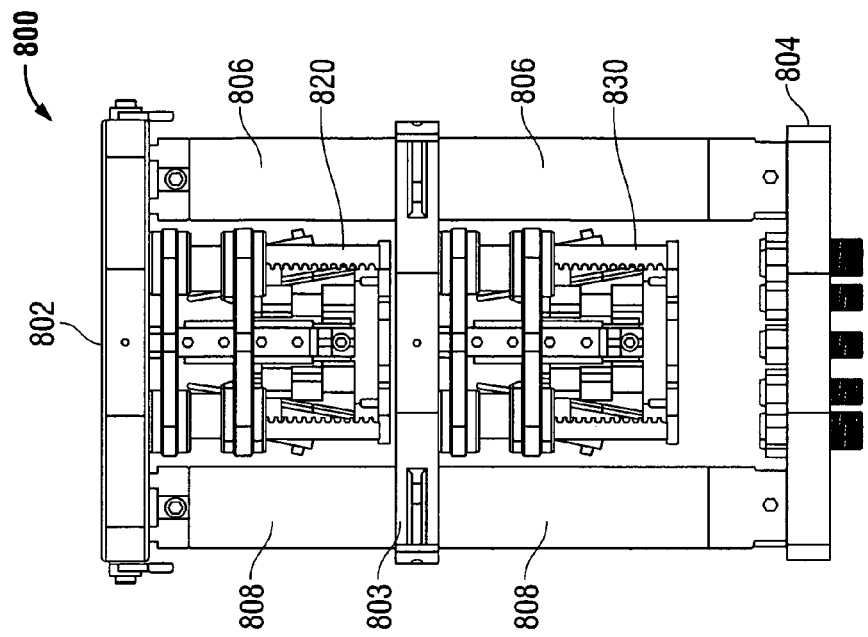
FIG. 11A, FIG. 11B, FIG. 11C, and FIG. 11D illustrate an embodiment of a compact snubbing unit usable in accord with one possible embodiment of the completion system of the present disclosure.
Figure 11A:
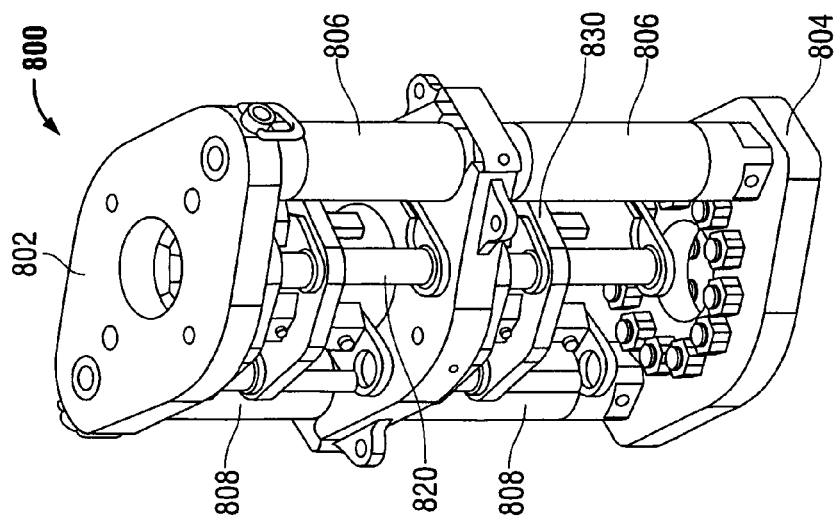
Figure 11D:
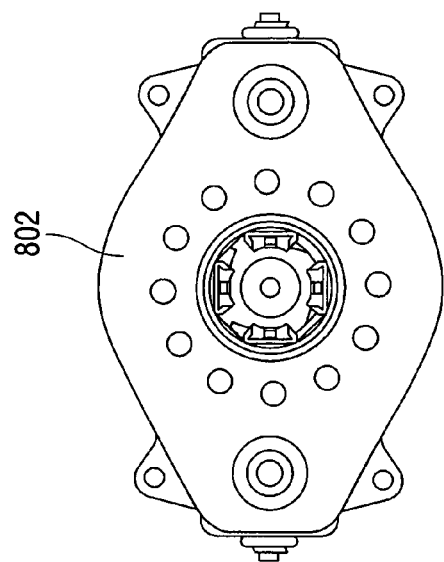
Figure 11C:
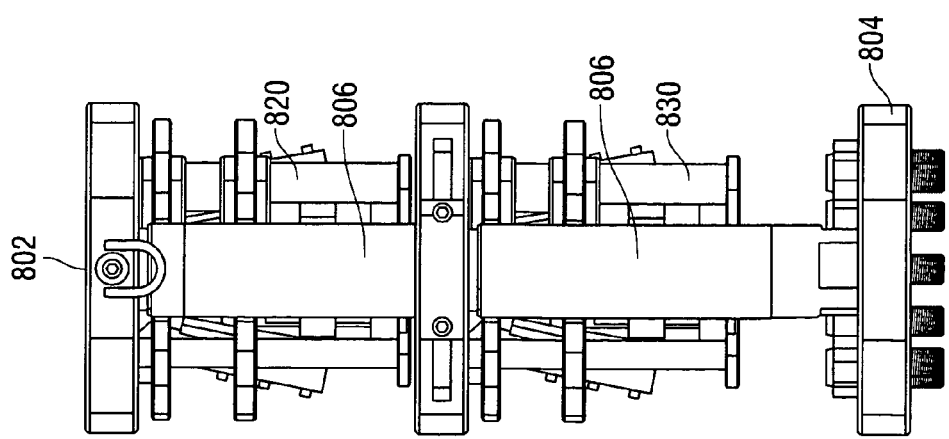

The lower extremity of the mast assembly 100 is defined by the y-base 130. The y-base 130 provides a disposed arrangement for making and inserting pipe using the completion system 10 in accord with one possible embodiment of the completion system of the present invention. Y-base 130 supports Y section 132, which extends angularly with angled strut 134 out to support one side of mast 100. This construction provides an opening or space 136 for the BOP assembly, such as BOP (see FIG. 9), snubbing unit (see FIG. 11A), Christmas tree, well head, and/or other pressure control equipment. Mast 100 is supported by carrier to mast pivot connection 634 and at the carrier 600 rear most position by mast support plate 636 (also shown in FIG. 4). Mast support plate 636 may be shimmed, if desired. In another embodiment, mast support plate may be mounted to be slightly moveable upwardly or downwardly with hydraulic controls to support the desired angle of mast 100, which as discussed above may be oriented to a desired angle (e.g. less than five degrees or in another embodiment less than one degree) with respect to the axis of the bore of the well bore and/or bore of BOP 900, shown in FIG. 9. In this embodiment, mast support plate 636 does not extend horizontally and rearwardly from carrier 600 as far as the other mast 100 horizontal supports, e.g., horizontal mast supports or struts 140. This construction allows the opening or space 136 for the BOP (see FIG. 9), snubbing unit (see FIG. 11A), Christmas tree, well head, and/or other pressure control equipment. However, the mast construction is not intended to be limited to this arrangement.

In other words, Y-base 130 back most rail 138 is horizontally offset closer to carrier 600 than back most vertical mast supports 105 with respect to carrier 600. Y-base 130 is sufficiently tall to allow BOP stacks to fit within opening or space 136. However, Y-base 130 is replaceable and may be replaced with a higher or shorter Y-base as desired. to accommodate the desired height of any pressure control and/or well head equipment. In this example, the bottoms of Y-base 130 may be replaceably inserted/removed from Y-base receptacles 142 to allow for easy removal/replacement of Y-base 130 from carrier 600.

As discussed hereinafter, vertical mast supports 105 support vertical top drive guide rails 104 (see FIG. 4 B-B and FIG. 8 B-B), which guide top drive 150. An optional raiseable/lowerable rig floor, such as rig floor 102 (See FIG. 1) is not shown for viewing convenience.

Figure 7:
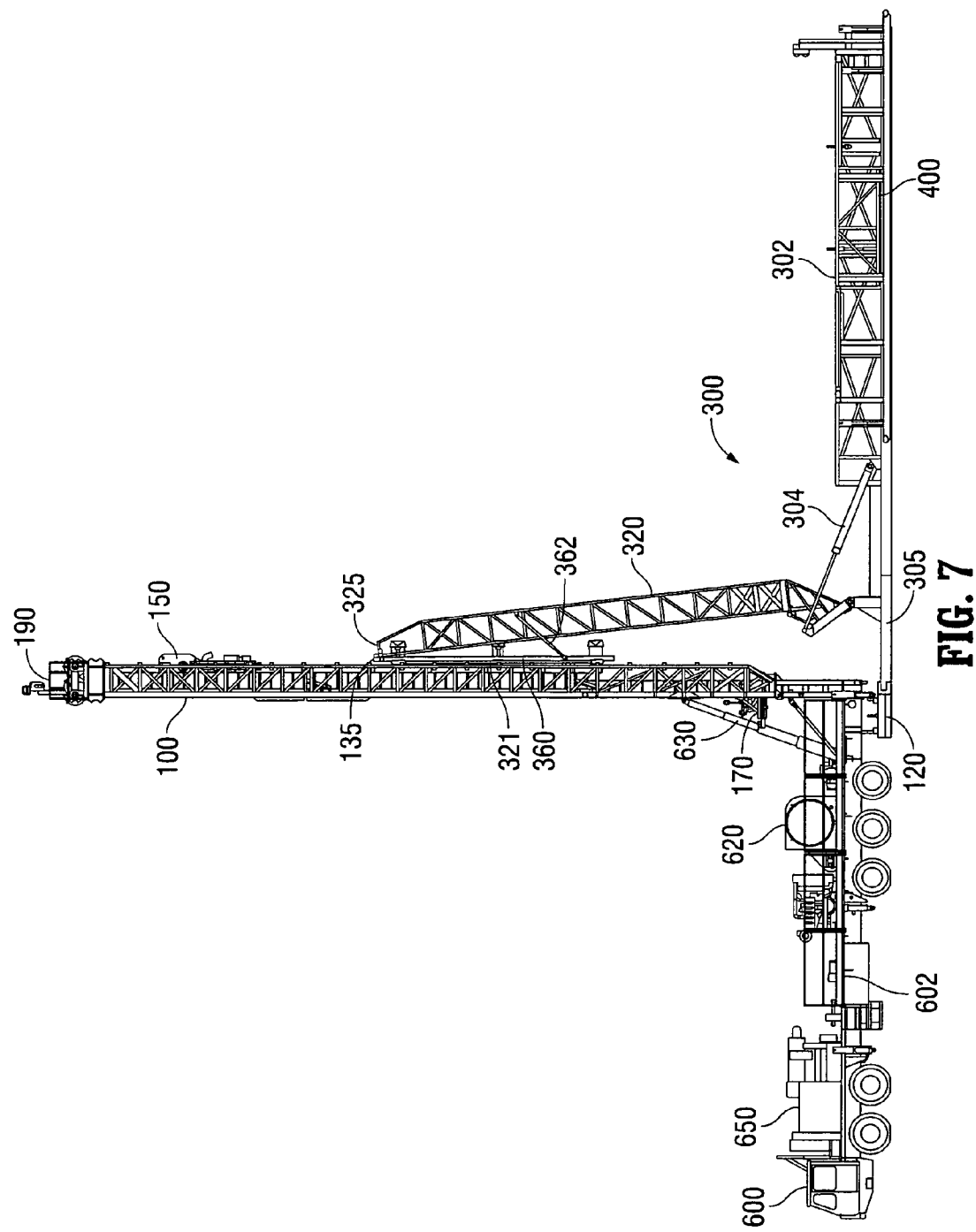
FIG. 7 is an elevation view of the carrier, the mast assembly, the pipe arm, and the pipe tub of FIG. 1, with the mast assembly shown in a perpendicular relationship with the carrier, and the pipe arm engaged with the mast in accord with one possible embodiment of the completion system of the present disclosure.

FIG. 7 is a side elevational view of the carrier 600, the mast assembly 100, the catwalk-pipe arm assembly 300, and the pipe tub 400 with the mast assembly 100 (e.g., transporting a joint of pipe to the mast assembly 100 for engagement by the top drive) in a perpendicular relationship with the carrier 600, and an arm to mast engagement element 325 of the pivotal pipe arm 320 engaged with optional upper mast fixture 135 on mast assembly 100 of the long lateral completion system 10 with respect to one possible embodiment of the present disclosure. The engagement of elements 325 and 135 may be utilized to provide an initial alignment of the pivotal connection of kick out arm 360 to pivotal pipe arm 320. Kick out arm 360 is shown pivotally rotated to a vertical position so that pipe 321 is aligned for connection with top drive 150, as discussed hereinafter. The carrier 600 is illustrated with the winch assembly 620 on the deck 602. The depicted hydraulic actuator 630 has raised the mast assembly 100 into its vertical position, as discussed hereinbefore. The mast assembly 100 is illustrated with the top drive 150 near the crown 190. The kickout arm 360 of the catwalk-pipe arm assembly 300 may be more accurately vertically placed in the extended position adjacent to the mast assembly 100, having a kickout arm 360 in association therewith. As such, when the pipe arm 320 pivots into the position shown in FIG. 7 (e.g., using the hydraulic cylinder 304), the pipe arm 320 is not parallel with the mast assembly 100, thus a joint of pipe engaged with the pipe arm 320 would not be positioned suitably for engagement with the top drive 150. The kickout arm 360 is extendable from the pipe arm 320 into a position that is generally parallel with the mast assembly 100, e.g., by use of a hydraulic actuator 362. Using the kickout arm 360, the pipe 321 is placed in the position which is essentially parallel with the mast assembly 100, and in this embodiment is positioned in the plane defined by mast rails 104 (See FIG. 4B-B), which guide top drive 150, by use of the hydraulic actuator 362. The movement of the pivotal pipe arm 320 is provided by the hydraulic actuator 304.

In one possible embodiment, the upright position of pivotal pipe arm 320 is controlled by angular sensors 325 and/or shaft position sensors 326 (see FIG. 16A) to account for any variations in hydraulic operator 304 operation.

Alternatively, or in addition, upper mast fixture 135 may comprise a receptacle and guide structure. In this embodiment, which may be provided to guide the top of pivotal pipe arm 320 into contact with mast 100, whereby the same vertical/side-to-side positioning of kick out arm 360 is assured in the horizontal and vertical directions. The guide elements may, if desired, comprise a funnel structure that guides arm to mast engagement element 325 into a relatively close fitting arrangement. If desired, a clamp and/or moveable pin element (with mating hole in pivotal pipe arm) may be utilized to pin and/or clamp pivotal pipe arm 320 into the same position for each operation. In another embodiment upper mast fixture may comprise a hydraulically operated clamp with moveable elements that clamp the pipe in a desired position for aligned engagement with top drive threaded connector and/or guide member and/or clamp portion 163. As shown in FIG. 7A-A, upper fixture 135 may also comprise one or more pipe alignment guide members/clamps/supports as indicated at 139 to position pipe 321 and/or kickout arm 360 to thereby align pipe 321 and pipe connector 323 with respect to top drive threaded connector and/or guide member and/or clamp portion 163. Element 139 may comprise a moveable hydraulic clamp or guide to affix and align the pipe in a particular position. Element 139 may instead comprise a fixed groove or slot or guide and may be hydraulically moveable to a laser aligned position.

As a result, top connector 323 on tubing pipe 321 is aligned to top drive threaded connector and/or guide member and/or clamp portion 163, as discussed in more detail hereinafter, by consistent positioning of kick out arm 360. It will be appreciated that rig to arm connectors 305 further aid alignment by insuring that the distance between catwalk-pipe arm assembly 300 and mast 100 remains constant.

FIG. 7A-A is a rear elevational view of FIG. 7 showing the mast assembly 100 and top drive 150 of the long lateral completion system 10 with respect to one possible embodiment of the present disclosure. FIG. 7A-A illustrates the portion of the mast assembly 100, which includes the top drive 150, and the upper portion of the pivotal pipe arm 320. Also illustrated are the lattice structural support elements 112 of the mast assembly 100. The top drive 150 is shown secured within a top drive fixture/carrier 151, which can be moved vertically along the mast assembly 100, e.g., via a rail/track-in-channel engagement using rollers, bearings, etc. Due to the generally vertical orientation of the mast assembly 100, and the positioning of the mast assembly 100 directly over the wellbore, the top drive 150 can be directly engaged with the mast assembly 100, via the top drive fixture 151, as shown, rather than requiring use of conventional cables, traveling blocks, and other features required when an angled mast is used. Engagement between the top drive 150 and the mast assembly 100 via the top drive fixture 151 eliminates the need for a conventional cable-based torque arm. Contact between the top drive 150 and the fixture 151 prevents undesired rotation and/or torqueing of the top drive 150 entirely, using the structure of the mast assembly 100 to resist the torque forces normally imparted to the top drive 150 during operation.

FIG. 7B is a perspective view of the portion of the mast assembly 100 and pivotal pipe arm 320 with clamps 370B engaged with upper fixture 135 as illustrated in FIG. 7A-A of the long lateral completion system 10 with respect to one possible embodiment of the present invention. The mast assembly 100 is illustrated with the top drive 150 positioned a selected distance the pipe arm 300.

Figure 8:
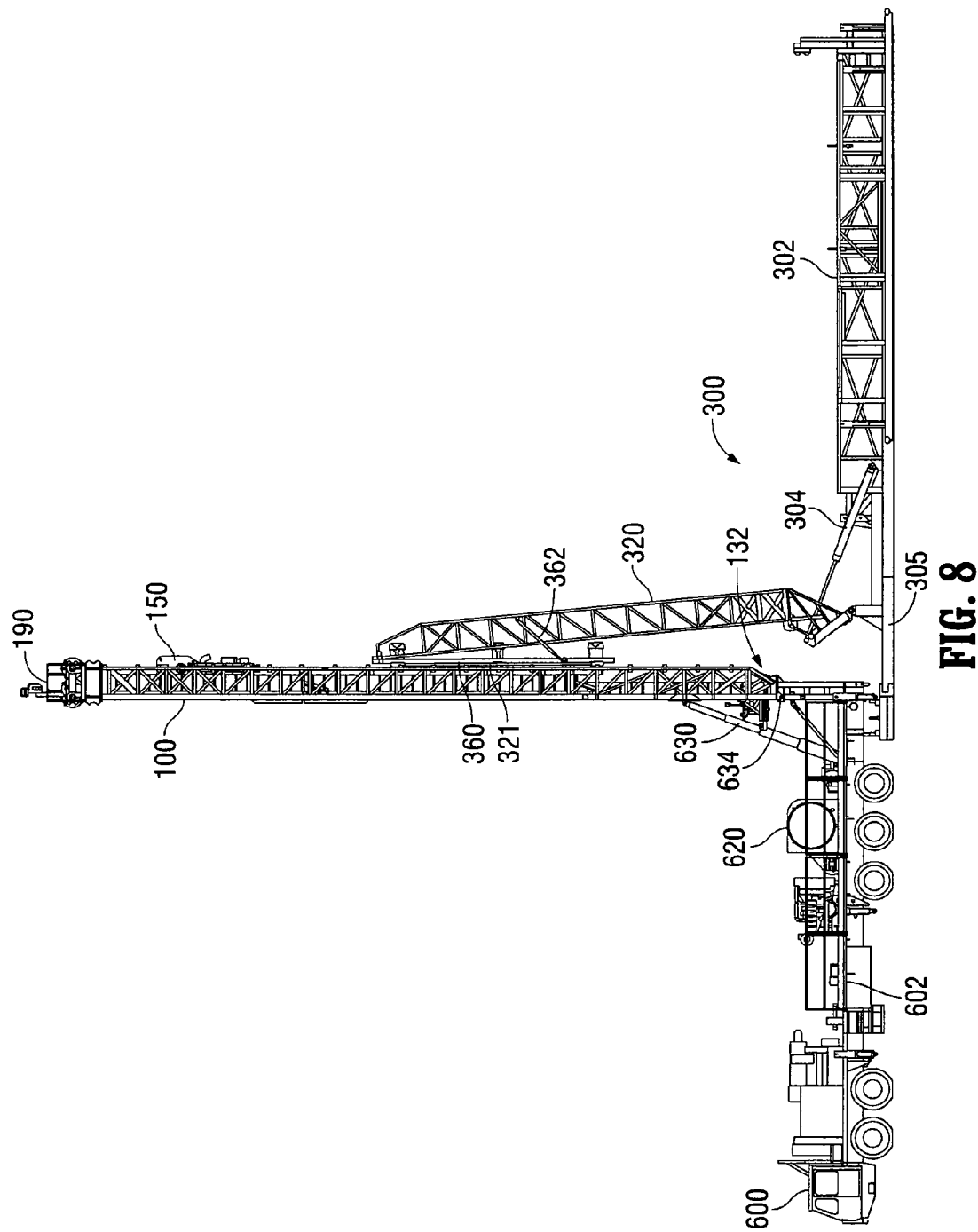
FIG. 8 is an elevation view of the completion system of FIG. 1 illustrating the mast assembly in a perpendicular relationship with the carrier, including the use of a hydraulic pipe tong in accord with one possible embodiment of the completion system of the present disclosure.

FIG. 8 is a side elevational view of the completion system 10 in accord with another embodiment of the present disclosure illustrating the mast assembly 100 in a perpendicular relationship with the carrier 600 and/or aligned with an axis of the upper portion of the wellbore. The carrier 600 is shown with the deck 602 and the mast positioning hydraulic actuators 630 providing movement for the mast assembly 100 mast to carrier pivot connection 634. The mast assembly 100 has the top drive 150 disposed proximate to the crown 190. As discussed hereinafter, crown 190 may comprise multiple pulleys that are utilized to raise and lower the blocks associated with top drive 150 utilizing drawworks 620. The pipe arm 320 is extended in an upward position using the pipe arm hydraulic actuator 304. Further, the kickout arm 360 is disposed in a parallel relationship with the mast assembly 100 using the kick out arm hydraulic alignment actuator 362 to align pipe 321 appropriately with respect to the mast assembly 100, e.g., in one embodiment the pipe is positioned in the plane defined between mast top drive rails 104. Mast top drive rails 104

(shown in FIG. 8B-B) are secured to an inner portion of the two rear most (with respect to carrier 600) vertical supports 105 of mast 100.

FIG. 8A-A shows another view of Y section 132, which comprises one or more angled struts 134 on each side of mast 100 utilized to support vertical mast supports 105. Pipe tong 170 is aligned within the plane between guide rails 104 to thereby be aligned with top drive threaded connector and/or guide member and/or clamp portion 163 (see FIG. 8B-B and FIG. 4B-B) of top drive 150

FIG. 8B-B is a rear elevational view of the mast assembly 100 and top drive 150 of the long lateral completion system 10 (shown in FIG. 8) with respect to one possible embodiment of the present invention. FIG. 8B-B illustrates the relationship of pivotal pipe arm 320, the top drive 150 and the mast assembly 100. Further, the lattice support structure 112 is illustrated for providing superior rigidity to and for the mast assembly 100.

FIG. 8C is a perspective view of FIG. 8B-B of the relationship between the pivotal pipe arm 320 and the top drive 150 relative to the mast assembly 100 of the long lateral completion system with respect to one possible embodiment of the present invention. Also illustrated is the pipe clamp 370 associated with the pivotal pipe arm 300 for holding a joint of pipe. In an embodiment, a joint of pipe raised by the pipe arm 300 then extended using the kickout arm 360 may require additional stabilization prior to threading the pipe joint to the top drive. Additional pipe clamps along the mast assembly 100 can be used to receive and engage the joint of pipe while the pipe clamp 370 of the pipe arm 300 is released, and to maintain the pipe directly beneath the top drive 150 for engagement therewith.

Returning again to FIG. 8A-A, the figure depicts a sectional view of FIG. showing the pipe tong 170 with respect to the mast assembly 100 of the long lateral completion system with respect to one possible embodiment of the present invention. FIG. 8A-A illustrates the relationship of the hydraulic pipe tong 170 with respect to the mast assembly 100 and the base beam 120. The mast assembly 100 is supported by braces 112. The braces 112 can be at various locations about the system 10 as one skilled in the art would appreciate.

Figure 9:
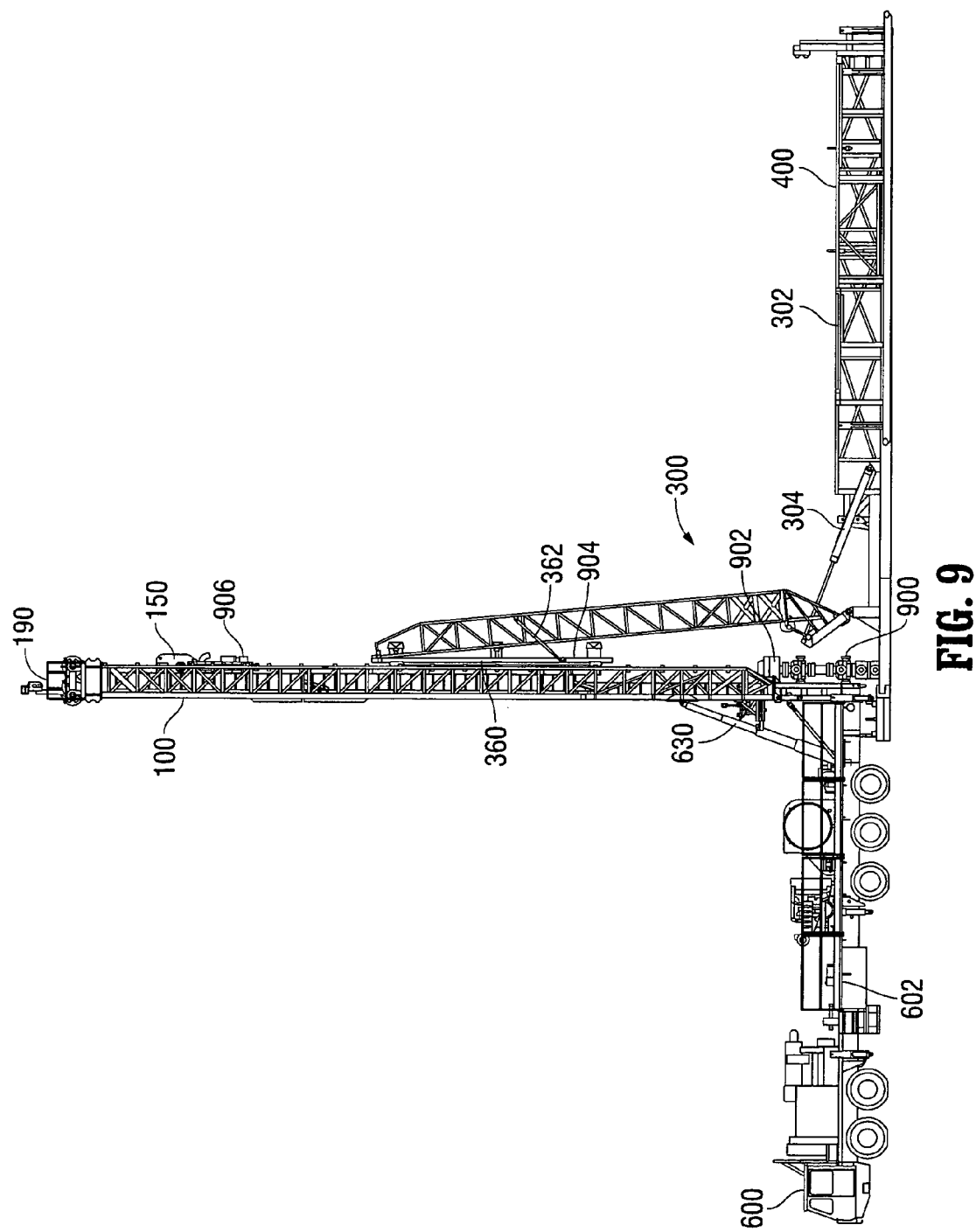
FIG. 9 is an illustration of the long lateral completion system of FIG. 1, depicting the relationship between the carrier, the mast assembly, the pipe arm, the pipe tubs and a blowout preventer in accord with one possible embodiment of the completion system of the present disclosure.

FIG. 9 is an illustration of the long lateral completion system 10 of the present enclosure that depicts an embodied relationship of the carrier 600, the mast assembly 100, catwalk-pipe arm assembly 300, the catwalk 302 and a blowout preventer and snubbing stack 900 of the long lateral completion system 10 with respect to one possible embodiment of the present disclosure. As described previously, the mast assembly 100 is disposed in a generally vertical orientation (e.g., perpendicular to the earth's surface and/or the deck 602), such that the mast assembly 100 is directly above the blowout prevent and snubbing stack 900 with the wellbore therebelow. The recessed region at the base of the mast assembly 100 accommodates the blowout preventer and snubbing stack 900, while the top drive 150 disposed near the crown 190 of the mast assembly 100 can move vertically along the mast assembly 100 while remaining directly over the well.

The mast assembly 100 can be moved and maintained in position by the hydraulic actuators 630 and/or other supports. The pipe arm 300 can be moved and maintained in the depicted raised position via extension of the hydraulic actuator 304. The kickout arm 360 pivots from the top of pivotal pipe arm using the hydraulic system 362 for aligning a joint of pipe in alignment with the well and BOP and snubbing stack 900, which may utilize sensors 902, 904, 906, 908, for example, laser alignment sensors 902 mounted on BOP and snubbing stack 900, 904 on kickout arm 360, and/or laser alignment sensors 906 on top drive 150. It should be appreciated that the kick-out arm can be extended or retracted through the use of hydraulic system 362 and may be connected through manual actuation of hydraulic/pneumatics or through an electronic control system, which maybe be operated through a control van or remotely through an Internet connection. This particular embodiment implements the use of a kick-out arm 360 to provide a substantially vertical joint of pipe for reception by the mast assembly 100, which may include a top drive of some configuration. It is important that the joint of pipe be substantially vertical so that the threads on each joint are not cross-threaded when the connection to the top drive is made. Cross-threading can lead to catastrophic failure of the connected joints of pipe or damage the threads of the joint of pipe and render the joint of pipe unusable without extensive and costly repair. As mentioned above, the pipe arm 300 can further include a centering guide, which is capable of mating with a centering receiver located on the mast assembly 100. This centering guide and centering receiver, when used provides an additional point of contact between the pipe arm 300 and the mast assembly 100 providing additional stability to the system and more precise placement and orientation of the pipe arm and joints of pipe.

FIG. 9A-A is a sectional view of FIG. 9 illustrating the upper portion of the mast assembly 100 of the long lateral completion system 10 with respect to one possible embodiment of the present invention. One possible embodiment of the relationship of the pipe arm 300 and the clamp 370 is shown. Also, the lattice support 112 for providing rigidity for the mast assembly 100 is illustrated. The top drive 150 is retained by the fixture 151, which is moveably disposed along the mast assembly 100.

FIG. 9B-B is a perspective view of the upper portion of the mast assembly 100 as illustrated in FIG. 9A-A, showing the top drive 150 and the upper mast fixture 135 of the long lateral completion system with respect to one possible embodiment of the present invention. The pipe arm 300 is shown below the top drive 150. The pipe clamp 370 enables removable engagement between pipe arm 300, and a joint of pipe, which said joint of pipe is engaged by the top drive 150, and alternately one or more clamps or similar means of engagement along the mast assembly 100, or other engagement systems associated with the mast assembly 100 and/or the top drive 150, can be used to assist with the transfer of the joint of pipe from the pipe arm 300 to the top drive 150.

FIG. 9C-C is a sectional view of FIG. 9 illustrating the relationship of the blowout preventer and snubbing stack 900 with respect to the completion system 10 of one possible embodiment of the present invention. The blowout preventer and snubbing stack 900 is shown directly underneath the mast assembly 100, and thus directly adjacent to the rig carrier, such that the hydraulic pipe tong 170 can be operatively associated with joints of pipe added to or removed from a string within the wellbore. The mast assembly 100 can be secured using the adjustable braces 612 attached to the base plate 120. As another example, mast top drive guide rails 104, which guide top drive 150 may be aligned to be essentially parallel to the axis of the bore of BOP, within less than five degrees in one embodiment, or less than three degrees, or less than one degree in another embodiment. Accordingly, top drive threaded connector and/or guide member and/or clamp portion 163 (See FIG. 4B-B) is also aligned to move up and down mast 100 essentially parallel or coaxial to the axis of the bore of BOP, within less than five degrees in one embodiment, or less than three degrees, or less than one degree in another embodiment. The blowout preventor and/or other pressure equipment may comprise pipe clamps and seals to clamp and/or seal around pipe as is well known in the art. As discussed hereinafter, a snubbing jack may comprise additional clamps and hydraulic arms for moving pipe into and out of a well under pressure, which is especially important when the pipe string in the hole weighs less than the force of the well pressure acting on the pipe, which would otherwise cause the pipe to be blown out of the well.

Specifically, the blowout preventer of the BOP and snubbing stack 900 is shown having a first set of rams 1012 positioned beneath a second set of rams 1014, the rams 1012, 1014 usable to shear and/or close about a tubular string, and/or to close the wellbore below, such as during emergent situations (e.g., blowouts or other instances of increased pressure in the wellbore). Above the first and second set of rams 1012, 1014, a snubbing assembly can be positioned, which is shown including a lower ram assembly 1016 positioned above the rams 1014, a spool 1018 positioned above the lower ram assembly 1014, an upper ram assembly 1020 positioned above the spool 1018, and an annular blowout preventer 1022 positioned above the upper ram assembly 1018. In an embodiment, the upper and lower ram assemblies 1020, 1016 and/or the annular blowout preventer 1022 can be actuated using hydraulic power from the mobile rig, while the first and second set of rams 1012, 1014 of the blowout preventer can be actuated via a separate hydraulic power source. In further embodiments, multiple controllers for actuating any of the rams 1012, 1014, 1016, 1018 and/or the annular blowout preventer 1022 can be provided, such as a first controller disposed on the blowout preventer and/or snubbing assembly and a second controller disposed at a remote location (e.g., elsewhere on the mobile rig and/or in a control cabin). During snubbing operations, the upper and lower ram assemblies 1020, 1016 and/or the annular blowout preventer 1022 can be used to prevent upward movement of tubular strings and joints, while during non-snubbing operations, the upper and lower ram assemblies 1020, 1016 and annular blowout preventer 1022 can permit unimpeded upward and downward movement of tubular strings and joints. Typically, the annular blowout preventer 1022 can be used to limit or eliminate upward movement of tubular strings and/or joints caused by pressure in the wellbore, though if the annular blowout preventer 1022 fails or becomes damaged, or under non-ideal or extremely volatile circumstances, the upper and lower ram assemblies 1020, 1016 can be used, e.g., in alternating fashion, to prevent upward movement of tubulars. As such, the depicted snubbing assembly (the ram assemblies 1020, 1018 and annular blowout preventer 1022) can remain in place, above the blowout preventer, such that snubbing operations can be performed at any time, as immediately as necessary, without requiring rental and installation of third party snubbing equipment, which can be limited by equipment availability, cost, etc. In an embodiment, the upper and lower ram assemblies 1020, 1018 can be used as stripping blowout preventers during snubbing operations. Additionally, while the figures depict a single ram-type blowout preventer in the BOP and snubbing stack 900 having two sets of rams 1012, 1014, in various embodiments, additional blowout preventers could be used as safety blowout preventers, which can include pipe blowout preventers, blind blowout preventers, or combinations thereof.

Due to the clearance provided in the recessed region defined by the Y-base 132 and support section 130, the snubbing assembly can remain in place continuously, beneath the vertical mast, without interfering with operations and/or undesirably contacting the top drive or other portions of the mobile rig. Further, the clearance provided in the recessed region can enable a compact snubbing unit (e.g., snubbing jacks and/or jaws) to be positioned above the annular blowout preventer 1022, such as the embodiment of the compact snubbing unit 800, described below, and depicted in FIGS. 11A through 11D.

FIG. 9C-C also shows a first hydraulic jack 1024A positioned at the lower end of the Y-base 132, on a first side of the rig, and a second hydraulic jack 1024B positioned at the lower end of the Y-base 132, on a second side of the rig. The hydraulic jacks 1024A, 1024B are usable to raise and/or lower a respective side of the rig to provide the rig with a generally horizontal orientation. For example, while FIG. 1 depicts an embodiment the long lateral completion system 10 having a mast assembly 100 and a pipe handling system (e.g., skid 200, system 300, and tubs 400) positioned at ground level, each component having a lower surface contacting the upper surface of the well (e.g., the earth's surface), the hydraulic jacks 1024A, 1024B can be used to maintain a ground level rig in an operable, horizontal orientation, independent of the grade of the surface upon which the rig is operated.

Figure 10A:
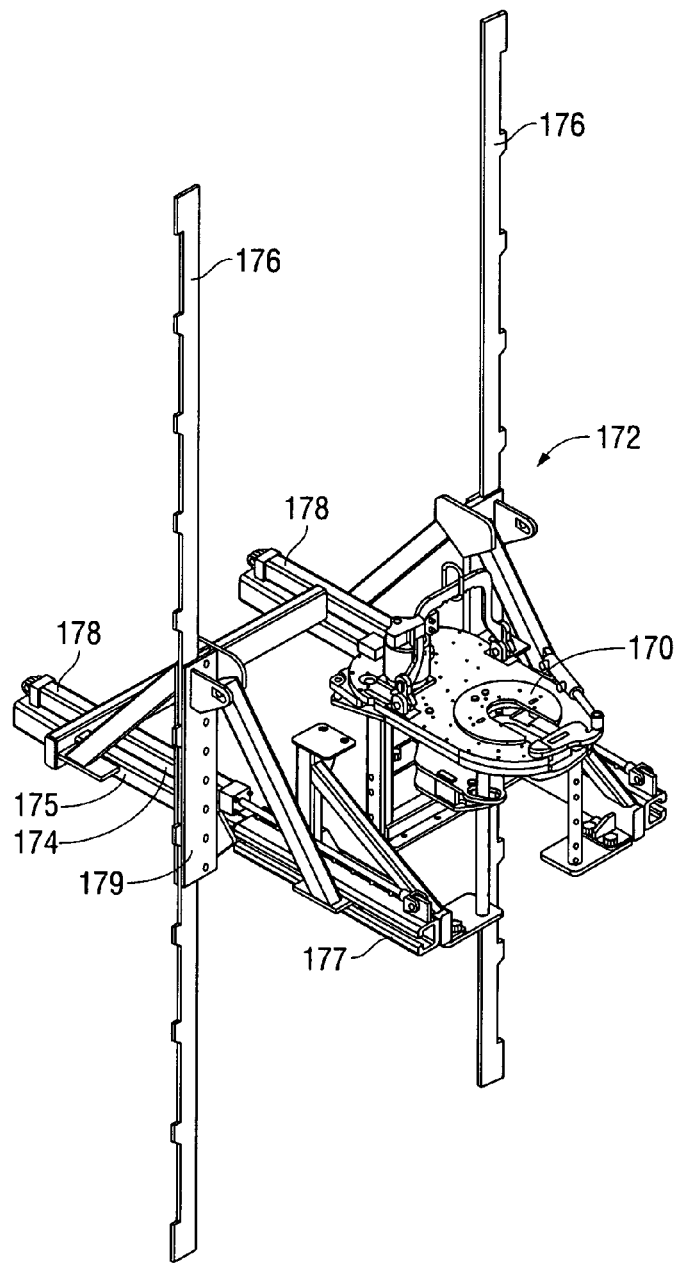
FIG. 10A is an illustration of an embodiment of a pipe tong fixture usable in accord with one possible embodiment of the completion system of the present disclosure.
Figure 10B:
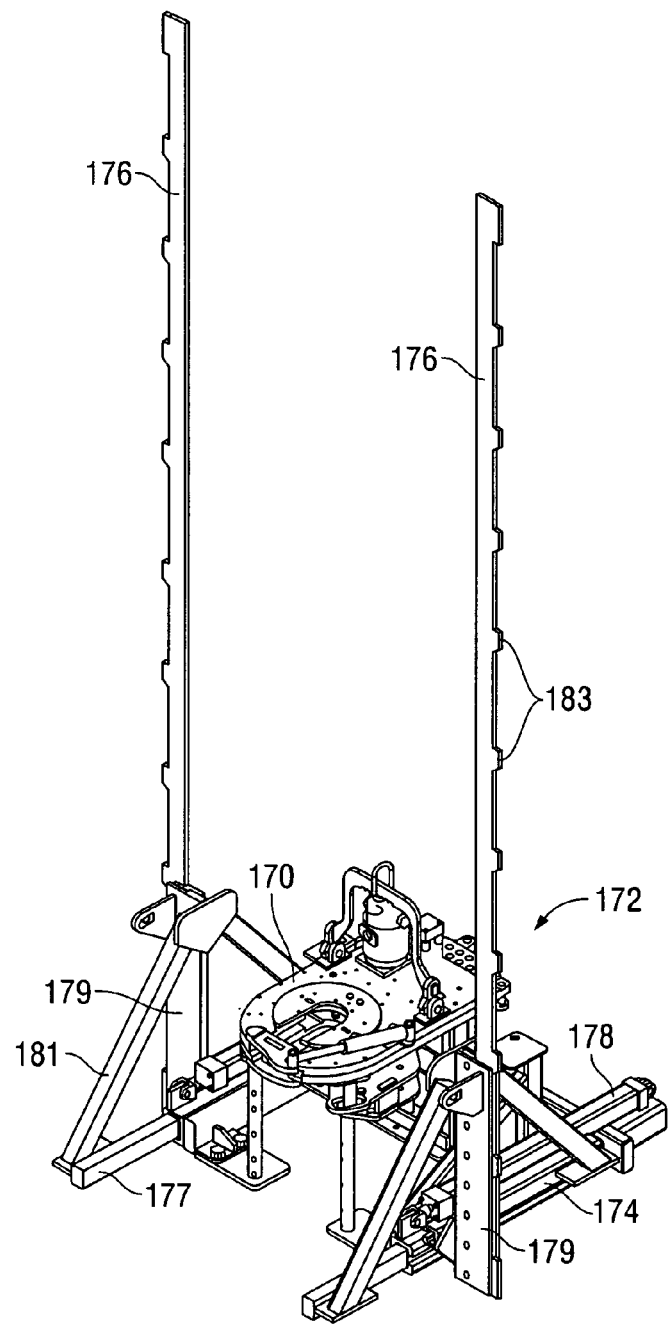
FIG. 10B is a perspective view of the pipe tong fixture of FIG. 10A.

FIG. 10A and FIG. 10B provide an illustration of one possible embodiment for mounting pipe tong 170 utilizing the pipe tong fixture 172 to support pipe tong 170 at a desired vertical distance in mast 100 from BOPs, such as the blowout preventer 900 shown in FIG. 9C-C, and with respect to a co-axial orientation with respect to the bore of the BOPs. Pipe tongs 170 may be moved in/out and up/down. The pipe tong fixture comprises one or more pipe tong vertical support rails 176, two pipe tong horizontal movement hydraulic actuators 178 in association with a horizontal pipe support 174 for displacing the pipe tong 170. It will be appreciated that fewer or more than two pipe tong horizontal movement hydraulic actuators 178 could be utilized. In this embodiment, horizontal support 174 may comprise telescoping and/or sliding portions, which engagingly slide with respect to each other, namely square outer tubular component 175 and square inner tubular component 177, which move slidingly and/or telescopingly with respect to each other. In this embodiment, components 175 and 177 are concentrically mounted with respect to each other for strength but this does not have to be the case. Accordingly, pipe tong 170 is moved slidingly or telescopically horizontally back and forth as shown by comparison of FIGS. 10A and 10B. In FIG. 10A, pipe tong 170 is shown in a first horizontal position moved laterally away from pipe tong vertical support rails 176. In FIG. 10B, pipe tong 170 is shown in a second horizontal position moved laterally or horizontally toward pipe tong vertical support rails 176. In this way, pipe tong 170 can be moved in the desired direction to position pipe tong 170 concentrically around the pipe from the bore through BOP 900. It will be noted that here as elsewhere in this specification, terms such as horizontal, vertical, and the like are relevant only in the sense that they are shown this way in the drawings and that for other purposes, e.g. transportation purposes as shown in FIG. 4 with the rig collapsed and hydraulic tongs oriented vertically as compared to their normal horizontal operation, hydraulic actuators 178 would then move pipe tong 170 vertically. It will also be understood that multiple tongs may be utilized on such mountings, if desired, in other embodiments of the invention, e.g. where a rotary drilling rig were utilized with the pipe tong mounting on a moveable carrier. If desired, additional centering means may be utilized to move pipe tong horizontally between vertical supports 176 to provide positioning in three dimensions FIG. 10B is a perspective view of the pipe tong fixture 172 as illustrated in FIG. 10A of the blowout preventer with respect to the completion system of one possible embodiment of the present invention whereby pipe tong 170 is moved vertically downwardly along pipe tong vertical support rails 176. Vertical sliding supports 179 permit pipe tong frame 181, which comprise various struts and the like, to be moved upwardly and downwardly. Extensions 183 may be utilized in mounting support rails 176 to mast 100 and/or may be utilized with clamps associated with vertical sliding supports 179 for affixing pipe tong frame 181 to a particular vertical position. Pipe tong frame 181 may be lifted utilizing lifting lines within mast 100 and/or by connection with the blocks and/or top drive 150 and/or by hydraulic actuators (not shown).

FIG. 11A, FIG. 11B, FIG. 11C, and FIG. 11D illustrate one possible embodiment for a compact snubbing unit 800, usable with the completion system 10 of the present disclosure, e.g., by securing the snubbing unit 800 above the blowout preventer and snubbing stack 900 (shown in FIG. 9). However, snubbing unit 800 is simply shown as an example of a snubbing jack and other types of snubbing jacks may be utilized in accord with the present invention. Generally, a snubbing jack will have a movable gripper, which may be mounted on a plate that is movable with respect to a stationary gripper. At least one gripper will hold the pipe at all times. The grippers are alternately released and engaged to move pipe into and out of the wellbore under pressure. If not for this type of arrangement, when the string is lighter than the force applied by the well, the string would shoot uncontrollably out of the well. When the string is lighter than the force applied by the well, this example of snubbing jack 800 can be utilized to move pipe into or out of the well in a highly controlled manner, as is known by those of skill in the art. In another embodiment, an additional set of pulleys (not shown) might be utilized to pull top drive downwardly (while the existing cables remain in tension but slip at the desired tension to prevent the cables from swarming). Once the pipe is heavier than the force of the well, then the normal operation of top drive may be utilized for insertion and removal of pipe so long as the pipe string is preferably significantly heavier than the force acting on the pipe string. In this example, the grippers of snubbing jack 800 also provide a back up in case of a sudden increase in pressure in the well. The compact (but extendable) snubbing unit 800 can be sized to fit within the recessed region of the mast assembly 100, to prevent undesired contact with the mast assembly 100 even when the snubbing jack is in an extended position. In this example, the depicted snubbing unit 800 includes a first horizontally disposed plate member 802, which is a vertically moveable plate, and a second horizontally disposed plate member 804, which is a fixed plate with respect to the wellhead, displaced by vertical columns or stanchions 806 and 808. The lower and/or possibly upper portion of columns or stanchions 806 and 808 may comprise hydraulic jacks members which can be utilized for hydraulically moving plate member 802 upwardly and downwardly with respect to plate member 804 and may be referred to herein as hydraulic jacks 806 and 808. Also, in this example, between the first member 802 and the second member 804 is an intermediate member 803. In this example, between the first member 802 and the intermediate member 803 is a first engaging mechanism 820 for engaging and/or clamping and/or advancing or withdrawing pipe. Between the intermediate member 803 and the second member 804 is a second engaging mechanism 830 for engaging and advancing, or withdrawing pipe. In one embodiment, both plates 802 and 803 are vertically moveable with respect to plate 804 whereby both clamps (i.e., engaging mechanisms) 820 and 830 are used at the same time. Accordingly, in one embodiment, both plates 802 and 803 move together. In another embodiment, grippers (i.e., engaging mechanisms) 820 and 830 may be moveable with respect to each other. In one possible mode of operation, the clamping mechanisms 820, 830 can be used to grip a joint of pipe and exert a downhole force or upward force thereto, counteracting a force applied to the string due to pressure in the wellbore. Because the force of the snubbing jack unit 800 is selected to exceed the pressure from the wellbore, joints can be added or removed from a completion string even under adverse, high pressure conditions. The BOPs or other control equipment, positioned below the snubbing jack 800, can seal around the pipe as it is moved into and out of the wellbore by snubbing jack 800. Thus, grippers 820 and 830 may be engaged and hydraulic jacks within stanchions 806 and 808 may be expanded to remove pipe from the well or force pipe into the well. The hydraulic jacks may be contracted to move pipe into the well or pull pipe out of the well in a controlled manner. Other grippers within the BOPs may be utilized to hold the pipe, when grippers 820 and 830 are released and moveable plates 802 and/or 803 are moved to a new position for grasping the pipe to move the pipe into or out of the borehole as is known to those of skill in the art. In one embodiment of the present invention, the computer control of the control van is utilized to control the grippers 820, 830, and the hydraulic jacks 806 and 808, and other grippers and seals in the BOPs to provide automated movement of the pipe into or out of the wellbore. This movement may be coordinated with that of the top drive and tongs for adding pipe or removing pipe. Thus, the entire process or portions of the process of going into the hole with snubbing units may be automated. However, it will be understood that at least two separate grippers or sets of grippers are required for a snubbing unit. If the top drive is connected to be able to apply a downward force then another stationary set of grippers is required. In addition, multiple sealing mechanisms such as rams, inflatable seals, grease injectors, and the like, may be utilized to open and close around sections of pipes so that larger joints and the like may be moved past the sealing mechanisms in a manner where at least one seal or set of seals is always sealed around the pipe string in a manner than allows sliding movement of the pipe string. The control system of the present invention is programmed to operate the entire system in a coordinated manner. In addition to or in lieu of the snubbing unit 800 and/or the snubbing assembly depicted and described above, various embodiments of the present system can include a full-sized snubbing unit, e.g., similar to a rig assist unit.

Figure 12A:
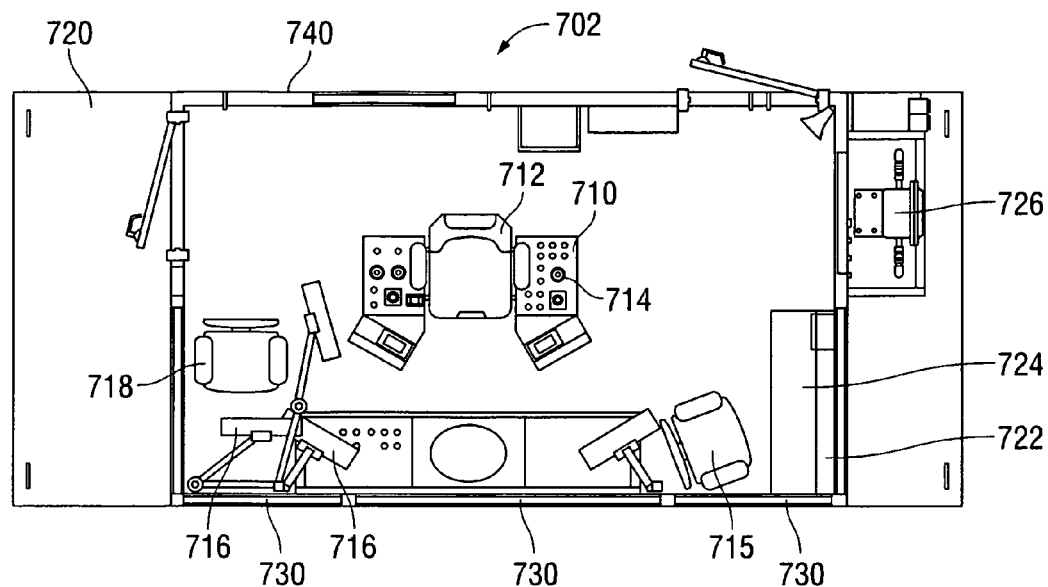
FIG. 12A is a schematic view of an embodiment of a control cabin usable in accord with one possible embodiment of the completion system of the present disclosure.

FIG. 12A depicts a schematic view of an embodiment of a control cabin 702 of the long lateral completion system 10 with respect to the present disclosure. The control cabin 702 comprises a command station 710. The command station 710 comprises a seat 712, control 714, monitor 716 and related control devices. Further, the control cabin 702 provides for a second seat 715 in association with a monitor, and, optionally, a structure for supporting other related monitoring and/or control activities 722, 724, and a third seat 718 in association with yet another monitor. The control cabin 702 has doors for exiting the cabin area and accessing a walkway 720 disposed around the perimeter of the control cabin 702.

In one embodiment, command station 710 is positioned so that once control van 700 is oriented or positioned with respect to mast 100 (See FIG. 1), carrier 600, catwalk and pipe handling assembly 300, and/or pump/pit 500, then all mast operations can be observed through command station front windows 730 as well as command station top windows 732. Front windows 730, for example, allow a close view of rig operations at the rig floor. Top windows 732 allow a view all the way to the top of mast 100. In one embodiment, additional command station side and rear windows 740, side windows 742 (depicted in FIG. 12C), 744 (depicted in FIG. 12D) will allow easy observation of other actions around mast 100. If desired, control van 700 may be positioned as shown in FIG. 1 and/or adjacent pump/pit combination skid 500. If desired, additional cameras may be positioned around the rig to allow direct observation of other components of the rig, e.g., pump/pit return line flow or the like.

The control van 700 may include a scissor lift mechanism to lift and adjust the yaw of command station 710. A scissor lift mechanism is a device used to extend or position a platform by mechanical means. The term "scissor" is derived from the mechanism used, which is configured with linked, folding supports in a crisscrossed "X" pattern. An extension motion or displacement motion is achieved by applying a force to one of the supports resulting in an elongation of the crossing pattern supports. Typically, the force applied to extend the scissor mechanism is hydraulic, pneumatic or mechanical. The force can be applied by various mechanisms such as by way of example and without limitation a lead screw, a rack and pinion system, etc.

For example with loading applied at the bottom, it is readily determined that the force required to lift a scissor mechanism is equal to the sum of the weights of the payload, its support, and the scissor arms themselves divided by twice the tangent of the angle between the scissor arms and the horizontal. This relationship applies to a scissor lift mechanism that has straight, equal-length arms, i.e., the distance from an actuator point to the scissors-joint is the same as the distance from that scissor-joint to the top load platform attachment. The actuator point can be, by way of examples, a horizontal-jack-screw attachment point, a horizontal hydraulic-ram attachment point or the like. For loading applied at the bottom, the equation would be $F=(W+Wa)/2 \tan \Phi$. The terms are F=the force provided by the hydraulic ram or jack-screw, W=the combined weights of the payload and the load platform, Wa=the combined weight of the two scissor arms themselves, and is the angle between the scissor arm and the horizontal.

And for loading applied at the center pin of the crisscross pattern, the equation would be $F=W+(Wa/2)/\tan \Phi$. The terms are F=the force provided by the hydraulic ram or jack-screw, W=the combined weights of the payload and the load platform, Wa=the combined weight of the two scissor arms themselves, and is the angle between the scissor arm and the horizontal.

Figure 12B:
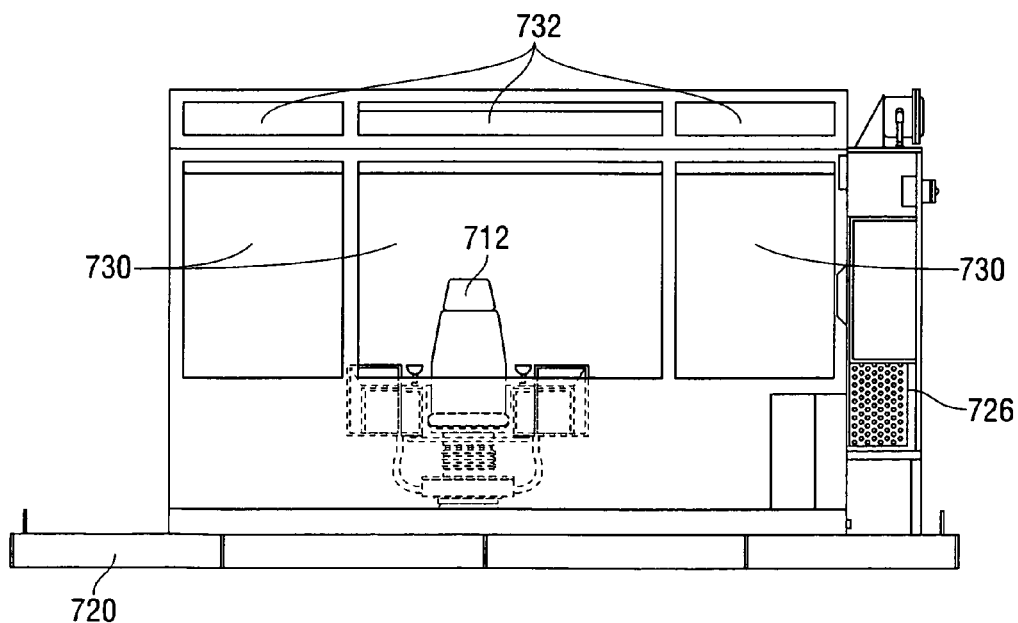
FIG. 12B is an elevation view of the control cabin of FIG. 12A in accord with one possible embodiment of the completion system of the present disclosure.

FIG. 12B is an elevation view of the control cabin 702 of the completion system 10 of one possible embodiment of the present invention. The command station 710 the walkway 720 and exterior controls 726.

Figure 12C:
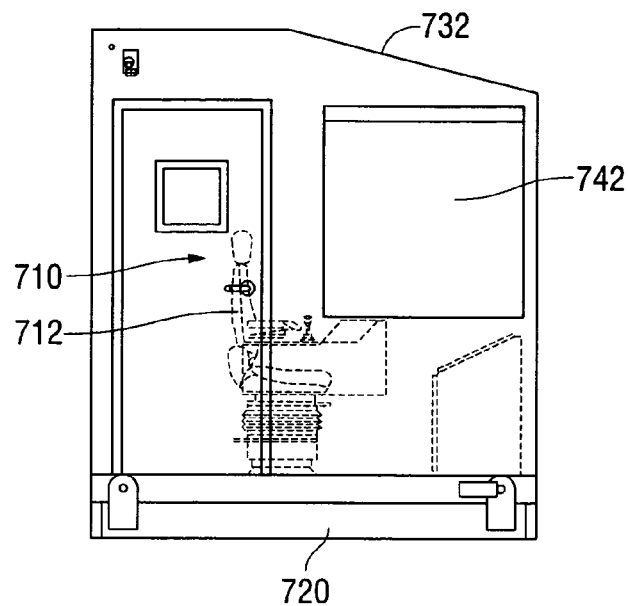
FIG. 12C is a first end view (e.g., a left side view) of the control cabin of FIG. 12A in accord with one possible embodiment of the completion system of the present disclosure.

FIG. 12C is an end view of the control cabin 702 of the completion system 10 of one possible embodiment of the present invention. FIG. 12C illustrates the command station 710 in association with the control cabin 702. The walkway 720 is also illustrated.

Figure 12D:
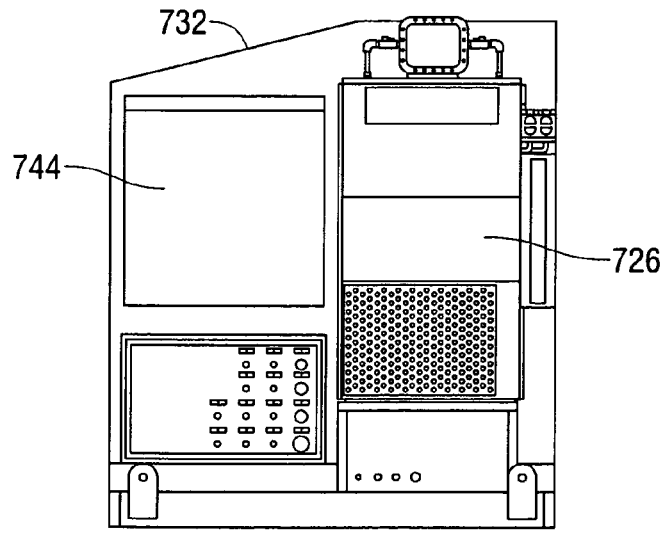
FIG. 12D is an opposing end view (e.g., a right side view) of the control cabin of FIG. 12A in accord with one possible embodiment of the completion system of the present disclosure.

FIG. 12D is an end view of the control cabin 702 taken from the alternate perspective as that of FIG. 12C of the completion system of one possible embodiment of the present invention. The outer controls 726 are illustrated.

Figure 13:
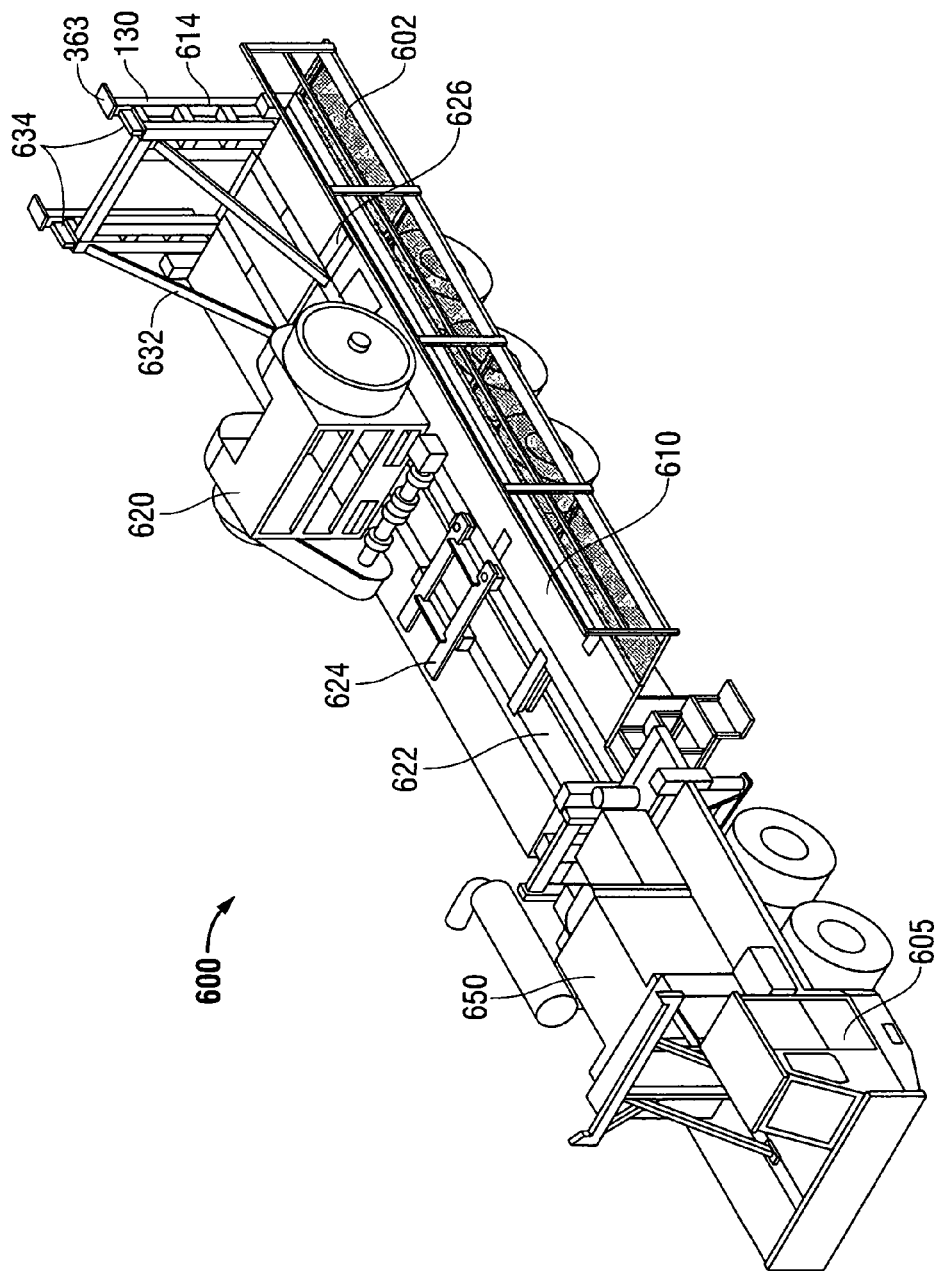
FIG. 13 is an illustration of an embodiment of a carrier adapted for use in accord with one possible embodiment of the completion system of the present disclosure.

FIG. 13 is an illustration of the carrier 600 adapted for use with the completion system 10 of one possible embodiment of the present invention. The carrier comprises a cabin 605, a power plant 650, and a deck 610. Foldable walkway 602 folds up for transportation and then when unfolded extends the walkway space laterally to the side of carrier 600. Winch assembly 620 can be mounted along slot 622 at a desired axial position at any desired axial position along the length of carrier 600. Winch or drawworks assembly 620 may or may not be mounted to a mounting such as mounting 624, which is securable to slot 620. Mounting 624 may be utilized for mounting an electrical power generator or other desired equipment. Recess 626 may be utilized to support mast positioning hydraulic actuators 630, which are not shown in FIG. 13. One or more stanchions 614 (e.g., a Y-base) are illustrated for engaging the mast assembly 100 with the carrier 600, wherein the mast can be supported by carrier to mast pivot connection 634 and at the carrier 600 rearmost position by mast support plate 363 (also shown in FIG. 4 as 636).

Figure 14:
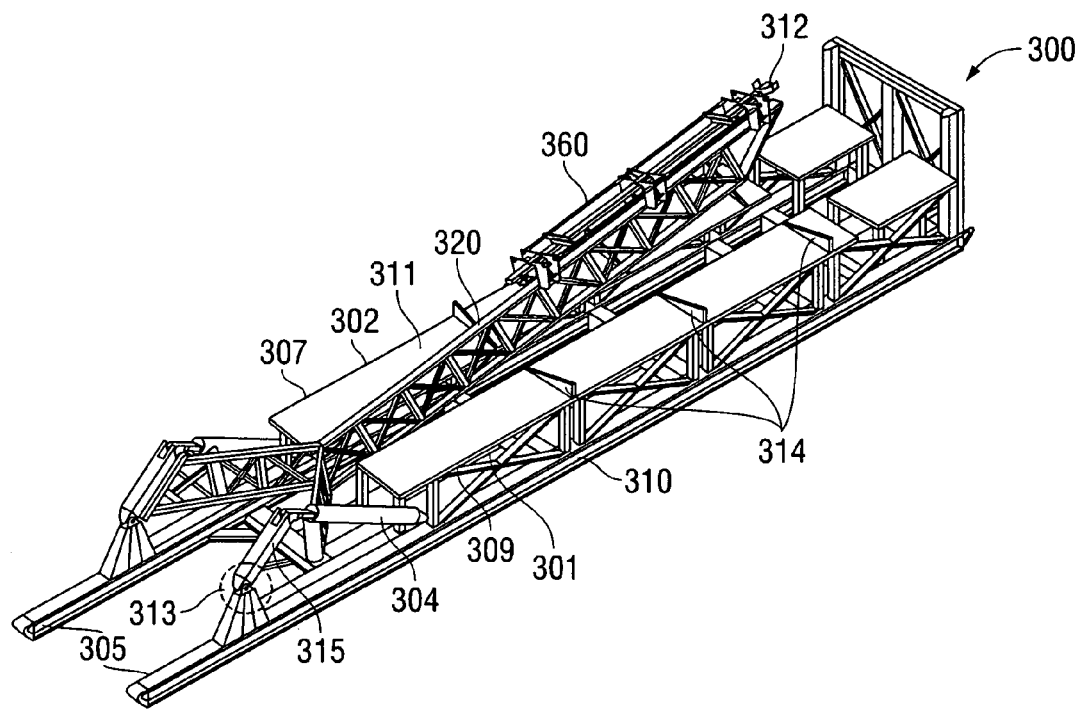
FIG. 14 is an illustration of an embodiment of a pipe arm usable in accord with one possible embodiment of the completion system of the present disclosure.

FIG. 14 is an illustration of the catwalk-pipe arm assembly 300 of the completion system 10 of one possible embodiment of the present invention. The catwalk-pipe arm assembly 300 is illustrated with a ground skid 310, pipe arm hydraulic actuators 304 for lifting the pivotal pipe arm 320 and the kickout arm 360 attached thereto. The kickout arm 360 can subsequently be extended the central pipe arm 320 using additional hydraulic cylinders disposed therebetween.

In yet another embodiment, a pivotal clamp could be utilized at 312 in place of the entire kick arm 360 whereby orientation of the pipe for connection with top drive 150 may utilize upper mast fixture 135 and/or mast mounted grippers and/or guide elements.

In one embodiment, catwalk 302 may be provided in two elongate catwalk sections 309 and 311 on either side of pivotal pipe arm 320 for guiding pipe to and/or away from pivotal pipe arm 320. However, only one elongate section 309 or 311 might be utilized. Catwalk 302 provides a walkway and a catwalk is often part of a rig, along with a V-door, for lifting pipes using a cat line. To the extent desired, catwalk 302 may continue provide this typical function although in one possible embodiment of the present invention, pivotal pipe arm 320 is now preferably utilized, perhaps or perhaps not exclusively, for the insertion and removal of tubing from the wellbore.

In one possible embodiment of catwalk 302, each catwalk section 309 and 311 may comprise multiple catwalk pipe moving elements 314 which move the pipes toward or away from pivotal pipe arm 320 and otherwise are in a stowed position, resulting in a relatively smooth catwalk walkway. Referring to FIGS. 15F and F15G, FIG. 21A, and FIG. 21B, catwalk pipe moving hydraulic controls 333 may be utilized to independently tilt catwalk pipe moving elements 314 upwardly or downwardly, as indicated. On the left of FIG. 15F, catwalk pipe moving element 314 is in the stowed position flat with catwalk 309. On the right of FIG. 15F, catwalk pipe moving element 314 is tilted inwardly to urge pipes toward pivotal pipe arm 320. In FIG. 15G, catwalk pipe moving elements are both tilted away from pipe moving element 314 to urge pipes away from pivotal pipe arm 320. However, each group of catwalk pipe moving elements 314 on each of catwalks 309 and 311 operate independently. In one embodiment, by tilting pipe moving elements 314 away from pivotal pipe arm 320, the pipe moving elements 314 operate in synchronized fashion with pipe ejector direction control which directs pipe away from pipe arm 320 in a desired direction as indicated by arrows 377A and 377B (see FIG. 17), as discussed hereinafter.

In another embodiment, each entire elongate catwalk section 309 and 311 could be pivotally mounted on skid edges 301 and 307. Accordingly, due to the pivotal mounting discussed previously or in accord with this alternate embodiment, catwalk sections 309 may be selectively utilized to urge pipes toward or away from pivotal pipe arm 320. However, in yet another embodiment the catwalks may also be fixed structures so as to either slope towards or away from pivotal arm 320 or may simply be relatively flat.

In yet another embodiment, at least one side of catwalk 302 (catwalk sections 309 and/or 311) may be slightly sloped inwardly or downwardly toward pivotal pipe arm 320 to urge pipe toward guide pipe for engagement with pivotal pipe arm 320. In one embodiment, pipe tubs 400 and/or one or both sides of catwalk 302 (and/or catwalk pipe moving elements 314) include means for automatically feeding pipes onto catwalk 302 for insertion into the wellbore, which operation may be synchronized for feeding pipe to or ejecting pipe from pivotal pipe arm 320. In another embodiment, at least one side of catwalk 302 and/or catwalk pipe moving elements 314, may also be slightly sloped slightly downwardly towards at least one of pipe tubs 400 to urge pipes toward the respective pipe tub when pipe is removed from the well. In one embodiment, one pipe tub may be utilized for receiving pipe while another is used for feeding pipe. In another embodiment, catwalk 302 may simply provide a surface with elements (not shown) built thereon for urging the pipe to or from the desired pipe tub 400.

In yet another embodiment, catwalk 302, which may or may not be pivotally mounted and/or comprise catwalk pipe moving elements 314, may be provided as part of the pipe tub and may not be integral or built onto the same skid as pivotal pipe arm 320. In yet another embodiment, the pipes may be manually fed to and from the pipe tubs or pipe racks to pivotal pipe arm 320 via catwalk 302.

Figure 14A:
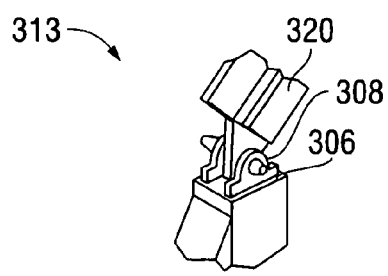
FIG. 14A depicts a detail view of an engagement between the pipe arm of FIG. 14 and an associated skid in accord with one possible embodiment of the completion system of the present disclosure.

FIG. 14A is a blowup view of the lower pipe arm pivot connection 313 upon which the pivotal pipe arm 320 is lifted for the catwalk-pipe arm assembly 300. The lower pipe arm pivot connection 313 comprises a bearing 306 and a shaft or pin 308 which provides a pivot point for the pivotal pipe arm 320 with respect to the pipe arm ground skid 310.

FIG. 15A is an elevation view of the catwalk-pipe arm assembly 300 of the completion system 10 of one possible embodiment of the present invention. The catwalk-pipe arm assembly 300 comprises the central arm 320, a kickout arm 360 and one or more clamps 370A, 370B, 370C for engaging a pipe "P." The catwalk-pipe arm assembly 300 is rotationally moved or pivoted with respect to lower pipe arm pivot connection 313 using the hydraulic actuators 304. In this embodiment, pivotal pipe arm 320 comprises a grid comprising plurality of pipe arm struts 364.

FIG. 15B is an enlarged or detailed view of the section "B" of pivot connection 313 as illustrated in FIG. 15A of the completion system of one possible embodiment of the present invention. The pivotal pipe arm 320 is pivotally moved using a bearing 306 in association with a shaft or pin 308. Control arm 315, to which pivot arm struts 317 (See also FIG. 15A) are affixed, pivots about lower pipe arm pivot connection 313.

FIG. 15C is an enlarged or detailed view of section "C" illustrated in FIG. 15A of the completion system of one possible embodiment of the present invention, which shows control arm to hydraulic arm pivot connection 319. Piston 323 of the hydraulic cylinder of hydraulic actuator 304 is pivotally engaged with control arm 315 using the pin 327.

FIG. 15D is an enlarged or detailed view of the section indicated by "D" in FIG. 15A of the completion system of one possible embodiment of the present invention, which shows the hydraulic cylinder of hydraulic actuator 304 pivotal connection 329. FIG. 15D shows the engagement of the hydraulic cylinder with the skid using the pin 331.

FIG. 15E is a plan view of the catwalk-pipe arm assembly 300 of the completion system 10 of one possible embodiment of the present invention. The catwalk-pipe arm assembly 300 comprises the pivotal pipe arm 320 in association with the skid 310. The arm has engaged with it a kickout arm 360 which is pivotally moved with the hydraulic actuator 362. The pivotal pipe arm 320 is pivotally moved with the hydraulic actuator 304. The kickout arm has clamps 370A, 370B for engaging a piece of pipe "P."

Figure 16A:
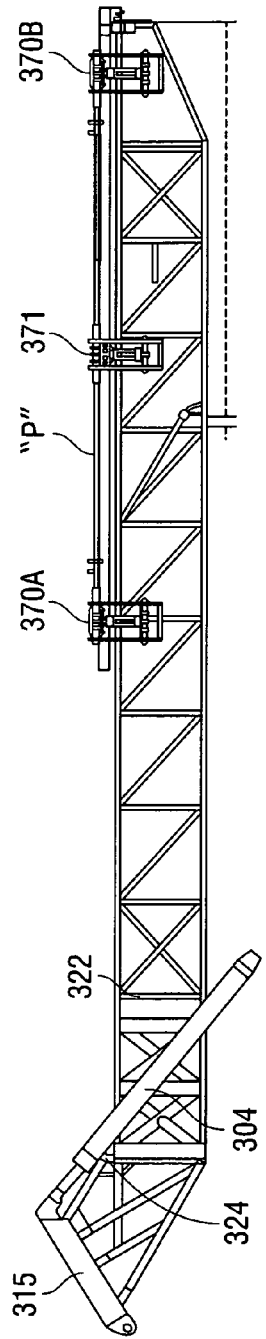
FIG. 16A is an elevation view of the pipe arm of FIG. 14 in accord with one possible embodiment of the completion system of the present disclosure.

FIG. 16A is an elevation view of the pivotal pipe arm 320 of the completion system 10 of one possible embodiment of the present invention, without the catwalk 302 for easier viewing. Pivotal pipe arm 320 comprises an elongate lower pipe arm section 322 which is pivoted using the hydraulic actuators 304. Lower pipe arm section 322 is secured to y-joint connector 324, which in turn connects to pivot arm Y arm strut components 326A and 326B (depicted in FIG. 16B). The Y arm strut components 326A and 326B are connected to control arms 315, which are in moveable engagement with the hydraulic actuators 304. An extension (not shown) may be utilized to engage upper mast fixture 135, if desired, to provide a preset starting position from which kickout arm 360 pivots outwardly to align with the top drive 150.

The elongate kickout arm 360 secures a piece of pipe "P" using a plurality of pipe clamps 370, which are labeled 370A and 370B at the bottom and top (when upright) of kickout arm 360. Pipe ejector direction control 371 acts to eject the pipe from pivotal arm 320 in a desired direction when the pipe is laid down adjacent catwalk 302, as discussed hereinafter.

Figure 16B:
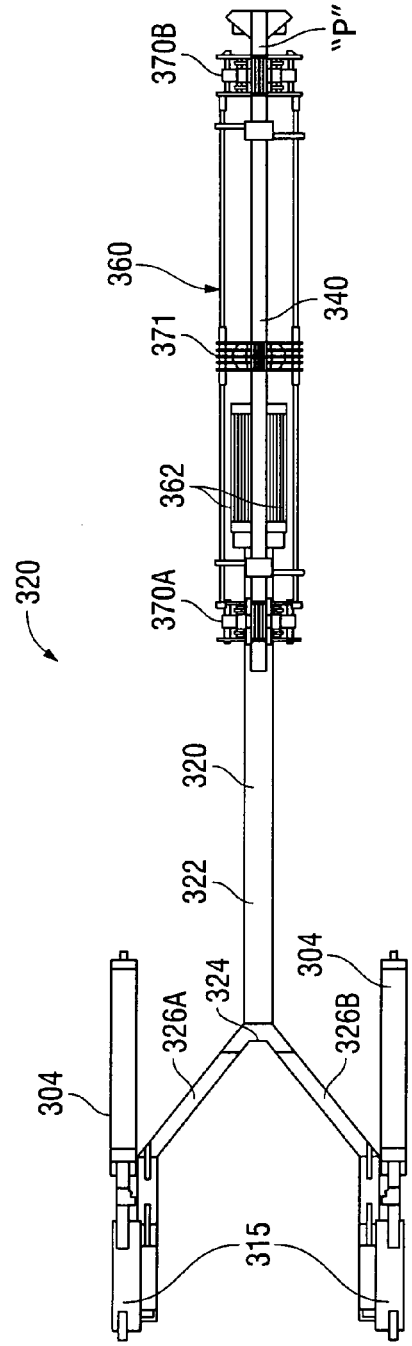
FIG. 16B is a plan view of the pipe arm of FIG. 14 in accord with one possible embodiment of the completion system of the present disclosure.

FIG. 16B is a plan view of the pivotal pipe arm 320, as illustrated in FIG. 16A for the completion system 10 of one possible embodiment of the present invention, showing only the pipe arm components for convenience. In one possible embodiment, upper pipe arm section 340 may also incorporate kickout arm 360. In this embodiment, kickout arm 360 remains generally parallel to pivotal pipe arm 320 except when pivotal pipe arm 320 is moved into the upright position shown in FIG. 7, FIG. 8, and FIG. 9. Upon reaching the upright position, kickout arm 360 is pivoted using the hydraulic actuators 362, which cause kickout arm 360 to pivot away from pipe arm 360 about kickout arm pivot connection 312 (FIG. 16C) at the top of pivotal pipe arm 320. The kickout arm 360 is shown with the clamps 370A and 370B at the bottom and top (when vertically raised) of kickout arm 360 as well as pipe ejector direction control 371, which may be positioned more centrally, if desired.

Figure 16C:
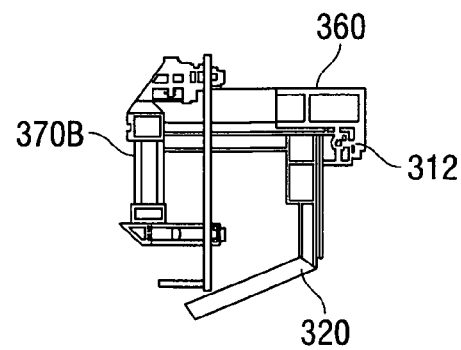
FIG. 16C is an enlarged or detailed view of a portion of the pipe arm of FIG. 16A, indicated as section "C" in accord with one possible embodiment of the completion system of the present disclosure.

FIG. 16C is an enlarged or detailed view of the section "C" as illustrated in FIG. 16A for the completion system 10 of one possible embodiment of the present invention, which shows kick arm pivot connection 312 (FIG. 16C) at the top of pivotal pipe arm 360. FIG. 16C shows the pivotal pipe arm 320 in association with an upper portion of kickout arm 360 (when vertically raised) and the clamp 370B.

Figure 16D:
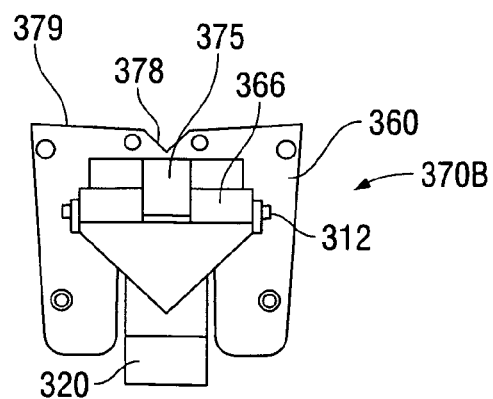
FIG. 16D is an end view of the pipe arm of FIG. 14 in accord with one possible embodiment of the completion system of the present disclosure.

FIG. 16D is an end view of the pivotal pipe arm 320 and kickout arm 360 of the completion system 10 of one possible embodiment of the present invention for the completion system 10, which shows an end view kickout arm pivot connection 312 (FIG. 16C) at the top of pivotal pipe arm 360 and clamp 370B. Pivot beam 366 connects pipe kickout arm 360 to the top of pivotal pipe arm 320. Kickout arm base 375 may comprise a rectangular cross-section in this embodiment. The pipe is received into pipe reception groove 378.

Figure 17:
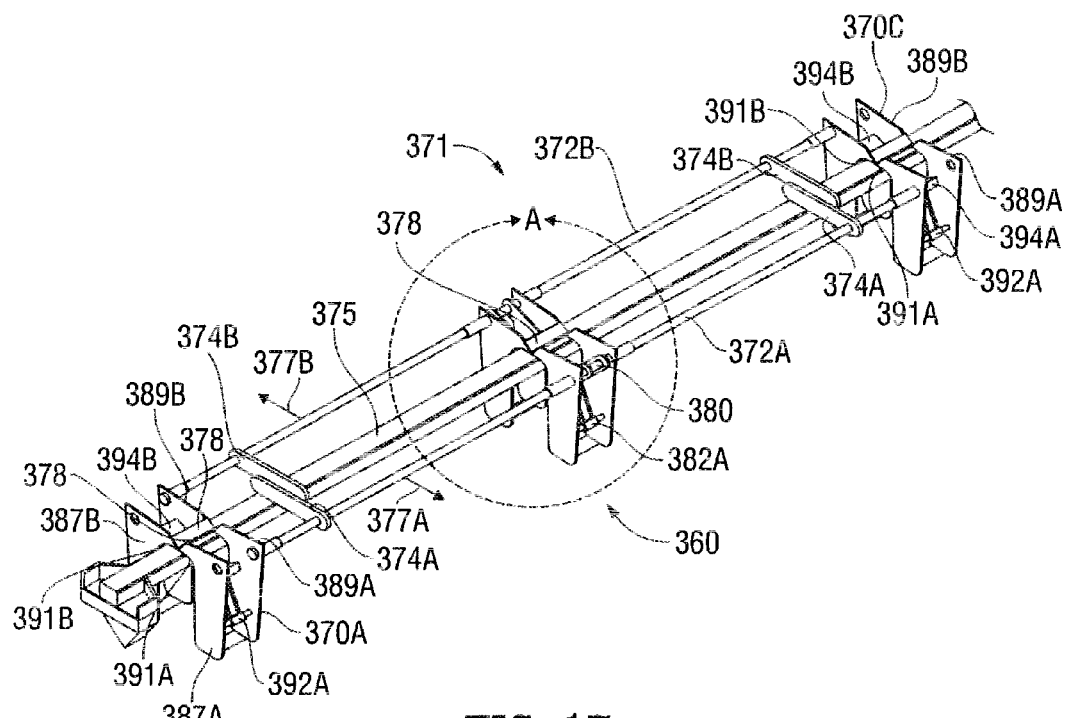
FIG. 17 is a perspective view of an embodiment of a kickout arm usable in accord with one possible embodiment of the completion system of the present disclosure.

FIG. 17 is a perspective view of a portion of the kickout arm 360 of the completion system 10 of in accord with one possible embodiment of the present invention. The kickout arm 360 is illustrated with the components attached to a kick out arm base 375, which in this embodiment may have a relatively rectangular or square profile. The kick out arm base 375 is used for supporting one possible embodiment of the pipe clamps 370A and 370B (See also FIG. 18A) and pipe ejector directional control 371. Torsional arms 372, which are also referred to as torsional arms 372A and 372B, are utilized to selectively activate eject arms 374A and 374B. The eject arms 374A connect to torsional arms 372A. The eject arms 374B connect to torsional arms 372B, respectively. When torsional arms 372A are rotated utilizing hydraulic actuator 382A, which rotates plates 384A, (see FIG. 17A and FIG. 18 C-C), then eject arms 374A will lift the pipe to eject the pipe from kickout arm 360 in the direction shown by pipe ejection direction arrow 377A to the pipe tub or the like. Similarly, when torsional arms 372B are rotated, then eject arms 374B eject the pipe in the direction indicated by pipe ejection direction arrow 377B to the other side. Prior to ejection or clamping, the pipe will align with the pipe reception grooves 378 in the clamps 370 and ejector mechanism 380. Plates 375 comprise a relatively square receptacle 385 (see FIG. 17A) that mates to kick out arm base 375 for secure mounting to resist torsional forces created during pipe ejection and/or pipe clamping.

Figure 17A:
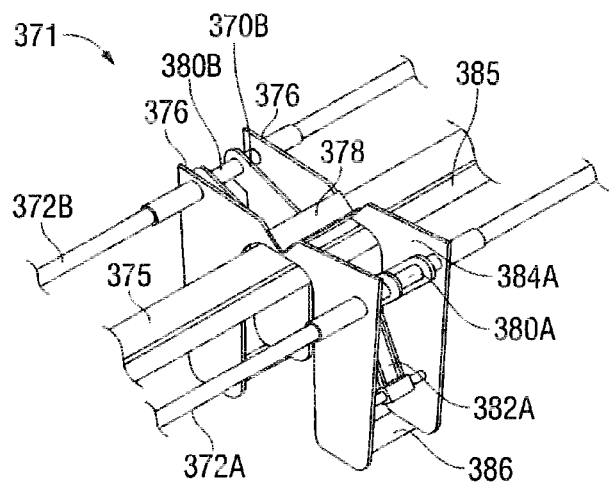
FIG. 17A is an enlarged or detailed view of an embodiment of a clamp of the kickout arm of FIG. 17 in accord with one possible embodiment of the completion system of the present disclosure.

FIG. 17A and FIG. 18C-C provide an enlarged or detailed view of the pipe ejector direction control 371 illustrated in FIG. 17 for the completion system of one possible embodiment of the present invention. The pipe ejector direction control 371 is illustrated using the plates 376, which may be connected by a bracket 386, in association with the torsional ejection rods 372A and 372B. The ejection mechanisms 380A and 380B (see FIG. 18 C-C) are between the plates 376 and provides for rotational movement of the torsional ejection rods 372A and 372B. Ejection mechanism 380A operates to eject pipe as indicated by pipe ejection direction arrow 377A (see FIG. 17). Ejection mechanism 380B operates to eject pipe in the direction indicated by arrow 377B. The pipe reception groove 378 is for accepting the joint of pipe during clamping or prior to ejection. In this embodiment, ejector hydraulic actuators 382A and 382B are pivotally connected to pivotal plates 384A and 384B, respectively, which are fastened to respective torsional ejection rods 372A and 372B for selectively ejecting the pipe from kickout arm 360 in the desired direction as indicated by pipe ejection arrows 377A and 377B. As shown in FIG. 17, torsional ejection rods 372A and 372B are rotationally mounted to plates on clamps 370A and 370B for support at the ends thereof.

Figure 21A:
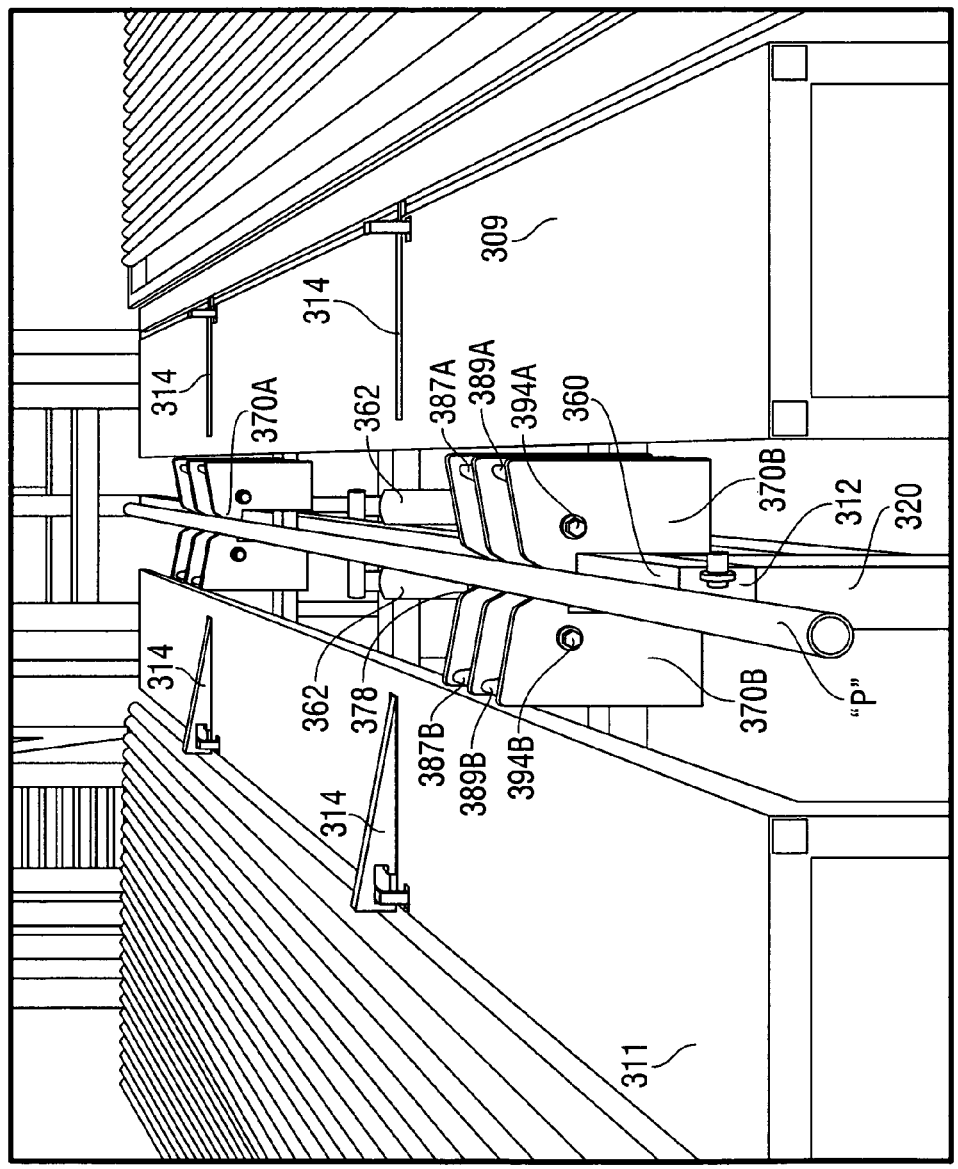
FIG. 21A is a perspective view of a pivotal pipe arm having a pipe thereon with pipe clamps retracted to allow a pipe to be received into receptacles of the pipe arm in accord with one possible embodiment of the completion system of the present disclosure.

Referring to FIG. 17, FIG. 18C, FIG. 21A, and FIG. 21B, clamps 370A and 370B are similar and in this embodiment each comprises two sets of clamping members, lower clamp set 387A,B and upper clamp set 389 A,B. Each clamp set is activated by respective pairs of clamp hydraulic actuators, such as 392A and 392B, perhaps best shown in FIG. 18A. In this embodiment, after the pipe is rolled into the pipe reception grooves, then the clamp sets 387A, 389A and 387B, 389B are pivotally mounted on clamp arms 394A and 394B to rotate upwardly around pivot connections to clamp the pipes. When not in use clamp sets 387A, 389A and 387B, 389B are rotated downwardly to be out of the way (as shown in FIGS. 17 and 21A) as the pipes are rolled into the pipe reception grooves 378.

It will be appreciated that other types of clamps, arms, ejection mechanisms and the like may be hydraulically operated to clamp and/or eject the pipe onto or away from kickout arm 360.

FIG. 18A is an elevation view of the kickout arm 360 of the completion system 10 in accord with one possible embodiment of the present invention. The kickout arm 360 is shown with the lower and upper pipe clamps 370A and 370B, pipe ejector direction control 371, base 375 with torsional ejection rod 372A, (depicted in FIG. 18B), ejector hydraulic actuator 382A, and pipe clamp hydraulic actuators 392A.

FIG. 18B is a bottom view of the kickout arm 360 as illustrated in FIG. 18A for the completion system of one possible embodiment of the present invention. FIG. 18B illustrates the base 375 in association with the torsional ejection rods 372A and 372B, which in this embodiment are rotationally secured to each of clamps 370A and 370B as well as to pipe ejector direction control 371. The clamps 370A and 370B are dispersed at the remote ends of the kickout arm 360. There may be fewer or more clamps, as desired.

FIG. 18C is a top view of the kickout arm 360 of the completion system 10 of the present invention. The kickout arm 360 is illustrated with the clamps 370A and 370B secured with the base 375 and operatively associated with the torsional ejection rods 372A and 372B.

FIG. 18B-B is a sectional view FIG. 18B for the completion system of one possible embodiment of the present invention. The end 390 is illustrated with kick arm pivot connection 312 at the top (when pivotal pipe arm is upright) of pivotal pipe arm 320.

FIG. 18C-C is a cross section of FIG. 18C illustrating pipe ejector direction control 371. The ejector mechanism 380A and 380B comprise ejector hydraulic actuators 382A, 382B and pivotally mounted ejection control arms 384A and 384B, which rotate torsional ejection rods 372A, and 372B in one possible embodiment of the present invention.

Figure 19B:
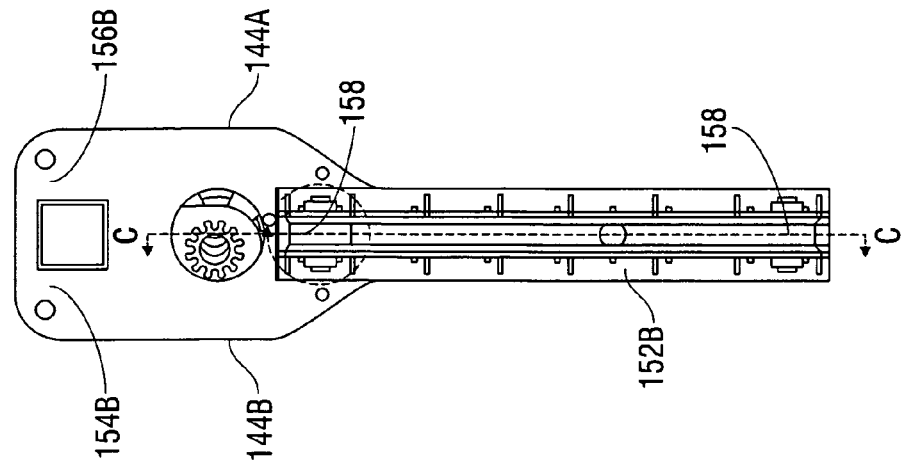
FIG. 19B is a side view of the top drive fixture illustrated in FIG. 19A in accord with one possible embodiment of the completion system of the present invention.
Figure 19A:
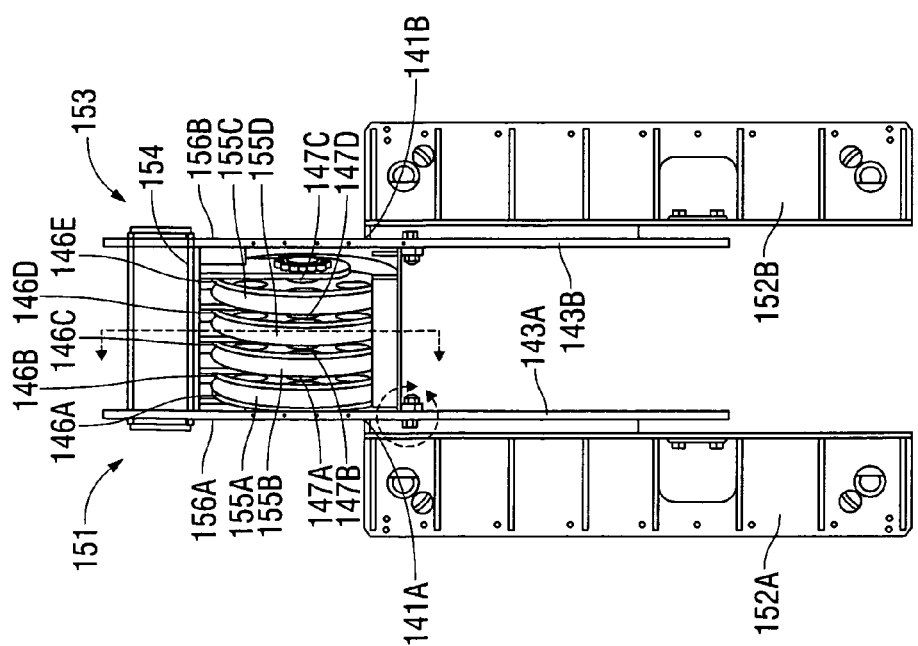
FIG. 19A is an elevation view of an embodiment of a top drive fixture usable with the mast assembly of embodiments of the completion system in accord with one possible embodiment of the completion system of the present disclosure.

FIG. 19A is an elevation view of the top drive fixture 151, without the top drive mechanism 160, used in conjunction with the mast assembly 100 of the completion system 10 of one possible embodiment of the present invention. The top drive fixture 151 is shown with the guide frame 152, separated designated as 152A, 152B. Guide frames 152A, 152B are connected at top drive fixture flanges 141A, 141B to extensions 143A, 143B downwardly projecting from side plates 156A, 156B of a traveling block frame 154. Traveling block fixture 154 is part of a traveling block assembly 153 comprising frame 154 and a cluster of sheaves 155A, 155B, 155C, 155D supported in such frame. Guide frames 152A, 152B slidingly engage mast top drive guide rails 104, as discussed hereinbefore.

FIG. 19B is a side view of the top drive fixture 151 and frame 154 of the traveling block assembly 153 illustrated in FIG. 19A. FIG. 19B illustrates the guide frame 152B in relation to the traveling block frame 154B using the block side plate 156B.

FIG. 19C-C is a cross sectional view taken along the section line C-C in FIG. 19B illustrating the mechanism associated with the top drive fixture 151 of the completion system of one possible embodiment of the present invention. The mechanism provides for the slide supports 152 having at its extremities a first and second rollers 158A, 158B on a respective roller axles 159A, 159B of guide frame 152B, which may be utilized to provide a rolling interaction with mast top drive guide rails 104 maintaining the top drive in a relatively fixed vertical position. FIG. 19C-C also depicts flange 141B connected to extension 143B.

FIG. 19D is an enlarged or detailed view of the roller 158A as illustrated in FIG. 19B.

FIG. 19E-E is a cross sectional view taken along the section line E-E in FIG. 19A. 19E-E is in the same orientation as FIG. 19B, but is sectional. Referring to FIGS. 19A, 19B and 19E-E, traveling block frame 154 further comprises a front plate 144A, a rear plate 144B (depictd in FIG. 19B), and side plates 156A, 156B including the downwardly projecting extensions 143A, 143B. A frame cross member spans side plates 156A, 156B above traveling block sheaves 155A, 155B, 155C, 155D sufficiently within parallel planes tangent to peripheries of flanges of such sheaves that a drilling line reeved around the sheaves as described below does not contact cross member. Cross member mounts inferiorly a plurality of rigid spaced apart parallel hangers 146A, 146B, 146C, 146D and 146E (depicted in FIG. 19A), each in a plane perpendicular to an axis of front sheaves of a crown block assembly described below. Hangers 146A, 146B support between them an axle 147A for traveling block sheave 155A; hangers 146B, 146C support between them an axle 147B for traveling block sheave 155B; hangers 146C, 146D support between them an axle 147C for traveling block sheave 155C; and hangers 146D, 146E support between them an axle 147D for traveling block sheave 155D. Each sheave axle 147A, 147B, 147C and 147D is parallel to the plane of the axis of the front sheaves of the crown block assembly. Traveling block sheaves 155A, 155B, 155C, 155D rotate in traveling block frame respectively on axles 147A, 147B, 147C and 147D.

FIG. 20A is an illustration of the top drive 150 in the top drive fixture 151 of the completion system of one possible embodiment of the present invention. The top drive comprises the top drive fixture 151 in conjunction with the drive mechanism 160. The drive mechanism 160 is moveably engaged with the guide frames 152A, 152B and moves in a vertical direction using traveling block assembly 153. A top drive shaft 165 provides rotational movement of the pipe using the drive mechanism 160. Top drive shaft 165 connects to item 163, which may comprise a top drive threaded connector and/or pipe connection guide member. Item 163 may also be adapted to hold the pipe. A torque sensor may also be included therein.

FIG. 20B is an upper view of traveling block assembly 153 and top drive 150 as illustrated in FIG. 20A. FIG. 20B illustrates the guide frames 152A, 152B with the frame 154 there between.

Referring to FIGS. 19A, 19B, 19E-E, 20A and 20B, traveling block sheaves 155 are seen to be horizontally canted in frame 154. The purpose and angle of this canting and the operation of the traveling block assembly to raise and lower top drive 150 is now explained.

Referring now to FIGS. 4, 7B, 9, 27A, and 27B, carrier 600 pivotally mounts mast 100 on the carrier for rotation upward to an erect drilling position, as has been described. Mast 100 comprises front and rear vertical support members 105, and a mast top or crown 190 supported atop front and rear vertical support members 105. Drawworks 620 is mounted on carrier 600 to the rear of an erect mast 100. Drawworks 620 has a drum 621 with a drum rotation axis perpendicular to the drilling axis for winding and unwinding a drilling line on drum 621. A crown block assembly 191 is mounted in mast top or crown 190 for engaging the drilling line. The crown block assembly comprises a cluster 193 of front sheaves mounted at the front of mast top 190 facing the drilling axis. This cluster 193 comprises first and second outermost sheaves and at least one inboard sheave, all aligned on an axis in a plane perpendicular to the drilling axis and having a predetermined distance between grooves of adjacent front sheaves. A fast line sheave 194 is mounted on the drawworks side of the mast top behind the first outermost front sheave of cluster 193 and on an axis substantially parallel to the axis of the front sheaves of cluster 193, for reeving the drilling line to the first outermost front sheave of cluster 193. A deadline sheave 195 (blocked from view by the front sheaves of cluster 193) is mounted on the drawworks side of mast top 190 behind a second laterally outermost front sheave (blocked from view by fast line sheave 194) and on an axis substantially parallel to the axis of the front sheaves of cluster 193, for reeving the drilling line from the second outermost front sheave to an anchorage.

Traveling block assembly 153 hangs by the drilling line from the front sheaves of the crown block assembly, and comprising, as has been described, fixture 154 and the cluster of sheaves 155 supported in the fixture. The cluster is one less in number than the number of front sheaves in the crown block assembly and includes at least first and second outermost traveling block sheaves 155A, 155D (in the illustrated embodiment there are two traveling block sheaves, 155B, 155C inboard of outermost traveling block sheaves 155A, 155D. Traveling block sheaves 155A, 155B, 155C, 155D have a predetermined distance between grooves of adjacent traveling sheaves and rotate on a common horizontal axis in a plane perpendicular to the drilling axis. The axis of the traveling sheaves 155A, 155B, 155C, 155D is angled in the latter plane relative to the axis of the front sheaves of the crown block assembly such that the drilling line reeves downwardly from the groove in a first front sheave parallel to the drilling axis to engage the groove in a first traveling block sheave and reeves upwardly from the groove in a first traveling block sheave toward the second front sheave next adjacent such first front sheave at an up-going drilling line angle to the drilling axis effective according to the distance between the grooves of the first and second front sheaves to move the drilling line laterally relative to the front sheave axis and engage the groove of the second front sheave, each the traveling block sheaves receiving the drilling line parallel to the drilling axis and reeving the drilling line to each following front sheave at an up-going angle.

Accordingly, first outermost traveling block sheave 155A receives the drilling line reeved downward from the first laterally outermost front sheave of the crown block assembly parallel to the drilling axis and reeves the drilling line at an up-going angle to a next adjacent inboard front sheave. The latter inboard front sheave reeves the drilling line downward to traveling block sheave 155B next adjacent first laterally outermost traveling block sheave 155A parallel to the drilling axis. The latter traveling block sheave 155B reeves the drilling line at an up-going angle to a front sheave next adjacent the front sheave next adjacent the first laterally outermost front sheave, and so forth, for each successive traveling block sheave (respectively sheaves 155C, 155D in the illustrated embodiment of FIGS. 19A, 19B, 19E-E, 20A and 20B), until the second outmost traveling block sheave (155D in the illustrated embodiment) reeves the drilling line at an the up-going angle to the second outmost front sheave. The second outmost front sheave reeves the drilling line to the deadline sheave, and the deadline sheave reeves the line to the anchorage.

In an embodiment, an up-going angle from a traveling block sheave to a crown block front sheave is not more than about 15 degrees. In an embodiment, an up-going angle from a traveling block sheave to a crown block front sheave is about 12 degrees.

In an embodiment, the predetermined distances between grooves of the front sheaves are equal from sheave to sheave. In an embodiment in which the front sheaves comprise a plurality of inboard sheaves, the predetermined distance between at least one pair of inboard front sheaves may be the same or different than the distance separating an outermost front sheave from a next adjacent inboard front sheave.

FIG. 20A-A is a cross sectional view taken along the section line A-A in FIG. 20A illustrating the relationship of the drive mechanism 160 in the top drive frame 151. The guide frames 152 provide structural support for the drive mechanism 160.

FIG. 21A is a perspective view of the pipe arm assembly with the pipe clamps recessed allowing the pipe arm to receive pipe, as also previously discussed with respect to FIG. 17, and FIG. 18C. In this embodiment, pipe ejector direction control 371 is omitted for clarity of the other elements in the figure. However, in another possible embodiment, the pipe ejector mechanism may not be utilized or may be replaced by other pipe ejector means. Kickout arm 360 is secured to pivotal pipe arm 320 at kickout arm pivot connection 312 located at the top of pivotal pipe arm 320. Kickout arm hydraulic actuators 362 provide pivotal movement when pipe arm 320 is in an upright position. In this embodiment, pipe clamps 370A and 370B are mounted to kickout arm 360, although in other embodiments pipe clamps 370A and 370B can be mounted directly to pivotal pipe arm 320. Catwalk segments 309 and 311 contain one possible embodiment of catwalk pipe moving elements 314 to urge pipe onto pipe arm 320 which are guided or rolled into pipe reception grooves 378 along pipe guides 379 (See FIG. 16D). Pipe clamp sets 387A, 389A and 387B, 389B are recessed below an outer surface of pipe guides 379 within pipe clamp mechanisms 370A and 370B to allow pipe P to be accepted in pipe reception grooves 378, such as pipe P which is shown in position in the pipe reception grooves. Pipe clamp sets 387A, 389A and 387B, 389B are mounted to pivotal pipe clamp arms 394A and 394B.

Figure 21B:
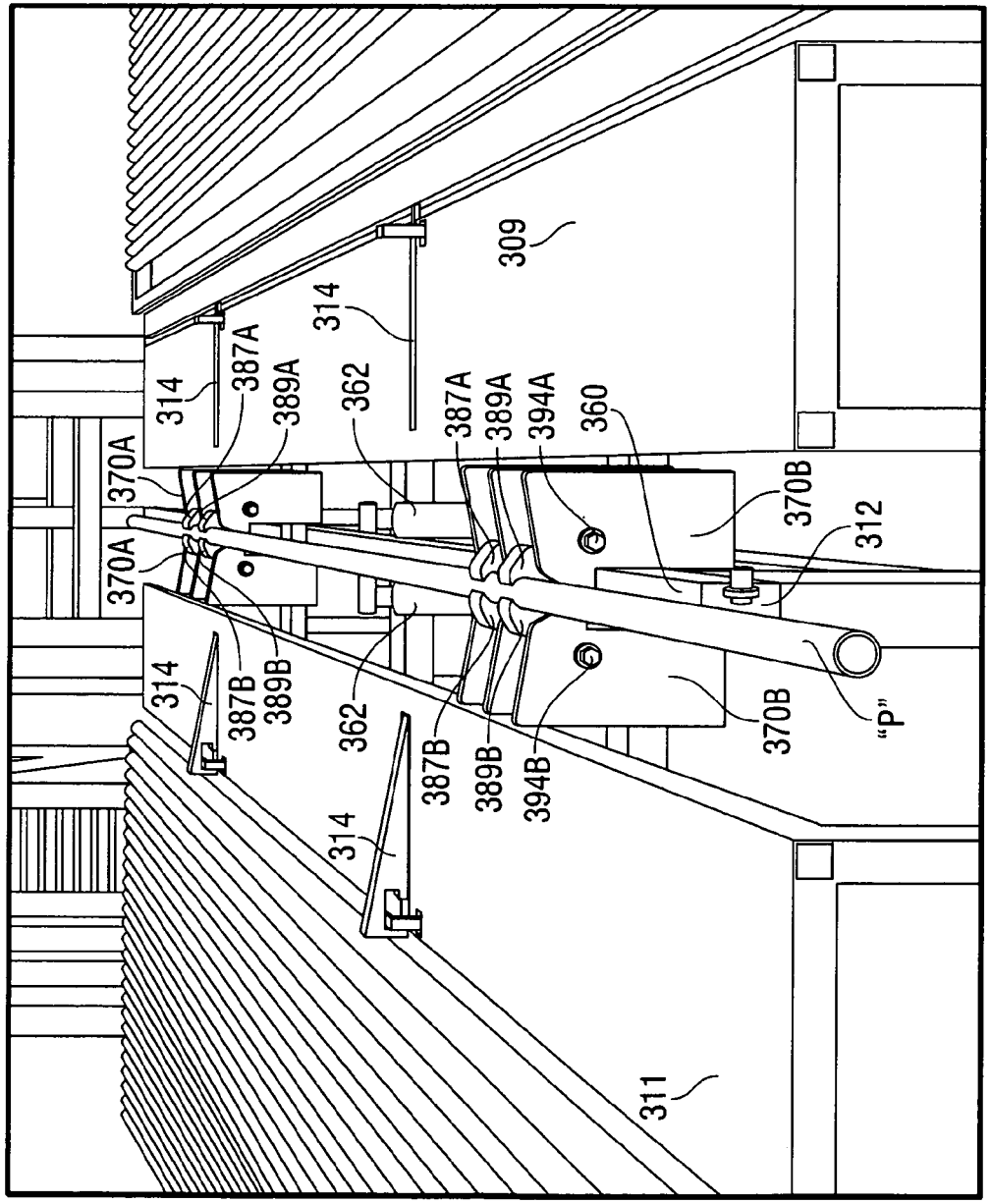
FIG. 21B is a perspective view of a pivotal pipe arm having a pipe thereon with pipe clamps engaged with the pipe whereby the pipe arm can be moved to an upright position in accord with one possible embodiment of the completion system of the present disclosure.

FIG. 21B is a perspective view of the pipe arm assembly with the pipe clamps engaged around the pipe, which allows the pipe arm to move the pipe P to an upright position in mast 100. In this embodiment, pipe clamp 370A is located at a lower point on kickout arm 360, while pipe clamp 370B is located on an upper part of kickout arm 360. In another embodiment, pipe clamps 370A and 370B could be mounted to pipe arm 320. As discussed hereinbefore, pipe clamp sets 387A, 389A and 387B, 389B are mounted to pivotal pipe clamp arms 394A and 394B. In this embodiment, once pipe P is urged into pipe receptacle grooves 378 by catwalk moving elements 314 on either catwalk section 309 or 311, pipe clamp hydraulic actuators 392A and 392B (See FIG. 18C) urge pipe clamp sets 387A, 389A and 387B, 389B around clamp pivots 391A and 391B to engage pipe P.

Figure 22A:
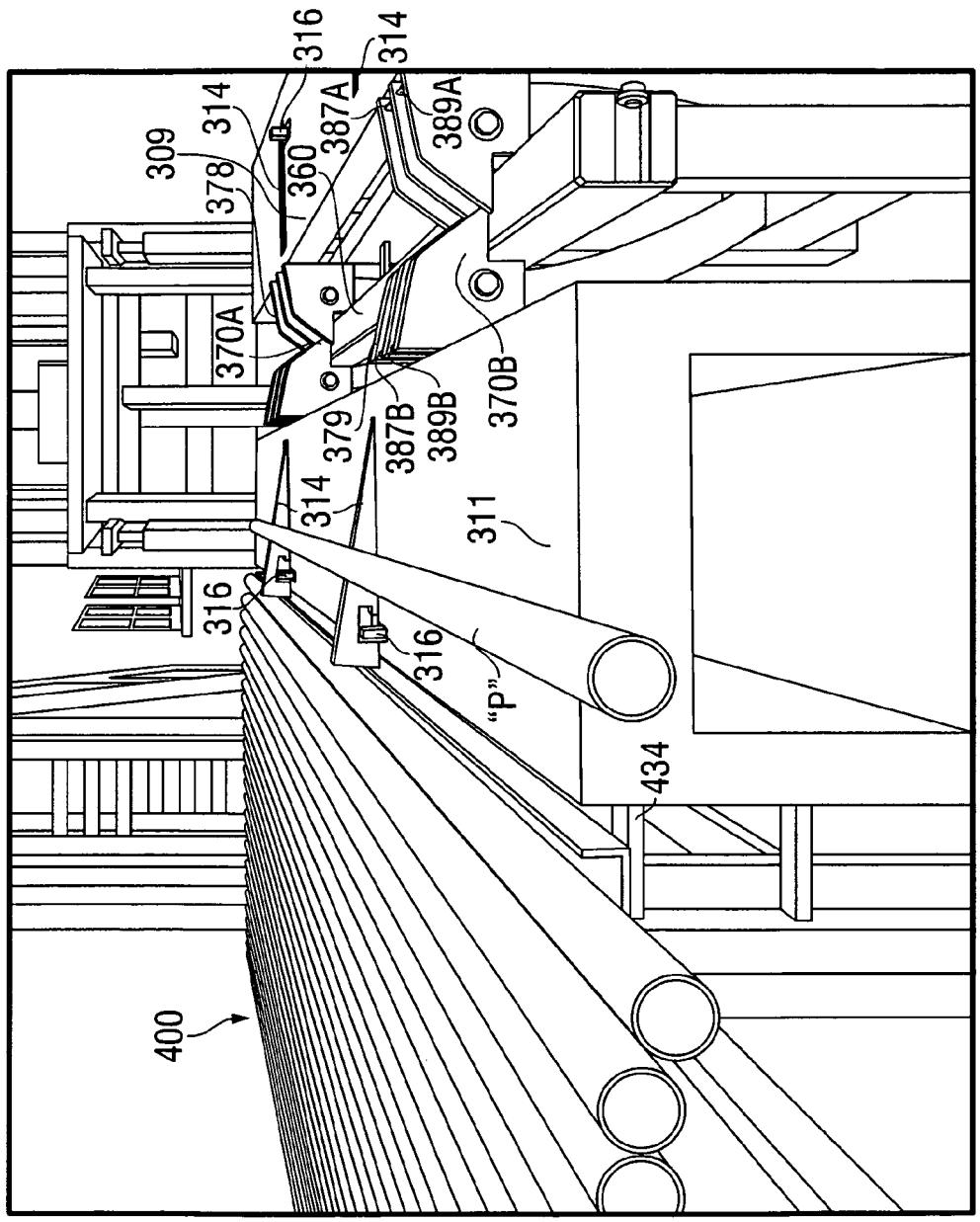
FIG. 22A is an end perspective view of a walkway with pipe moving elements whereby the pipe moving elements are positioned to urge pipe into a pipe arm in accord with one possible embodiment of the completion system of the present disclosure.

FIG. 22A is a perspective end view of one possible embodiment of walkway 309 and 311 with one possible example moving elements, illustrating how pipe is moved from the walkway to the pipe arm. In FIG. 22A, catwalk segment 311 contains catwalk pipe moving elements 314 in a sloped position for urging pipe P into pipe clamp mechanisms 370A and 370B utilizing pipe reception grooves 378. In another embodiment, catwalk pipe moving elements 314 can move into a second sloped position for moving pipe away from kickout arm 360 towards a pipe tub. In this embodiment, corresponding pipe moving element hydraulic controls 333 can be utilized for selectively operating pipe moving elements 314 on catwalk segments 309 and 311(See FIG. 15F). For example, the moving elements can be retracted below the surface of walkway 311 or raised to provide a gradual slope that urges the pipes into pipe reception grooves 378.

In one possible embodiment, pipe barrier posts 316 may be utilized to prevent additional pipes from entering catwalk segment 311 while pipe is being moved with pipe moving elements 314 towards pipe clamp mechanisms 370A and 370B located on kickout arm 360. Pipe barrier posts 316 may keep the pipe outside of the catwalk segment 311 after pipe moving elements 314 are lowered, whereby an operator may walk along the catwalk without impediments and/or utilize the catwalk for other purposes such as making up tools or the like. Catwalk segment 309 illustrates pipe moving elements 314 in a flat position flush with the surface of catwalk segment 309. In one possible embodiment, pipe barrier posts 316 may be hydraulically raised and lowered. In another embodiment pipe barrier posts 316 may mechanically inserted, removed, or replaced (such as with sockets in the catwalk). In another embodiment, pipe barrier posts may not be utilized. In another embodiment, other means for separating the pipe may be utilized to urge a single pipe on pipe moving elements whereupon catwalk moving elements 314 are raised to gently urge one or more pipes into pipe reception grooves 378. Catwalk pipe moving elements may be larger or wider if desired. In another embodiment, catwalk pipe moving elements may comprise a groove that holds the next pipe until raised whereupon the pipes are urged toward pipe guides 379 and pipe reception grooves 379.

Figure 22B:
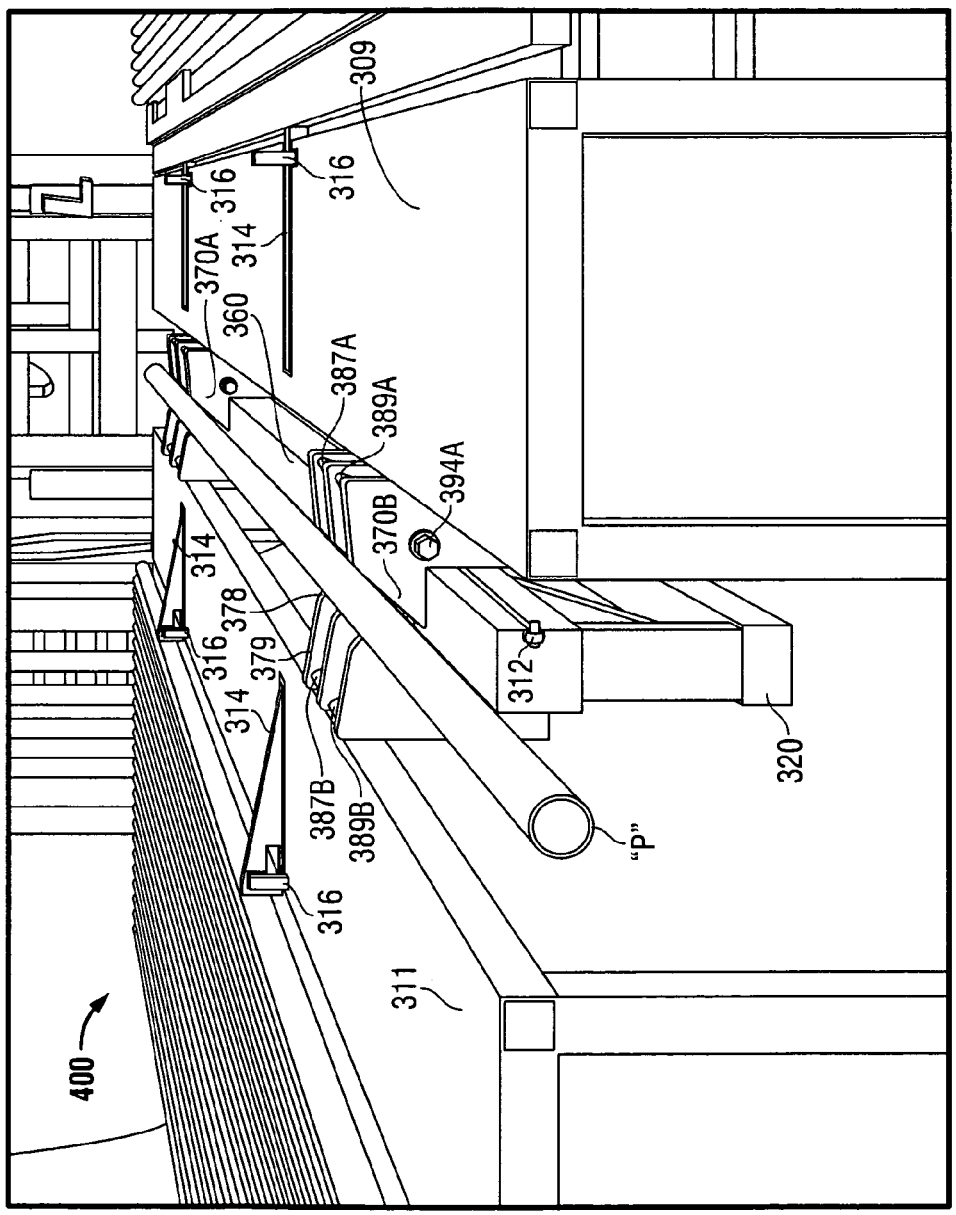
FIG. 22B is an end perspective view of a walkway with pipe moving elements whereby a pipe has been urged into a pipe arm by pipe moving elements in accord with one possible embodiment of the completion system of the present disclosure.

FIG. 22B is a perspective end view of the walkway with movable elements in accord with one possible embodiment of the invention. Catwalk segment 309 contains pipe moving elements 314 in a recessed position with pipe barrier posts 316 to prevent pipe from entering catwalk segment 309 while pipe P is engaged with pivotal pipe arm 320. In this embodiment, catwalk segment 311 illustrates pipe moving elements 314 in a raised position that work with pipe barrier posts 316 to prevent pipe from entering catwalk segment 311. In other embodiments, pipe barrier posts 316 may be hydraulically actuated or manually removable. In another embodiment, pipe barrier posts may be omitted and pipe moving elements 314 may contain a groove for holding back pipe from pipe tub 400. Kickout arm 360 is secured to pivotal pipe arm 320 at kickout arm pivot connection 312 located at the top of pivotal pipe arm 320. Pipe P has rolled into pipe reception grooves 378 located in pipe clamp mechanisms 370A and 370B where pipe clamp sets 387A, 389A and 387B, 389B will pivot about pivotal pipe clamp arms 394A and 394B to engage pipe P.

Figure 23A:
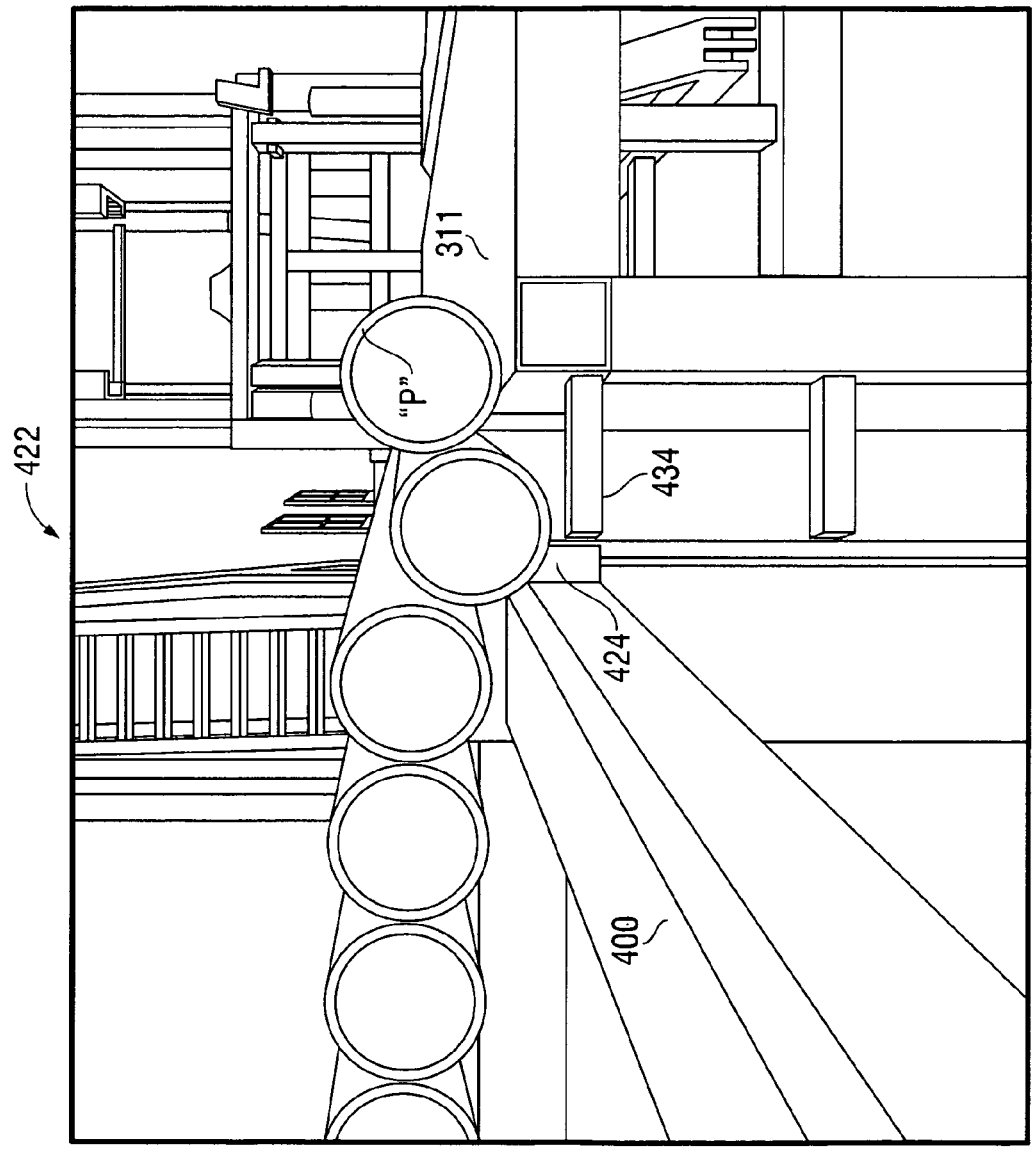
FIG. 23A is an end perspective view of a pipe feeding mechanism whereby a pipe is transferred from a pipe tub into a pipe arm in accord with one possible embodiment of the present disclosure.

FIG. 23A is an end perspective view of a pipe feeding mechanism in accord with one possible embodiment of the invention. In this embodiment, pipe tub 400 comprises a rack or support, at least a portion of which is sloped downward towards catwalk segment 311 which urges pipe towards pipe feed receptacle 424. Pipe feed receptacle 424 is movably mounted to support arms 434 for transporting pipe between pipe tub 400 and catwalk segment 311. Accordingly, in one embodiment, pipe receptacle 424 lifts pipe one at a time out of pipe tub 400 onto catwalk 311 and/or catwalk moving elements 314. As used herein pipe tube 400 may comprise a volume in which multiple layers of pipe may be conveniently carried or may simply be a pipe rack with a single layer of pipe.

Figure 23B:
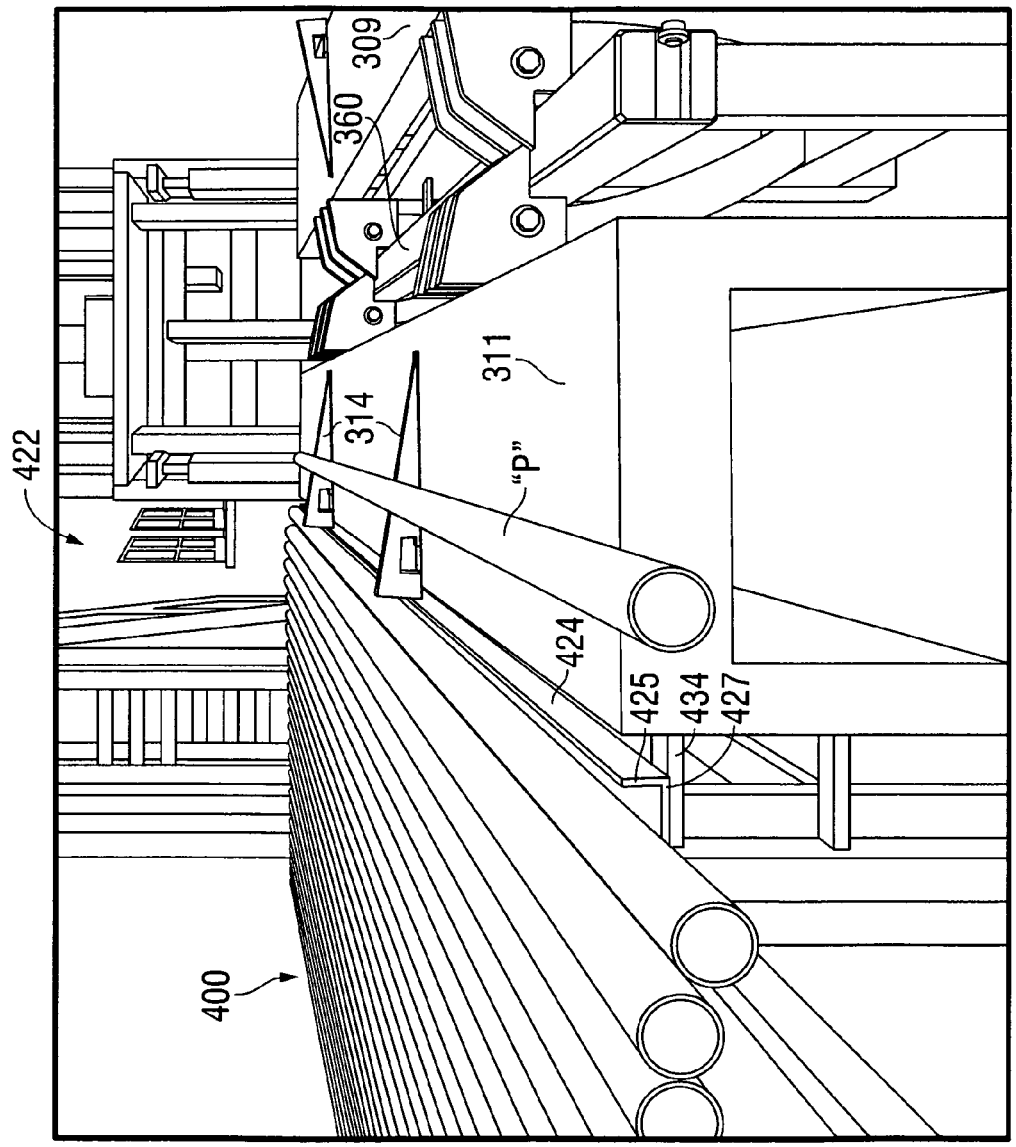
FIG. 23B is another end perspective view of a pipe feeding mechanism whereby a pipe is transferred from a pipe tub into a pipe arm in accord with one possible embodiment of the present disclosure.

FIG. 23B is another end perspective view of a pipe feeding mechanism 422 in accord with one possible embodiment of the present invention. Pipe feed mechanism 422 comprises support arms 434 which, if desired, may be fastened to catwalk segment 311. In one possible embodiment, pipe feed receptacle may comprise a wall, rods, brace 425 at edge 427 of pipe feed receptacle adjacent the incoming pipe that contains the remaining pipe on the rack when pipe feed receptacle 424 moves, in this embodiment, upwardly. Thus, the wall or rods act as a gate. Once pipe receptacle 424 is lowered, then another pipe drops into pipe receptacle 424. In this embodiment, pipe feed receptacle 424 is slidingly mounted to support arms 434 for movement between pipe tub 400 and catwalk segment 311. Once pipe P is moved towards catwalk segment 311, catwalk moving elements 314 urge pipe P towards pipe arm 320 with kickout arm 360. Pipe feed receptacle 424 could also be pivotally mounted to urge pipe out of pipe tub 400. In another embodiment, the tub or rack of pipes may be higher than the surface of catwalk 311 and the catwalk moving elements act as the pipe feed to control the flow of pipe from the pipe tub or rack 400 of pipe. Accordingly, the pipe feed may or may not be mounted within pipe tube 400.

Figure 23C:
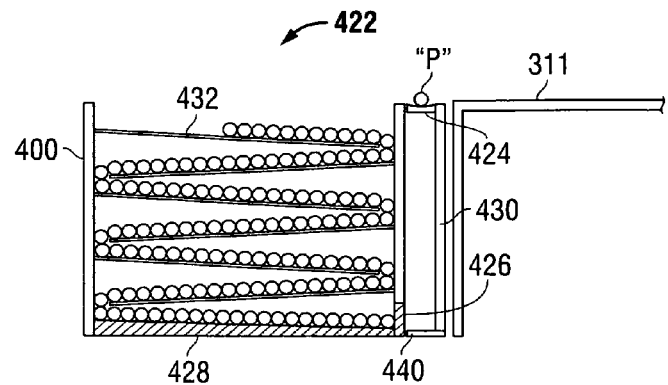
FIG. 23C is a cross sectional view of a pipe feeding mechanism whereby a pipe is transferred from a pipe tub into a pipe arm in accord with one possible embodiment of the present disclosure.

In yet another embodiment, as shown in FIG. 23C pipe tub 400 may comprise means for moving pipe from the bottom to the top of the pipe tub 400, such as a hydraulic floor or a spring loaded floor. In one embodiment, pipe tub 400 may also contain pipe gate 426 at an upper edge of pipe tub 400 for efficiently moving pipe from pipe tub 400 to pipe feed receptacle 424.

FIG. 23C is a cross sectional view of another possible embodiment of a pipe feeding mechanism 422 with the pipes present. The embodiment of pipe tub 400 shown in FIG. 23C may also be utilized for receiving pipe as the pipe is removed from the well in conjunction with pipe ejection mechanisms and/or catwalk pipe moving elements discussed hereinbefore. As discussed hereinbefore, pipe tub 400 contains sloped bottom 428 and optional pipe rungs 432 for controlling movement of pipes towards pipe gate 426. The downward sloped angle of pipe rungs 432 and their placement inside pipe tub cavity 420 continually move pipe as pipe gate 426 opens to allow pipe P to be received by pipe feed receptacle 424. Pipe feed receptacle 424 lifts pipe P to an upper position adjacent a surface of catwalk segment 311 for movement unto kickout arm 360. Various types of lifting mechanisms may be utilized for pipe feed receptacle including hydraulic, electric, or the like. Pipe gate 426 controls movement of pipe onto pipe feed receptacle 424 which is supported by vertical support member 430 and support base 440 to prevent movement during operation.

Figure 23D:
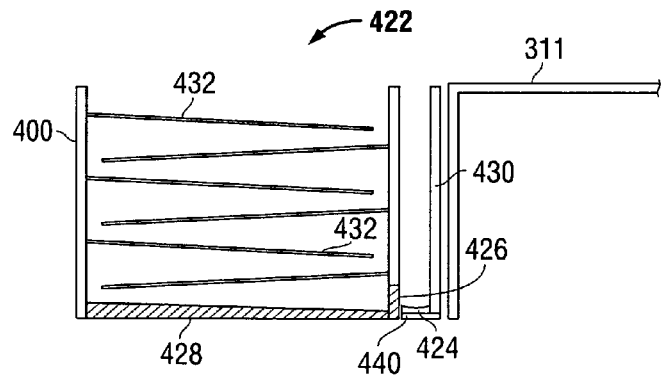
FIG. 23D is a cross sectional view of a pipe feeding mechanism with the pipes removed in accord with one possible embodiment of the present disclosure.

FIG. 23D is a cross sectional view of a pipe feeding mechanism 422 with the pipes removed in accord with one possible embodiment of the present invention. Pipe feed mechanism 422 is positioned between pipe tub 400 and catwalk segment 311. Pipe tub 400 contains pipe gate 426 at a lower end of pipe tub 400 facing catwalk segment 311. Pipe rungs 432 may be utilized in connection with sloped bottom 428 within pipe tub 400 for controlling the movement of pipe P towards pipe gate 426. As discussed hereinbefore, pipe feed receptacle 424 is stabilized by vertical support member 430 and support base 440 while in this position. Pivotal rungs may be removable or pivotal to open for filling the pipe tub more quickly.

Figure 23E:
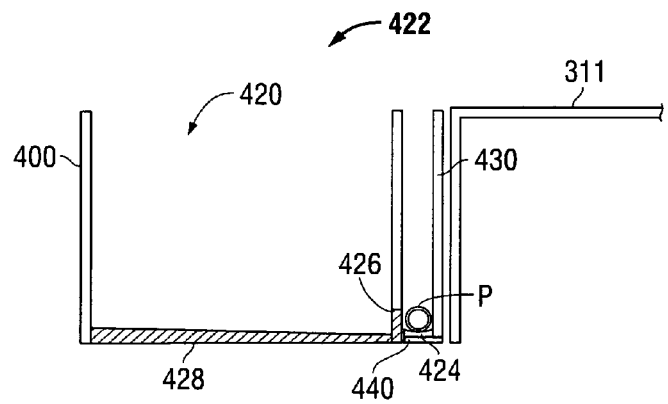
FIG. 23E is a cross sectional view of a pipe feeding mechanism whereby a pipe is transferred from a pipe tub into a pipe arm in accord with one possible embodiment of the present disclosure.

FIG. 23E is a cross sectional view of a pipe feeding mechanism 422 in accord with one possible embodiment of the present invention. In this embodiment, pipe rungs 432 are omitted so that pipe tub cavity 420 only contains sloped bottom 428 and pipe gate 426. This arrangement allows a higher volume of pipe to be stored in pipe tub 400 for drilling operations. Sloped bottom 428 will urge pipe towards pipe gate 426 which remotely opens and closes to allow pipe P to be received by pipe feed receptacle 424. After pipe P has cleared pipe gate 426, it will be hoisted along vertical support member 430 via pipe feed receptacle 424 until it reaches catwalk segment 311. Once at catwalk segment 311, pipe P will be further urged to pipe arm 320 by catwalk moving elements 314 (See FIG. 23B). In one embodiment, the pipe feeding mechanism of FIG. 23E may be utilized with the pipe tub 400 of FIG. 23C. When removing pipe from the well, the pipe may be positioned onto the rungs by catwalk moving elements and/or pipe ejection elements discussed hereinbefore.

During operation for insertion of pipes into the wellbore, pipes are moved from pipe tubs 400 to the catwalk (if desired by automatic operation) and in one embodiment catwalk pipe moving elements 314 are activated to urge the pipes into pipe grooves 378 past retracted pipe clamps 387A, 389A and/or 387B, 389B. Once the pipe is in the grooves, then the pipe clamps are pivoted upwardly 387A, 389A and/or 387A, 389A to clamp the pipes. During this time, the length and other factors of the pipe is sensed or read by RFID tags. Pivotal pipe arm 320 is then rotated upwardly to the desired position (which may be determined by sensors and/or an upper mast fixture 315. Kickout arm 360 pivots outwardly to orient the pipe vertically.

Top drive 150 is lowered using drawworks 620 to lower traveling block assembly 153, and top drive shaft 165 is rotated to threadably connect with the upper pipe connector. The pipe is then lowered utilizing traveling block assembly 153 and top drive 150 so that the lower connection of the pipe is connected to the uppermost connection of the pipe string already in the wellbore and the pipe may be rotated to partially make up the connection. The pipe tongs 170 are moved around the pipe connection to torque the pipe with the desired torque and the torque sensor measures the make-up torque curve to verify the connection is made correctly. The pipe tongs are moved out of the way. The slips are disengaged and the pipe string is lowered so that the pipe upper connection is adjacent the rig floor and the slips are applied again to hold the pipe string. The pipe tongs may be brought back in for breaking the connection of this pipe and may utilize reverse rotation of the top drive to undo the connection. Using drawworks 620 to raise traveling block assembly 153, top drive 150 is moved back toward the mast top in readiness for the next pipe.

To remove pipe from the well bore, the top drive is raised so that the lower connection of the pipe for removal is available to be broken by pipe tongs. Once broken, the top drive may be used to undo the connection the remainder of the way. The pipe is then raised, kickout arm 360 is pivoted outwardly, and clamps 370A and 370B clamp the pipe. The connection to the top drive is then broken by rotation of the top drive shaft 165, whereupon the top drive is moved out of the way. Kickout arm 360 is then pivoted back to be adjacent pivotal pipe arm 320. Pivotal pipe arm 320 is lowered. Clamps 370A and 370B are released and retracted. Either the eject arms 374A or 374B are activated depending on which side the pipe tube is located. Accordingly, a single operator can run pipe into the well, perform services, and remove pipe from the well. Other personnel at the well site may be utilized for other functions such as cleaning pipe threads, removing thread protectors, moving pipe onto pipe tubs, which may also simply comprise racks, checking mud measurements, checking engines, and the like as is well known.

For alignment purposes of the present application, a wellhead, BOP, snubber stack, pressure control equipment or other equipment with the well bore going through is considered equivalent because this equipment is aligned with the path of the top drive.

Figure 24B:
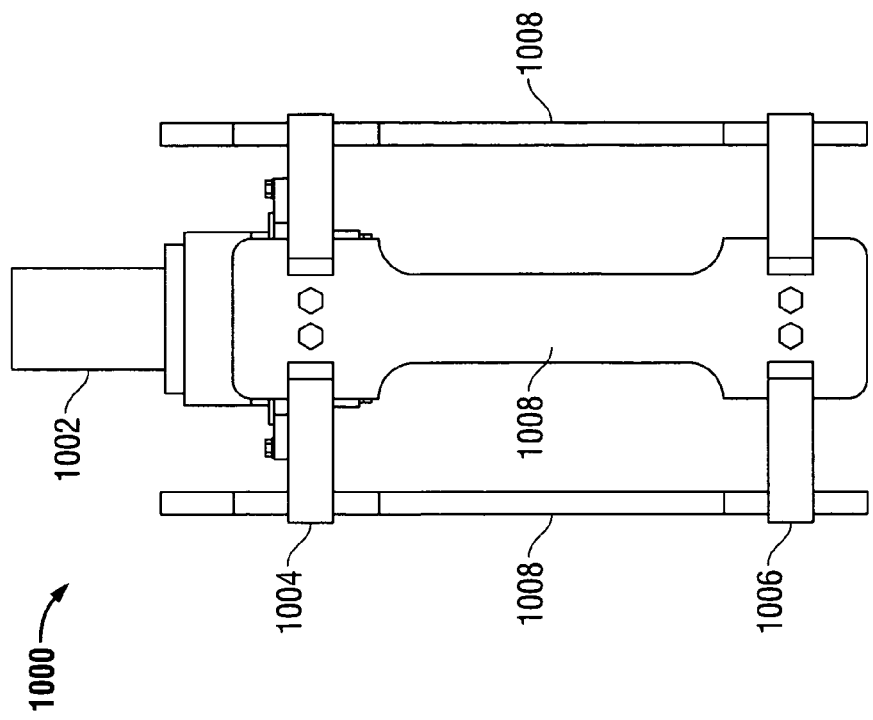
FIG. 24B depicts a diagrammatic side view of the gripping apparatus of FIG. 24A.
Figure 24A:
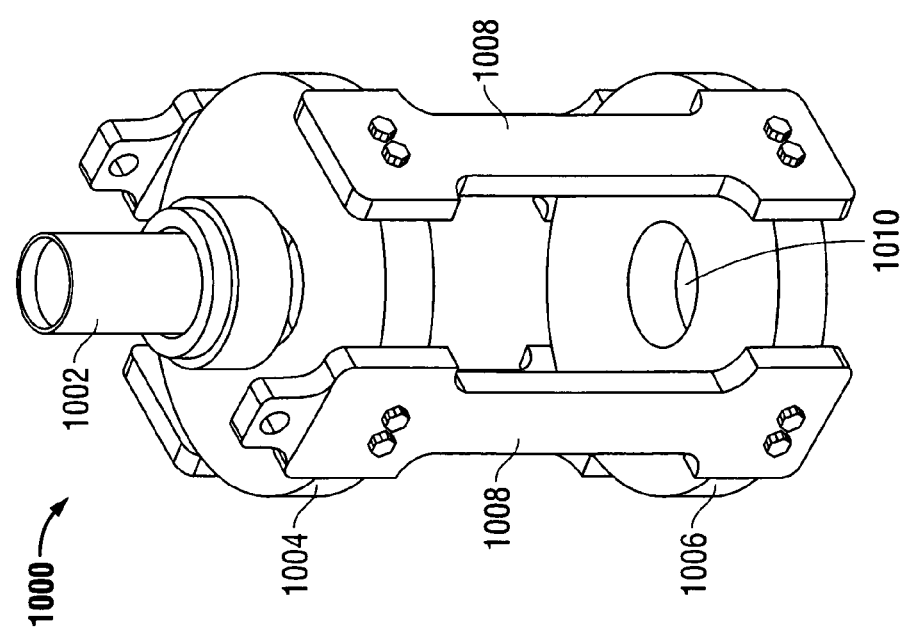
FIG. 24A is a perspective view of an embodiment of a gripping apparatus engageable with a top drive of one possible embodiment of the present disclosure.

FIG. 24A depicts a perspective view of an embodiment of a gripping apparatus 1000 engageable with a top drive, such that pipe segments can be gripped by the apparatus 1000 to eliminate the need to thread each individual segment to the top drive itself. FIG. 24B depicts a diagrammatic side view of the apparatus 1000.

The apparatus 1000 is shown having an upper connector 1002 (e.g., a threaded connection) usable for engagement with the top drive, though other means of engagement can also be used (e.g., bolts or other fasteners, welding, a force or interference fit). Alternatively, the gripping apparatus 1000 could be formed integrally or otherwise fixedly attached to a top drive or similar drive mechanism.

The apparatus 1000 is shown having an upper member 1004 engaged to the connector 1002, and a lower member 1006, engaged to the upper member 1004 via a plurality of spacing members 1008. While FIGS. 24A and 24B depict the upper and lower members 1004, 1006 as generally circular, disc-shaped members, separated by generally elongate spacing members 1008, it should be understood that the depicted configuration of the body of the apparatus 1000 is an exemplary embodiment, and that any shape and/or dimensions of the described parts can be used. The lower member 1006 is shown having a bore 1010 therein, through which pipe segments can pass.

During operation, the apparatus 1000 can be threaded and/or otherwise engaged with the top drive, then after positioning of a pipe segment beneath the top drive and apparatus 1000, e.g., using a pipe handling system, the apparatus 1000 can be lowered by lowering the top drive. And end of the pipe segment thereby passes through the bore 1010, such that slips or similar gripping members disposed on the lower member 1006 can be actuated (e.g., through use of hydraulic cylinders or similar means) to grip and engage the pipe segment. Continued vertical movement of the top drive along the mast thereby moves the apparatus 1000, and the pipe segment, due to the engagement of the gripping members thereto. Likewise, rotational movement of the top drive (e.g., to make or unmake a threaded connection in a pipe string) causes rotation of the apparatus 1000, and thus, rotation of the gripped pipe segment. The apparatus 1000 is thereby usable as an extension of the top drive, such that pipe segments need not be threaded to the top drive itself, but can instead be efficiently gripped and manipulated using the apparatus 1000.

Other types of attachments for engagement with a top drive or other drive system, and/or for engaging and/or guiding a tubular joint are also usable. For example, FIG. 25A depicts an exploded perspective view of an embodiment of a guide apparatus 1100 engageable with a top drive such that tubular joints brought into contact with the guide apparatus 1100 can be moved toward a position suitable for engagement with the top drive (e.g., in axial alignment therewith). FIG. 25B depicts a diagrammatic side view of the guide apparatus 1100.

Specifically, the guide apparatus 1100 is shown having an upper member 1102 that includes a connector (e.g., interior threads) configured to engage a top drive and/or other type of drive mechanism, though other means of engagement can also be used (e.g., bolts or other fasteners, welding, a force or interference fit). Alternatively, the guide apparatus 1100 could be formed integrally or otherwise fixedly attached to a top drive or similar drive mechanism.

The upper member 1102 is shown engaged to the remainder of the guide apparatus 1100 via insertion through a central body 1106 having an internal bore, such that a threaded lower portion 1104 of the upper member 1102 protrudes beyond the lower end of the central body 1106. A collar-type engagement, shown having two pieces 1108A, 1108B, connected via bolts 1110, nuts 1111, and washers 1113, can be used to secure the upper member 1102 to the remainder of the apparatus 1100, though it should be understood that the depicted configuration is exemplary, and that any manner of removable or non-removable engagement can be used, or that the upper member 1102 could be formed as an integral portion of the guide apparatus 1100.

A lower member 1112 is shown below the upper member 1102, the lower member 1112 having a generally frustroconical shape with a bore 1114 extending therethrough. The shape of the lower member 1112 defines a sloped and/or angled interior surface 1116. A plurality of spacing members 1118 are shown extending between the lower member 1112 and the central body 1106, thus providing a distance between the lower member 1112 and the upper member 1102 and/or a top drive connected thereto. While FIGS. 25A and 25B depict the upper member 1102 and central body 1106 as generally tubular and/or cylindrical structures, it should be understood that any shape and/or configuration could be used. Similarly, while the lower member 1112 is shown as a generally frustroconical member, other shapes (e.g., pyramid, partially spherical, and/or curved shapes) could be used to present an angled and/or curved surface in the direction of a tubular.

During operation, the guide apparatus 1100 can be threaded and/or otherwise engaged with the top drive, then after positioning of a tubular joint beneath the top drive and the guide apparatus 1100 (e.g., using a pipe handling system), the guide apparatus 1100 can be lowered by lowering the top drive. After the end of the tubular joint passes through the lower end of the bore 1114, the end of the tubular joint contacts the angled interior surface 1116. Continued movement of the guide apparatus 1100 causes the tubular to move along the angled interior surface 1116 until the end of the tubular exits the upper end of the bore 1114, where contact between the tubular and the upper portion off the lower member 1112, and/or between the tubular and the spacing members 1118 prevents further lateral movement of the tubular relative to the guide apparatus 1100.

The end of the tubular joint can then be connected (e.g., threaded) to the lower portion 1104 of the upper member 1102. Continued vertical movement of the top drive along the mast thereby moves the guide apparatus 1100, and the tubular joint, due to the engagement between the joint and the guide apparatus 1100. Likewise, rotational movement of the top drive (e.g., to make or unmake a threaded connection in a pipe string) causes rotation of the guide apparatus 1100, and thus, rotation of the engaged tubular joint. The guide apparatus 1100 is thereby usable as an extension of the top drive, such that tubular joints need not be threaded to the top drive itself, where misalignment can occur, but can instead be presented in a misaligned position, contacted against the angled interior surface 1116, and moved into alignment for engagement with the apparatus 1100. In alternate embodiments, the upper member 1102 and lower portion 1104 thereof could be omitted, and a tubular joint could be engaged with a portion of the top drive directly.

Figure 26:
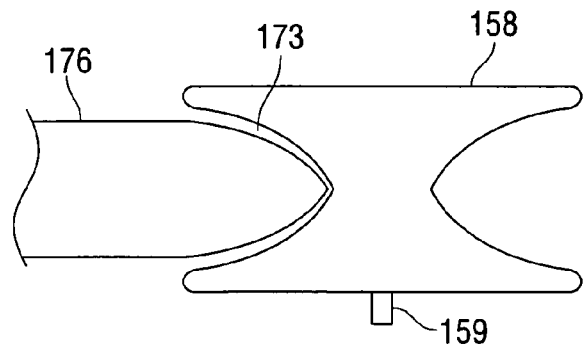
FIG. 26 is a top view of a roller engaged with a guide rail in accord with one possible embodiment of the present disclosure.

FIG. 26 is a top view of a roller and a support rail in accord with one possible embodiment of the present invention. Roller 158 is one of several rollers connected to both guide frames 152A and 152B (See FIGS. 19, 19B, and 19C-C). Roller 158 is connected to guide frame 152 at roller axle 159 allowing roller 158 to spin freely around roller axle 159. Support rail 176 is sized to mate with groove 173 of roller 178 to facilitate movement of top drive 150 along support rail 176. In another embodiment, support rail 176 could contain groove 173 whereby roller 158 is sized to engage groove 173 to facilitate movement of top drive 150. In this way, rollers 158 may be utilized to prevent rotation of the top drive and to reduce back and forth movement as may occur in prior art systems.

It will be understood that grooves could be provided in the guide frame whereby the rollers fit in the groove of the guide frame rather than the groove being formed in the rollers. The grooves may be of any type including straight line grooves where the grove sides may be angled or perpendicular with respect to the axis of rotation of the rollers. As well, the grooves may be curved. The grooves may also have combination of angled and perpendicular lines or any variation thereof. Mating surfaces in the opposing component, either the guides or the rollers are utilized. There may be some variation in size to reduce friction, e.g., the groove may have a bottom width of two inches and the inserted member may have a maximum width of 1 and three-quarters inches and so forth. As discussed above, the grooves may be V-shaped or partially V-shaped.

Figure 27A:
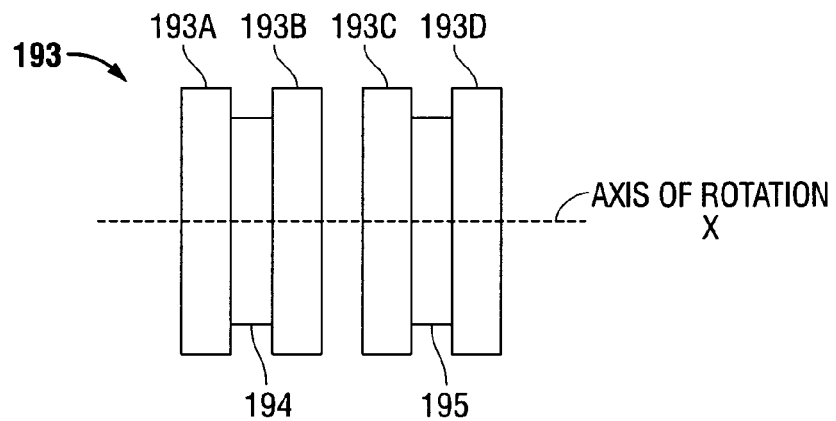
FIG. 27A is a top view of a crown block sheave assembly showing an axis of rotation in accord with one possible embodiment of the present disclosure.
Figure 27B:
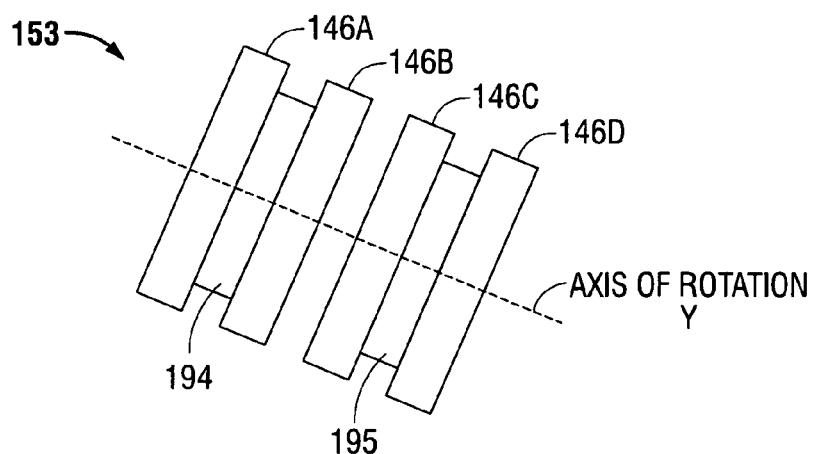
FIG. 27B is a top view of a traveling sheave block showing an axis of rotation in accord with one possible embodiment of the present disclosure.

Turning to FIGS. 27A and 27B, a top view of a crown block assembly 193 in accord with one possible embodiment of the present invention. Crown block assembly 193 has cluster of sheaves located on top of mast assembly 100. Sheaves 193A, 193B, 193C, 193D have an axis of rotation X upon which the sheave cluster 193A, 193B, 193C, 193D rotates. Traveling sheave block assembly 153 has sheaves 146A, 146B, 146C, 146D which are fastened to said guide frame 152 of top drive fixture 150 (see FIG. 19). Traveling sheave block assembly 153 has axis of rotation Y, which is offset in relation to axis of rotation X upon which sheave cluster 193A, 193B, 193C, 193D rotates. In one embodiment, the offset is less than ninety degrees. In another embodiment, the offset is less than forty five degrees. In another embodiment, the offset is less than twenty five degrees. It will be understood that these ranges would also apply if any multiple of ninety degrees were added to these ranges, e.g., between ninety and one-hundred eighty degrees. This orientation improves the ability of sheave cluster 193A, 193B, 193C, 193D and traveling sheave block assembly 153 to reeve a drilling line. When the traveling sheaves move closely to the crown sheaves, the offset aids in providing a smoother transition from one set of sheaves to the other in that sharp bends of the drilling line are avoided.

Generally, sheave wheels have a minimum diameter with respect to the type of drilling line to limit the amount of bending of the drilling line. Generally, the minimum sheave diameter will be between fifteen times and thirty time the diameter of the drilling line. However, this range may vary. Accordingly, in some embodiments, the ratio of sheave wheel diameter to drilling line diameter may be less than twenty.

Figure 28A:
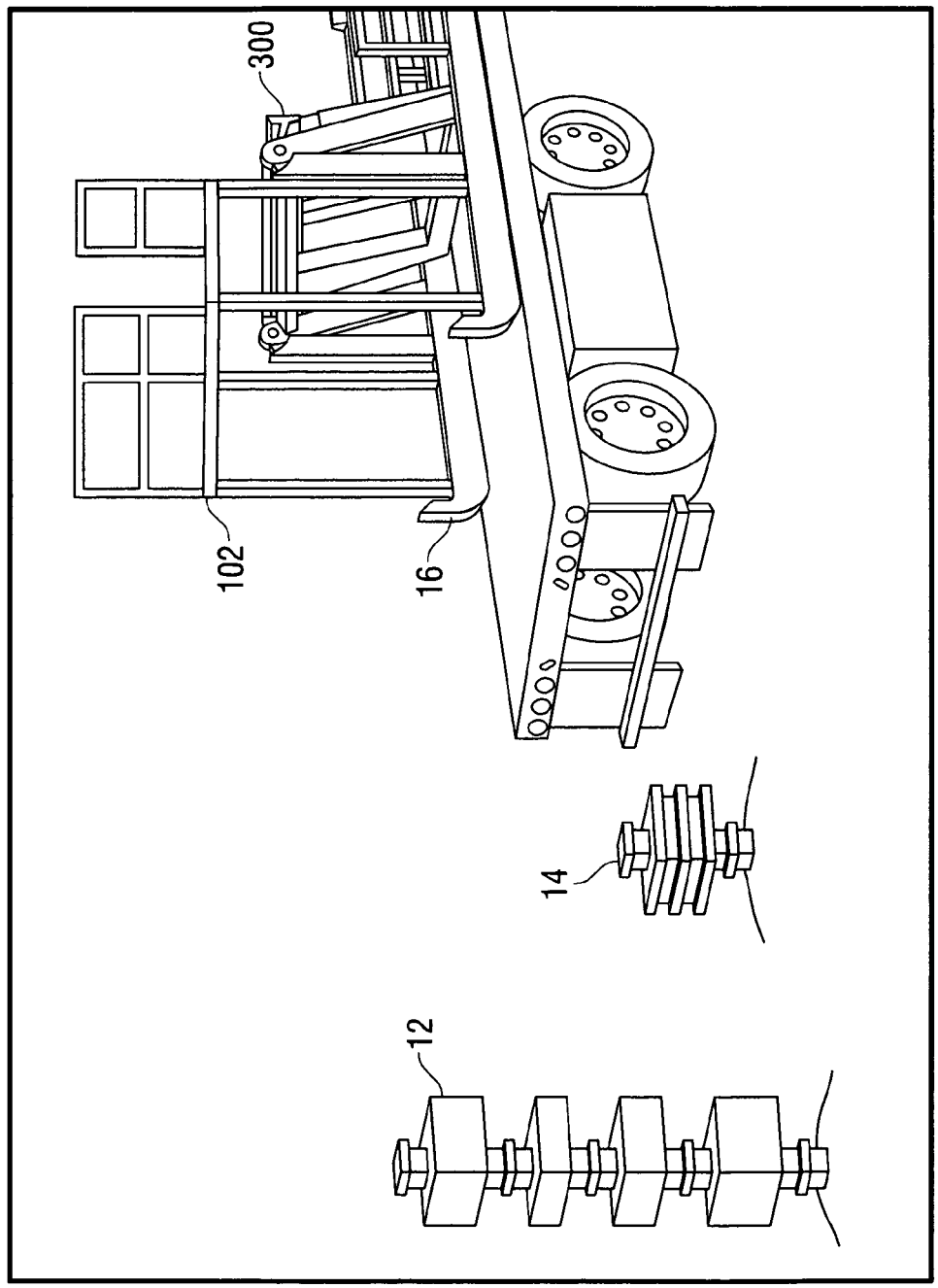
FIG. 28A is a perspective view of a system for conducting a long lateral well completion system of multiple wellheads in close proximity in accord with one possible embodiment of the present invention.
Figure 28B:
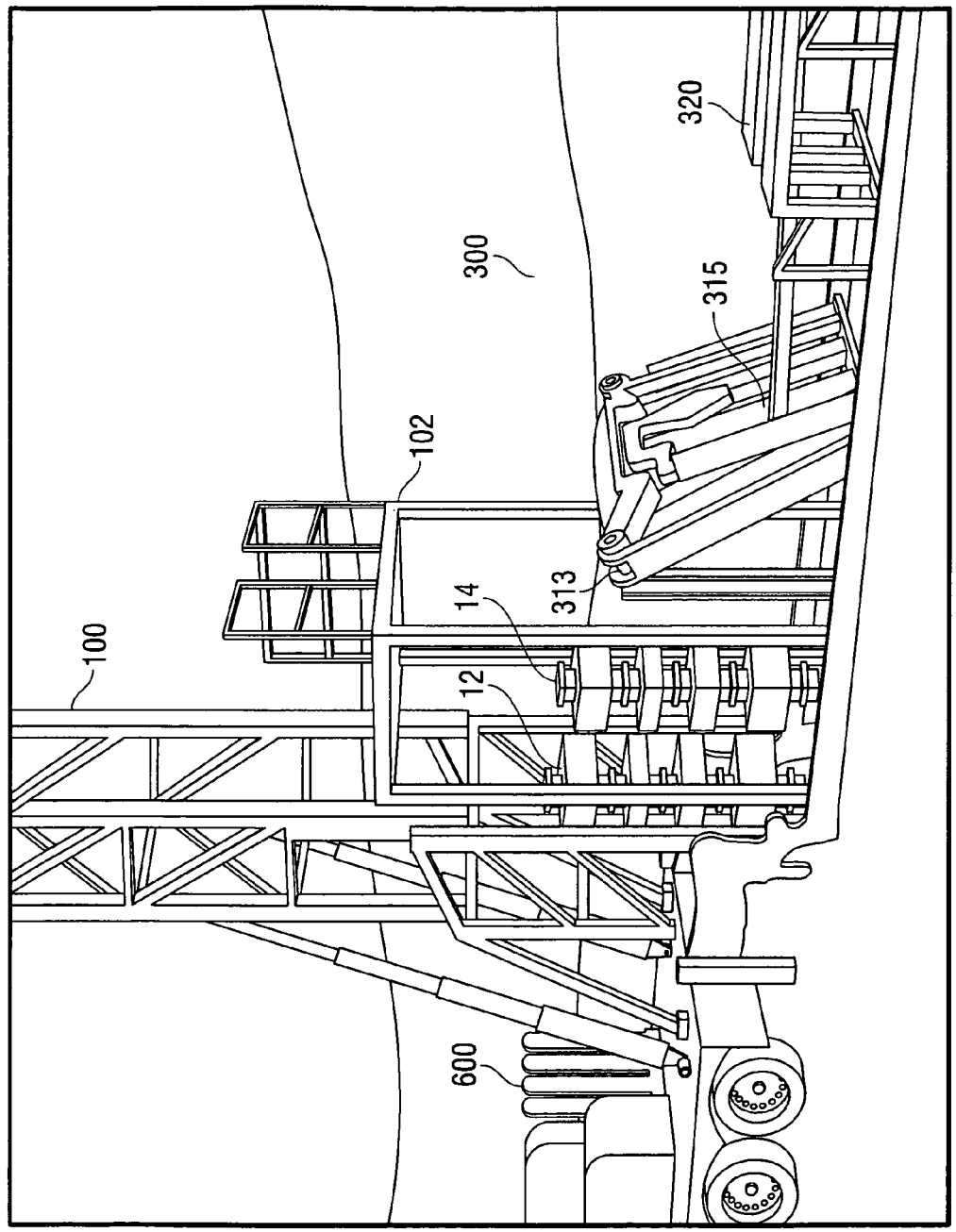
FIG. 28B is another perspective view of a system for conducting a long lateral well completion system of multiple wellheads in close proximity in accord with one possible embodiment of the present invention.

Turning to FIGS. 28A and 28B, one possible embodiment of long lateral completion system 10 is depicted. A well site with first wellhead 12 and second wellhead 14 is shown. As discussed hereinbefore, long lateral completion system 10 can work well with wellheads in close proximity with each other on a well site, which can be less than a 10 foot distance between first wellhead 12 and second wellhead 14. Pipe arm assembly 300 occupies a rear portion of skid 16 while rig floor 102 is positioned at a front end of skid 16 closest to second wellhead 14. In another embodiment, rig floor 102 and pipe arm assembly 300 are operable without skid 16. Skid 16 is positioned so that rig platform 102 is directly above second wellhead 14. Rig floor 102 may or may not be part of skid 16.

FIG. 28B depicts long lateral completion system 10 in accord with one possible embodiment of the present invention. Rig carrier 600 is shown with mast assembly 100 in an upright position. Mast assembly 100 extends past a rear portion of rig carrier 600 so that top drive unit mounted within mast assembly 100 is positioned directly above first wellhead 12 for drilling operations, as discussed hereinbefore. In other embodiments, sensors such as laser sights or guides mounted to the rear of rig carrier 600, and the like may be utilized, e.g., mounted to and/or guided to the well head, to locate and orient the axis of mast assembly 100 precisely with respect to the wellbore of first wellhead 12.

Rig floor 102 is shown positioned above second wellhead 14 providing operators access to mast assembly 100 when conducting drilling operations on first wellhead 12. System 10 is configured so that pivotal pipe arm 320 of pipe handling system 300 can move pipe to and away from mast assembly 100 without contacting rig floor 102 during operation. Pivotal pipe arm 320 uses control arm 315 to pivot about pipe arm pivotal connection 313 creating an angle which avoids rig floor 102.

In another embodiment of the present invention, pivotal pipe arm 320 may contain kickout arm 360. In this embodiment, kickout arm 360 remains generally parallel to pivotal pipe arm 30 except when pivotal pipe arm 360 is moved into the upright position shown in FIG. 7, FIG. 8, and FIG. 9. Upon reaching the upright position, kickout arm 360 is pivoted using the hydraulic actuators 362, which cause kickout arm 360 to pivot away from pipe arm 320 about kickout arm pivot connection 312 (See FIG. 16B). This preferred configuration of long lateral completion system 10 allows drilling operations on multiple wells in close proximity, which can be less than 10 feet apart in certain embodiments.

While certain exemplary embodiments have been described in details and shown in the accompanying drawings, it is to be understood that such embodiments are merely illustrative of and not devised without departing from the basic scope thereof, which is determined by the claims that follow. Moreover, it will be appreciated that numerous inventions are disclosed herein which are taught in various embodiments herein and that the inventions may also be utilized within other types of equipment, systems, methods, and machines so that the invention is not intended to be limited to the specifically disclosed embodiments.

What is claimed is:

1. A pipe ejection mechanism for ejecting pipes, comprising:
   a pipe arm movable between a lowered position and a raised position;
   at least one receptacle on said pipe arm operable for receiving at least one pipe;
   a plurality of first pipe ejector arms for moving said at least one pipe from said pipe arm in a first lateral direction with respect to said pipe arm, wherein said plurality of first pipe ejector arms pivot to lift said at least one pipe and to form a slope for rolling said at least one pipe on said plurality of first pipe ejector arms;
   a plurality of second pipe ejector arms for moving said at least one pipe from said pipe arm in a second lateral direction different from said first lateral direction with respect to said pipe arm, wherein said plurality of second pipe ejector arms pivot to lift said at least one pipe and to form a slope for rolling said at least one pipe on said plurality of second pipe ejector arms;
   a first torsional rod in connection with said pipe arm on a first side of said pipe arm, wherein said plurality of first pipe ejector arms are connected to said first torsional rod, wherein said first torsional rod pivots the plurality of first pipe ejector arms; and
   a second torsional rod in connection with said pipe arm on a second side of said pipe arm opposite said first side, wherein said plurality of second pipe ejector arms are connected to said second torsional rod, wherein said second torsional rod pivots the plurality of second pipe ejector arms, wherein the plurality of the first pipe ejector arms comprise a first upper edge extending the distance between the receptacle and the first torsional rod, wherein the at least one pipe rolls on top of the first upper edge the distance between the receptacle and the first torsional rod, wherein the plurality of the second pipe ejector arms comprise a second upper edge extending the distance between the receptacle and the second torsional rod, and wherein the at least one pipe rolls on top of the second upper edge the distance between the receptacle and the second torsional rod.

2. The pipe ejection mechanism of claim 1, wherein said second lateral direction is opposite to said first lateral direction.

3. The pipe ejection mechanism of claim 1, further comprising a first hydraulic actuator operatively connected to said first torsional rod and a second hydraulic actuator operatively connected to said second torsional rod.

4. The pipe ejection mechanism of claim 1, wherein the first and second upper edges are generally straight.

5. The pipe ejection mechanism of claim 1, wherein the first torsional rod moves with the pipe arm, and wherein the second torsional rod moves with the pipe arm.

6. A pipe ejection mechanism for ejecting pipes, comprising:
- a movable pipe arm;
- at least one receptacle on said pipe arm operable for receiving at least one pipe;
- a plurality of first pipe ejector arms;
- a plurality of second pipe ejector arms;
- a first torsion bar positioned adjacent the movable pipe arm, wherein the first torsion bar moves with the movable pipe arm, wherein the first torsion bar pivots the plurality of first pipe ejector arms, wherein the plurality of first pipe ejector arms extend a distance between the at least one receptacle and the first torsion bar, and wherein the at least one pipe rolls on top of the plurality of first pipe ejector arms the distance between the at least one receptacle and the first torsion bar;
- a second torsion bar positioned adjacent the movable pipe arm, wherein the second torsion bar moves with the movable pipe arm, wherein the second torsion bar pivots the plurality of second pipe ejector arms, and wherein the ejection control selectively ejects the least one pipe from the pipe arm in a second lateral direction different from said first lateral direction with respect to the pipe arm; and
- an ejection control operably mounted to said pipe arm for selectively ejecting said at least one pipe from said pipe arm in a first lateral direction with respect to said pipe arm.

7. The pipe ejection mechanism of claim 6, wherein said second lateral direction is opposite to said first lateral direction.

8. The pipe ejection mechanism of claim 6, wherein said ejection control further comprises a first hydraulic actuator operatively connected to said first rotational plate, and a second hydraulic actuator operatively connected to said second rotational plate, such that actuation of said first hydraulic operator results in said ejecting of said at least one pipe from said pipe arm in said first lateral direction with respect to said pipe arm and actuation of said second hydraulic actuator results in said ejecting of said at least one pipe from said pipe arm in said second lateral direction with respect to said pipe arm.

9. The pipe ejection mechanism of claim 6, wherein said pipe arm is mounted to be movable between an upright position and a lowered position.

* * * * *